United States Patent [19]

Hattori et al.

[11] Patent Number: 5,305,057
[45] Date of Patent: Apr. 19, 1994

[54] IMAGE FORMING APPARATUS HAVING CORRECTION MEANS FOR MODIFYING IMAGE DENSITY SIGNALS ACCORDING TO A GRADATION CORRECTION TABLE

[75] Inventors: Yoshihiro Hattori; Suguru Hamamichi, both of Toyokawa; Hideaki Kodama, Okazaki; Yoshikazu Naito; Takeru Kinoshita, both of Toyokawa, all of Japan

[73] Assignee: Minolta Camera Kabushiki Kaisha, Osaka, Japan

[21] Appl. No.: 907,671

[22] Filed: Jul. 2, 1992

[30] Foreign Application Priority Data

Jul. 5, 1991 [JP] Japan .................. 3-164879
Jul. 5, 1991 [JP] Japan .................. 3-165663

[51] Int. Cl.$^5$ .......................... G03G 21/00
[52] U.S. Cl. ...................... 355/203; 355/208; 355/214; 355/246; 358/300; 358/458
[58] Field of Search ........... 355/203, 204, 208, 214, 355/246, 326, 327; 346/157; 358/80, 300, 406, 458

[56] References Cited

U.S. PATENT DOCUMENTS

| | | | |
|---|---|---|---|
| 4,310,237 | 1/1982 | Gengelbach | 355/214 |
| 4,350,435 | 9/1982 | Fiske et al. | 355/246 |
| 4,647,184 | 3/1987 | Russell et al. | 355/208 |
| 4,816,863 | 3/1989 | Lee | 358/300 X |
| 4,912,515 | 3/1990 | Amemiya et al. | 355/326 X |
| 5,019,873 | 5/1991 | Imaeda | 355/326 |
| 5,034,772 | 7/1991 | Suzuki | 355/208 |
| 5,148,289 | 9/1992 | Nishiyama et al. | 358/300 |
| 5,170,210 | 12/1992 | Saruwatari | 355/208 |
| 5,172,224 | 12/1992 | Collette et al. | 358/80 |

FOREIGN PATENT DOCUMENTS 3-144473 6/1991 Japan .

Primary Examiner—A. T. Grimley
Assistant Examiner—William J. Royer
Attorney, Agent, or Firm—Burns, Doane, Swecker & Mathis

[57] ABSTRACT

In an electrophotographic image forming apparatus, a charger sensitizes the photoconductor at a desired initial potential and the photoconductor is exposed to form an electrostatic latent image, which is developed by a developer to form a toner image. A gradation correction table on the relation of the input image signal to the exposure amount is provided in a memory, and it is amended by adding a common amendment value to the image density signal in the gradation correction table. The common amendment value is determined according to the density of a standard toner image. If a plurality of gradation correction tables are stored in a memory, one of them is selected according to the output voltage of the charger or the bias potential of the developer. The selected gradation correction table is amended according to the surface potential of the photoconductor, the temperature of the photoconductor or the humidity of the photoconductor. Alternately, the detection value of the surface potential, the temperature or the humidity may be used to select the gradation correction table. The gradation table may be amended according to the state of the photoconductor. The amplification factor of the exposure amount for the photoconductor can be changed according to the state of the photoconductor, the temperature or the humidity of the photoconductor. The bias voltage of the developer or the output voltage of the charger may also be changed according to the state of the photoconductor.

49 Claims, 63 Drawing Sheets

IMAGE FORMING APPARATUS HAVING CORRECTION MEANS FOR MODIFYING IMAGE DENSITY SIGNALS ACCORDING TO A GRADATION CORRECTION TABLE

BACKGROUND OF THE INVENTION

1. Field of the Invention

The present invention relates to an image forming apparatus, such as an electrophotographic digital printer or copying machine.

2. Description of Related Art

Image forming apparatuses such as a laser printer use electrophotographic process are used practically, wherein a laser is driven according to digital image data converted from analog image signals and an image is reproduced with use of an electrophotographic process. Various digital image forming methods of reproducing a half-tone image such as a photograph with a high fidelity are proposed for such image forming apparatuses.

Digital image forming methods includes an area gradation method with use of a dither matrix, a multi-value laser exposure method such as a pulse width modulation method or an intensity modulation method, and a multi-value dither method which combines the dither method with a pulse width modulation method or an intensity modulation method. In the multi-value laser exposure method, the gradation is expressed by changing the pulse width (or light-emitting time) or the light intensity in order to change the light quantity of laser, that is, the light-emitting time times the intensity (refer for example Japanese Patent laid open Publications 62-91077/1987, 62-39972/1987, 62-188562/1987 and 61-22597/1987).

By using such a gradation method, the image density can be reproduced in principle in correspondence to the gradation of the image to be reproduced. However, the image density reproduced with a gradation method is not proportional correctly to the original document density due to the photosensitive characteristics of a photoconductor and the characteristics of toners. Then, the linear characteristic of the document density with the image density is not realized and the resultant non-linear characteristic is called as the gamma characteristic generally. The nonlinearity is a large factor which lowers the fidelity of the reproduced image for a half-tone document.

Then, the so-called gamma correction is conducted to improve the gamma characteristic wherein the document density read with a sensor is converted with a conversion table for the gamma correction and a digital image is formed according to the converted document density to realize the linear characteristics. For example, in an apparatus with use of a digital image forming method such as an area gradation method or a multi-value laser exposure method disclosed in Japanese Patent laid open Publications 1-204741/1989 and 1-204743/1989, the gamma correction characteristic is changed according to a command from a host computer, an image reader or by a user. By using such a gamma correction, the image can be reproduced according to the document density level usually with a fidelity.

Further, there are other factors which affect the image density. The amount of adhered toners on the photoconductor on development changes according to the external environment such as temperature or humidity owing to the characteristics of the photoconductor and the toners. In general, in an environment of high temperature and high humidity, the adhered amount of toners increases, and the slope of the gamma characteristic at low and intermediate densities is known to increase so as to make the reproduced image darker. On the other hand, in an environment of low temperature and low humidity, the adhered amount of toners decreases, and the slope of the gamma characteristic at low and intermediate densities is known to decrease so as to make the reproduced image lighter. That is, the transfer efficiency varies with the environment conditions.

As mentioned above, the density of a reproduced image varies according to the environment. In order to solve this problem and to stabilize the reproduced image in a printer or a copying machine of electrophotographic process, the density is generally controlled so as to make the maximum density constant.

In a conventional automatic density control, a standard toner image as a standard for the density control is first formed on the surface of the photoconductor, and the density of the standard toner image is measured by detecting the quantity of reflection light with a sensor arranged near the photoconductor. The value detected by the sensor is received by a printer controller, which changes the grid potential of the sensitizing charger and the development bias potential of the developer according to the detected value with a prescribed value. Previously, the density control is performed by keeping the difference between the surface potential $V_o$ and the development bias potential $V_B$ constant in order to prevent a fog in the background of an image and to prevent the adhesion of carriers of two-component developer to the photoconductor.

However, though such density control can make the maximum density constant, it is a problem that the gamma characteristic changes largely when the surface potential $V_o$ and the development bias potential $V_B$ are changed by keeping the difference between the surface potential $V_o$ and the development bias potential $V_B$ constant. In other words, the reproduction image does not have the same gradation constantly for a document.

Further, it is also a problem that the initial quantity of light at which the image is reproduced first when the quantity of exposure light is increased from zero level varies with the process conditions. The process conditions include the surface potential $V_o$ due to the wear of the photoconductor drum (the accumulating total number of printing with use of the photoconductor) or to the scattering of the properties in the manufacturing process, the sensitivity of the photoconductor drum or of the light quantity of exposure, the transfer efficiency which changes according to the humidity or to the kind of a paper. Then, the number of the gradation levels which is reproducible changes, and the image quality changes largely at low densities which is sensitive to human eyes.

In order to solve such problems, previously, several measures are used. For example, the grid potential $V_G$ of the sensitizing charger is changed to control the surface potential $V_o$ to be a prescribed value. The temperature of the photoconductor and the quantity of exposure light are detected to control the quantity of exposure light. The temperature and the humidity are detected to control the transfer voltage.

However, it is expensive to use such measures automatically. If such measures are performed manually, the number of the parameters to be controlled is large so that it is not clear how to adjust the parameters surely and it is hard for a user to perform precise control.

As to the transfer efficiency, it is proposed that the transfer efficiency is controlled by the transfer current of the transfer charger which transfers the toner image of an electrostatic latent image on the photoconductor to a paper according to the absolute humidity or the temperature and the humidity (for example U.S. Pat. No. 4,912,515).

A factor which affects the transfer efficiency at high humidity is the decrease in electrical resistance due to the absorption of humidity by a paper. That is, the discharge current from the transfer charger leaks through the paper and the toner image is not transferred effectively. The leakage causes the injection of charges on the surface of the photoconductor. Thus, the injection of charges is liable to happen at high humidity. If charges are injected to the photoconductor, the surface of the photoconductor is charged at a high potential and the toners transferred to the paper are attracted to the charges on the photoconductor or the re-transfer to the photoconductor happens. The re-transfer affects largely the reproduced image. For example, a part of an image vanishes in the highlight portion of the reproduced image. In order to prevent the re-transfer, the transfer current of the transfer charger has to be decreased. However, this lowers the transfer efficiency. Therefore, it is difficult to stabilize the gradation to compensate the decrease in transfer efficiency according to the detected temperature and humidity because of the side effect of the re-transfer.

In order to compensate the decrease in transfer efficiency at high humidity, the light quantity may be changed. However, the change in the light quantity affect the entire gradation largely, while the change in the highlight portion is small. Especially, the initial light quantity at which the image is reproduced first when the quantity of exposure light is increased from zero level nearly varies with the light quantity of the laser light source. Therefore, it is difficult to compensate the decrease in transfer efficiency by changing the light quantity.

It is also a problem that the measured potential of the photoconductor is different from the potential which affects the deposition in the intensity modulation exposure method. Thus, a constant gradation characteristic is not reproducible for a document if the surface potential and the exposure light quantity are controlled according to the measured value of the potential.

SUMMARY OF THE DISCLOSURE

An object of the present invention is to provide a digital image forming apparatus which can be adjusted easily against the process conditions of image reproduction and can keep the constant gradation reproducibility.

Another object of the present invention is to provide a digital image forming apparatus which can keep the constant gradation reproducibility when the transfer efficiency varies with humidity.

A third object of the present invention is to provide a digital image forming apparatus which can generate a reproduction image of a gradation characteristic chosen by a user.

A fourth object of the present invention is to provide a digital image forming apparatus which can generate a reproduction image of a constant gradation characteristic irrespective of the temperature or the humidity of the photoconductor.

A fifth object of the present invention is to provide a digital image forming apparatus which can generate a reproduction image of a constant gradation characteristic irrespective of the lot difference of the components of the apparatus or the machine difference.

A sixth object of the present invention is to provide a digital image forming apparatus which can generate a reproduction image of a constant gradation characteristic irrespective of the parameters of the photoconductor such as the surface potential or the sensitivity.

In an electrophotographic image forming apparatus, a charger sensitizes the photoconductor at a desired initial potential and the photoconductor is exposed to form an electrostatic latent image, which is developed by a developer to form a toner image.

In one aspect of the present invention, a gradation correction table on the relation of the input image signal to the exposure light quantity is provided in a memory and it is amended by adding a common amendment value to the image density signal in the gradation correction table. The common amendment value is determined according to the density of a standard toner image.

In the second aspect of the present invention, a plurality of gradation correction tables are stored in a memory, and one of them is selected according to the output voltage of the charger or the bias potential of the developer. The selected gradation correction table is amended according to the surface potential of the photoconductor, the temperature of the photoconductor or the humidity of the photoconductor. Alternately, the detection value of the surface potential, the temperature or the humidity may be used to select the gradation correction table.

In the third aspect of the present invention, the amplification factor of the exposure light quantity signal for the photoconductor is changed according to the state of the photoconductor, the temperature or the humidity of the photoconductor.

In the fourth aspect of the present invention, the gradation table amended according to the state of the photoconductor.

In the fifth aspect of the present invention, the bias voltage of the developer or the output voltage of the charger is changed according to the state of the photoconductor.

An advantage of the present invention is that the gradation characteristic can be controlled according to the scattering of the surface potential of the photoconductor, the change of the transfer efficiency, the taste of a user or the like.

Another advantage of the present invention is that the gradation can be controlled simply and surely.

A third advantage of the present invention is that the gradation can be amended according to the environment or secular change.

BRIEF DESCRIPTION OF THE DRAWINGS

These and other objects and features of the present invention will become clear from the following description taken in conjunction with the preferred embodiments thereof with reference to the accompanying drawings, and in which.

DETAILED DESCRIPTION OF THE PREFERRED EMBODIMENTS

Figure 1:
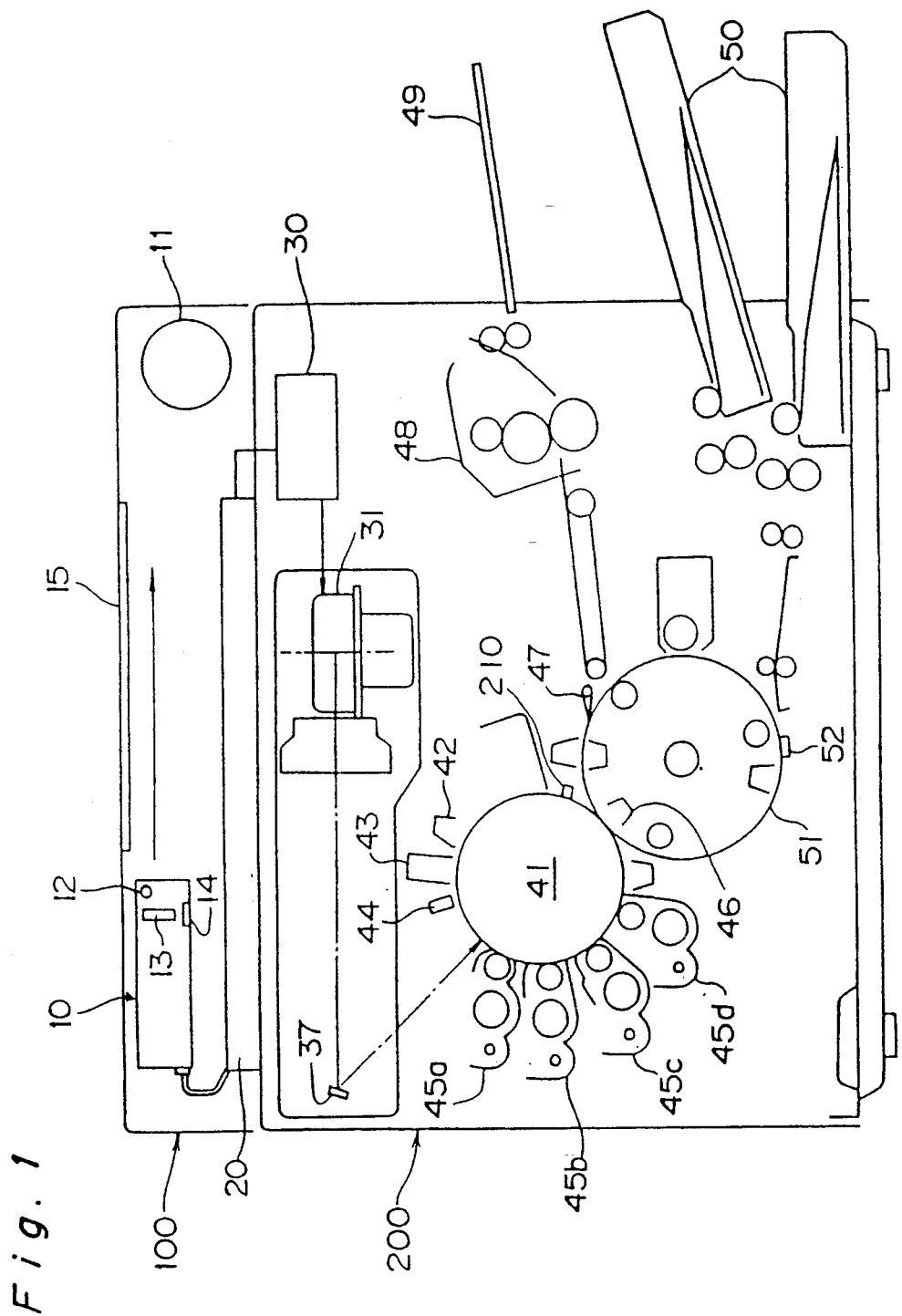
FIG. 1 is a sectional view of a full-color copying machine.

Referring now to the drawings, wherein like reference characters designate like or corresponding parts throughout the several views, preferred embodiments of the present invention will be explained below.

FIRST EMBODIMENT

A digital color copying machine of the first embodiment will be explained below in the following order:
 (a) structure of digital color copying machine
 (b) image data processing
 (c) automatic density control and gradation correction in electrophotographic process of inversion development
 (d) examples of the automatic density control and gradation correction
 (e) flow of printer control

(A) Structure of Digital Color Copying Machine

Referring now to the drawings, wherein like reference characters designate like or corresponding parts throughout the views, FIG. 1 shows a schematic structure of a digital color copying machine which consists mainly of an image reader 100 for reading a document image and a main body 200 for reproducing the document image.

In the image reader 100, a scanner 10 includes an exposure lamp 12, a rod lens array 13 to collect reflection light from a document put on a platen 15 and a contact type CCD color image sensor 14 to convert the collected light to an electric signal. The scanner 10 is driven by a motor 11 to move in the direction (subscan direction) of the arrow shown in FIG. 1. The optical image of the document illuminated by the exposure lamp 12 is converted by the image sensor 14 into a multi-level electric signal of red (R), green (G) and blue (B). The electric signal is converted by an image signal processor 20 to 8-bit gradation data of yellow (Y), magenta (M), cyan (C) or black (K), which are stored in a buffer memory 30 for synchronization.

Figure 5:
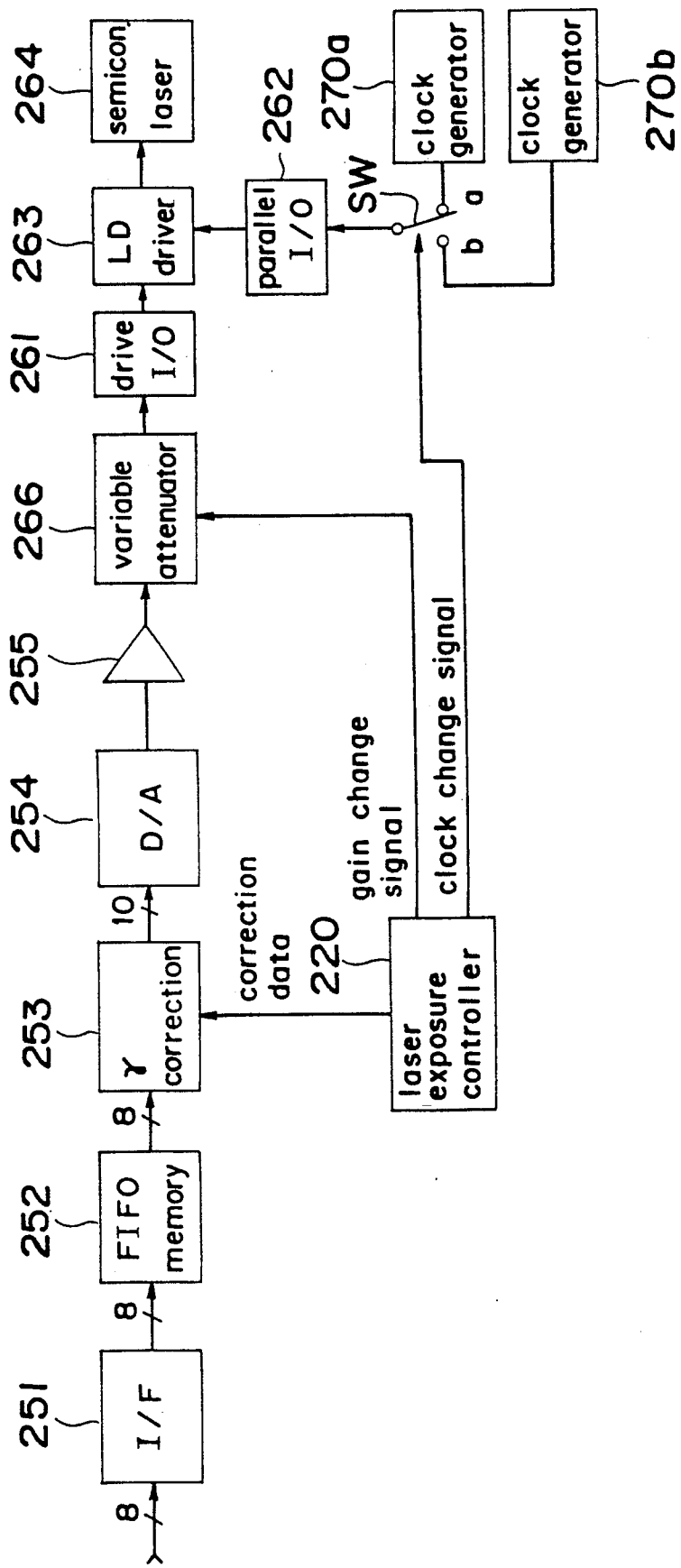
FIG. 5 is a block diagram of image data process system of the printer controller.

Then, in the printer 200, a print head 31 performs the gradation correction (gamma correction) of the received gradation data and it converts the corrected image data to a drive signal to drive a laser diode 264 (not shown) in the print head 31 (refer FIG. 5).

A laser beam emitted from the print head 31 according to the gradation data exposes a photoconductor drum 41 driven to be rotated, via a reflection mirror 37. The photoconductor drum 41 has been illuminated by an eraser lamp 42 and has been sensitized uniformly by a sensitizing charger 43 for each copy before the exposure. When the exposure is performed onto the photoconductor in the uniformly charged state, an electrostatic latent image is formed on the photoconductor drum 41. Then, one of developers 45a–45d of yellow, magenta, cyan and black toners is selected to develop the latent image. The developed image is transferred by a transfer charger 46 to a paper wound on a transfer drum 51.

Further, a standard image is formed by exposing and a prescribed region of the photoconductor drum 41 at a prescribed light quantity and is developed to form a standard toner image. The amount of adhered toners on the standard toner image is detected with an AIDC sensor 210 optically. That is, a light is incident obliquely on the toner image and the refection light is detected from the toner image. The amount of adhered toners is measured from the intensity of reflection light.

The above-mentioned printing process is repeated four times for yellow, magenta, cyan and black. At this time, the scanner 10 repeats the scanning in synchronization with the motion of the photoconductor drum 41 and the transfer drum 51. Then, the paper is isolated from the transfer drum 51 with the operation of an isolation claw 47, the image is fixed by a fixer 48 and the paper is carried out to a paper tray 49. In this process, a paper is supplied from a paper cassette 50 and is chucked at the top of the paper by a chucking mechanism 52 on the transfer drum 51 in order to prevent a shift of position on the image transfer.

Figure 2:
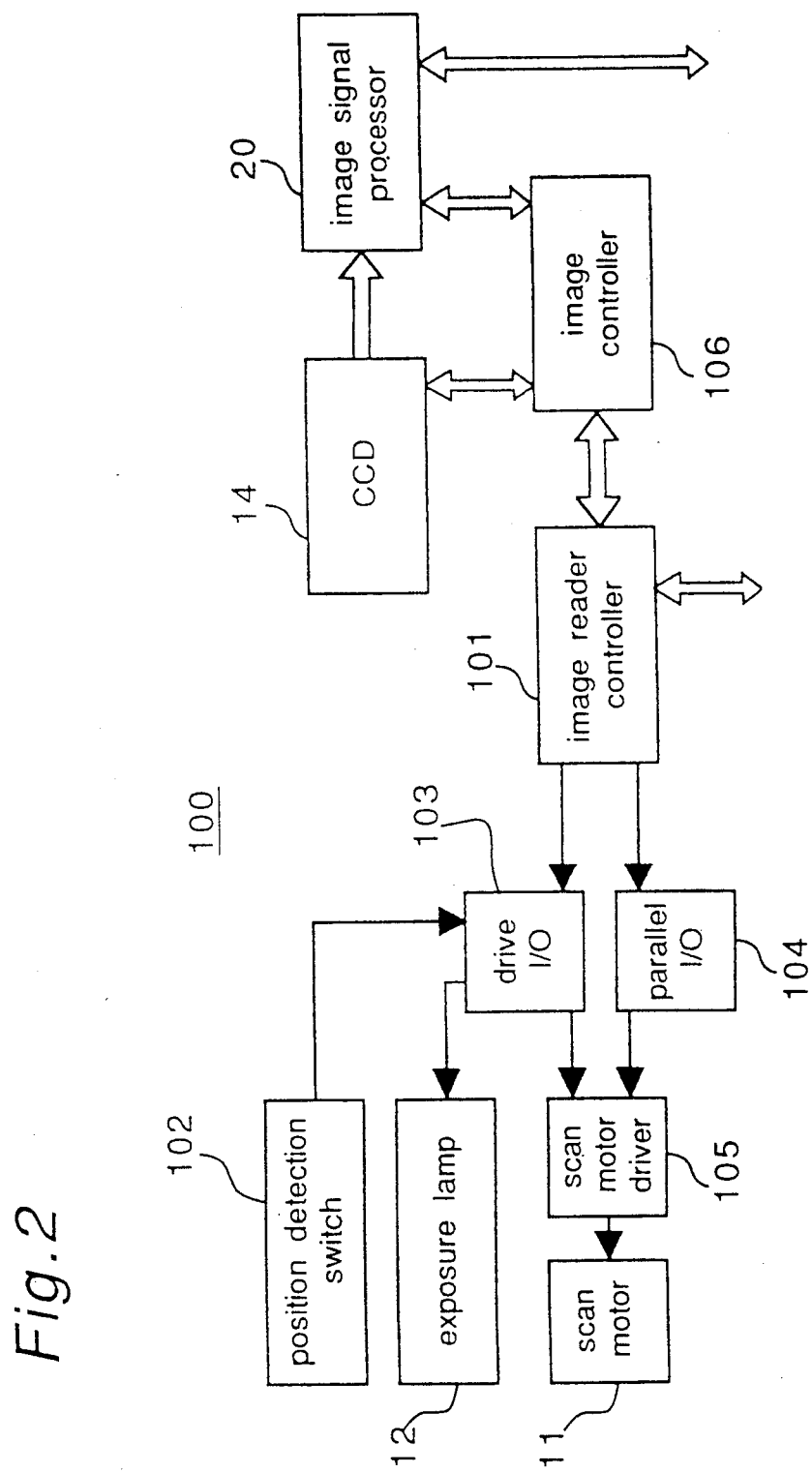
FIG. 2 is a block diagram of the control system of the image reader of the copying machine.

FIGS. 2 shows a whole block diagram of the control system of the digital color copying machine of FIG. 1. The image reader 100 is controlled by an image reader controller 101. The controller 101 controls the exposure lamp 12 via a drive I/O 103 according to a position signal from a position detection switch 102 which indicates the position of a document on the platen 15 and controls a scan motor driver 105 via a drive I/O interface 103 and a parallel I/O interface 104. The scan motor 11 is driven by the scan motor driver 105.

On the other hand, the image reader controller 101 is connected via a bus to an image controller 106. The image controller 106 is connected to the CCD color image sensor 14 and the image signal processor 20. The image signal from the CCD color image sensor 14 is processed by the image signal processor 20.

Figure 3:
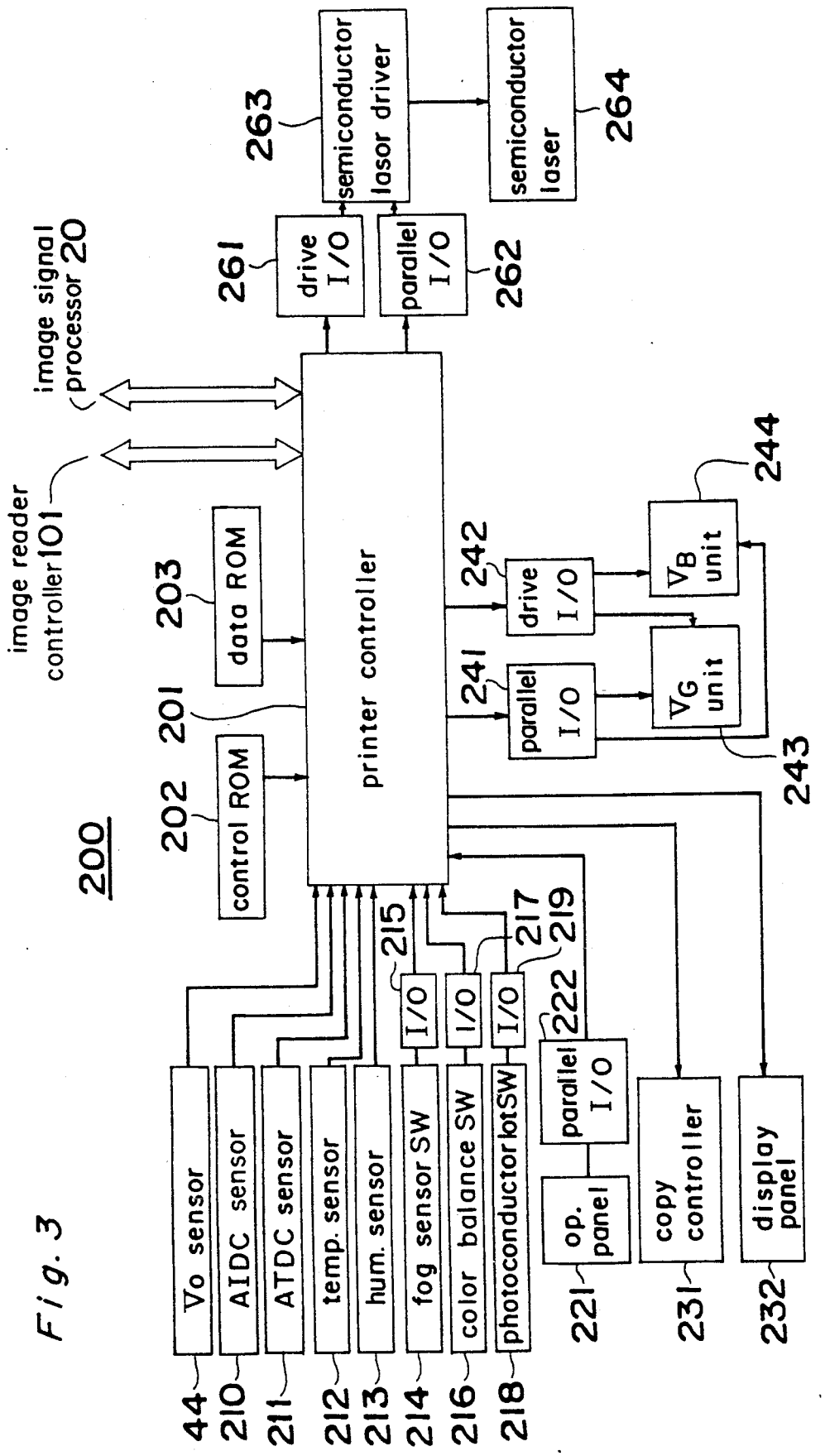
FIG. 3 is a block diagram of the control system of the printer of the copying machine.

FIG. 3 shows a block diagram of printer control system of the main body 200. The main body 200 includes a printer controller 201 for controlling the copying action. The printer controller 201 is connected to a control ROM 202 storing a control program and a data ROM 203 storing various data such as the gamma correction tables. The printer controller 201 controls a copy controller 231 and the display panel 232 according to the data from the operational panel 221 and the data ROM 203 under the contents of the control ROM 202.

The printer controller 201 receives analog signals from various sensors which includes the $V_o$ sensor 44 to detect the surface potential $V_o$ of the photoconductor drum 41, the AIDC sensor 210 to detect the amount of adhered toners of the standard toner image, ATDC sensors 211 to detect the toner density in the developers 45a–45d, a temperature sensor 212 and a humidity sensor 213. The printer controller 201 also connected via I/Os 215, 217 and 219 to a 2-bit fog input switch 214 for setting the fog remove level, to four 4-bit color balance switches 216 for setting the color balance level of each color and to a 3-bit photoconductor lot switch 218, respectively. The fog input value is set by a service man or by a user with a DIP switch. However, it may be inputted with an operational panel 221.

Figure 7:
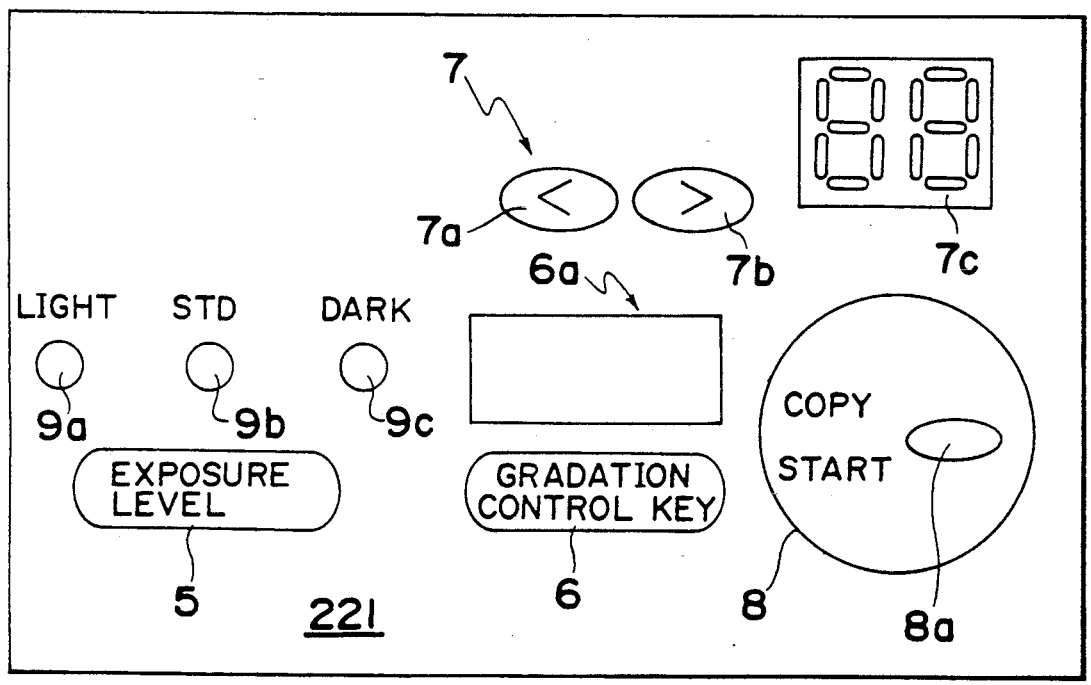
FIG. 7 is a graph of the image reproduction density when the transfer efficiency changes.

Various data inputted with the operational panel 221 shown in FIG. 7 are sent to the printer controller 201 via a parallel I/O 222. An exposure level key 5 changes the exposure level at three steps. A gradation control key 6 is used to reproduce an image of a desired gradation. The gradation selected with the gradation control key 6 is displayed in a gradation display 6a. A copy number key 7 sets the number of the sheets of paper to be copied and it consists of an up key 7a and an down key 7b. The number set by the key 7 is displayed in a display 7c. A start key 8 starts a copy action, and a light-emitting diode 8a is turned on in a copy action.

Light-emitting diodes 9a-9c display the level set by the exposure level key 5.

In FIG. 3, the printer controller 201 controls the print controller 231 and the display panel 232 according to the data of the sensors 44, 210-213, the operational panel 221, the input switches 214, 126 and 218 and the data ROM 203. Further, the printer controller 201 controls via parallel I/O 241 and drive I/O 242 a high voltage unit 243 for generating the grid voltage $V_G$ of the discharge electrode of the sensitizing charger 43 and a high voltage unit 244 for generating for the developer bias voltage VB of the developer 45a-45d.

The print head controller 202 is connected to the image signal processor 202 of the image reader 100 via an image bus and performs the gamma correction on the basis of the image signal received via the image data bus with reference to a gamma correction table stored in the data ROM 203. Then, the print head controller 202 controls the semiconductor laser controller 263 via the drive I/O 261 and a parallel I/O 262, and the semiconductor laser controller 263 controls the emitting of the semiconductor laser 264. Further, the printer controller 101 is synchronized with the image signal processor 20 to each other via the buses.

(B) Image signal Processing

Figure 4:
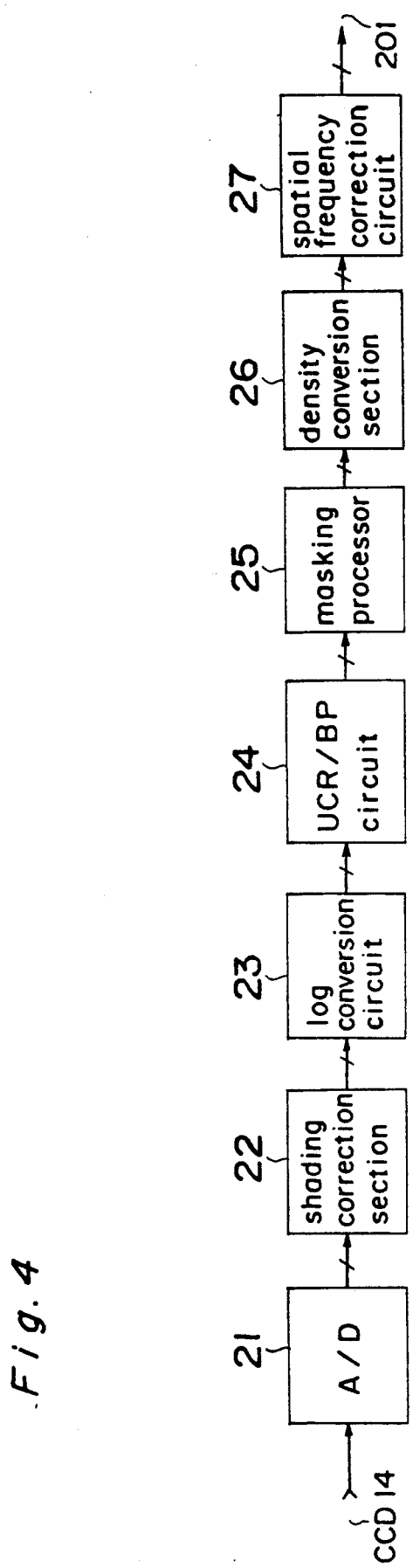
FIG. 4 is a block diagram of an image signal processor.

As shown in FIG. 4 of the image data processor 20, the output image received from the CCD color image sensor 14 is processed to send gradation data.

In the image data processor 20, the image signal converted to electrical signals by the CCD color image sensor 14 is converted to multi-value digital image data of R, G, B in an A/D converter 21. The converted image data is subjected to the shading correction in the shading correction circuit 22. The data corrected in the shading correction circuit 22 is data of reflection light from a document and it is converted logarithmically to the density data of an actual image in the log conversion circuit 23. A under color remove/black paint circuit 24 removes excess black and generates a true black data K from the R, G, B data. In a masking circuit 25, the data R, G, B of three colors are converted to data Y, M, C of cyan, magenta and yellow. The converted Y, M, C data are multiplied with prescribed coefficients for density correction in a density correction circuit 26. Then, the spatial frequency correction processing is performed in a spatial frequency correction circuit 27 and the resultant data are sent to the printer controller 201.

FIG. 5 shows image data processing in the printer controller 201. 8-bit image data received from the image signal processor 20 are received through an interface 251 and are stored in a first-in first-out (FIFO) memory 252. The FIFO memory 252 is a line buffer memory which can store gradation data of a prescribed line number in the main scan direction and it buffers the difference of the clock frequencies between the image reader 10 and the printer 200. The data in the FIFO memory 252 are inputted to a gamma correction section 253. As will be explained later, gamma correction data in the data ROM 203 are received from the laser exposure controller 220, and the gamma correction section corrects the input data (ID) to send an output level to a D/A converter 254.

The D/A converter 254 converts the digital input data to an analog voltage, which is sent through an amplifier 255, a variable attenuator 266, the drive I/O 261 and the semiconductor laser (LD) driver 263 to the laser diode 264 which emits a light of an intensity in correspondence to the digital data. The attenuation in the variable attenuator 266 can be changed at eight steps so as to change the power of the laser beam at eight steps.

Further, clock generators 270a and 270b generate clock signals of different clock frequency to each other. Each clock signal is output via an "a" side or "b" side of a switch SW to the semiconductor laser (LD) driver 263 via parallel I/O 262. The switch SW is changed according to a clock switch signal outputted by the laser exposure controller 220 to select the clock signals for the semiconductor laser driver 263.

Figure 6:
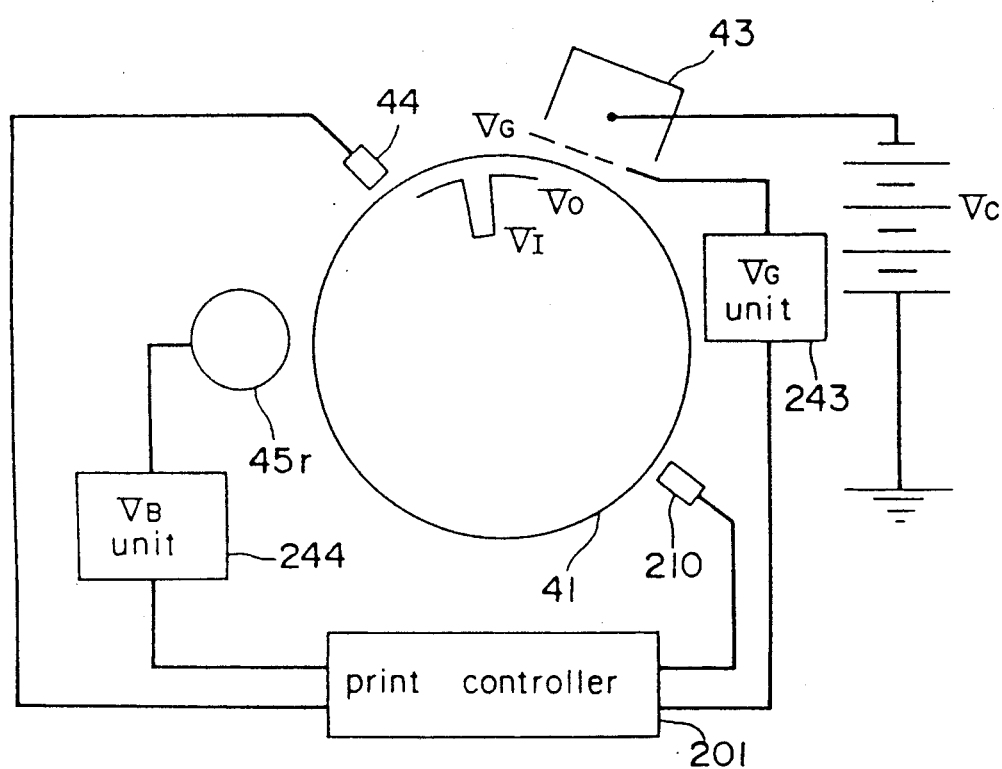
FIG. 6 is a schematic diagram of image forming section including a photoconductor drum and a developer.

(C) Automatic Density Control and Gradation Correction in Electrophotographic Process of Inversion Development A conventional density control is explained below with reference to FIG. 6 of a schematic diagram of image forming section including the photoconductor drum 41 and a roller of the developer 45r. As shown in FIG. 6, the sensitizing charger 43 of discharge potential (grid potential) $V_G$ is arranged opposite to the photoconductor 41. The negative grid potential $V_G$ is applied to the grid of the charger 43 by the grid potential generator 243. The surface potential $V_o$ of the photoconductor just after the sensitization before the exposure can be take almost equal to the grid potential $V_G$. Therefore, the surface potential $V_o$ can be controlled by the grid potential $V_G$, and the surface potential $V_o$ is detected by the $V_o$ sensor 44 which is an electrometer.

First, before the exposure of laser beam, a negative surface potential $V_o$ is applied to the photoconductor drum 41 by the sensitizing charger 43, while a negative, lower bias voltage $V_B$ ($|V_B| < |V_o|$) is applied to the roller of the developer 45r by the development bias potential generator 244. That is, the surface potential of the development sleeve is $V_B$.

A laser beam exposes the photoconductor, and the potential at the exposure position decreases from the surface potential $V_o$ to an attenuation potential of the electrostatic latent image or the surface potential $V_I$ just after the laser exposure. The surface potential at the maximum exposure light quantity is called as $V_{Im}$ hereinafter.

If the attenuation potential $V_I$ becomes lower than the development bias potential $V_B$, the toners carried to the surface of the sleeve of the developer 45r adhere to the photoconductor drum 41. It is not good that the difference between the surface potential $V_o$ and the development bias potential $V_B$ is too large or too small. Further, the adhered amount of toners increases with increasing the development voltage $\Delta V = |V_B - V_I|$. On the other hand, the attenuation potential $V_I$ changes with the surface potential $V_o$ even at the same exposure light quantity. Then, for example, the surface potential $V_o$ and the development bias potential $V_B$ are changed by keeping the difference between the surface potential $V_o$ and the development bias potential $V_B$ constant. Then, the difference between the development bias potential $V_B$ and the attenuation potential $V_I$ changes or the adhered amount of toners can be changed to control the density.

This kind of density control is performed to keep the maximum density constant by changing the surface potential $V_o$ and the development bias potential $V_B$ manually or automatically.

In the automatic density control, a standard toner image as a standard for the density control is first formed on the surface of the photoconductor drum 41, and the image reproduction density of the standard toner image is measured by detecting the quantity of reflection light with the AIDC sensor 210 arranged near the photoconductor drum 41. The value detected by the AIDC sensor 210 is received by a printer controller 201, which drives the $V_G$ generator 243 and the $V_B$ generator 244 according to the detected value with a prescribed value. Previously, the density control is performed by keeping the difference between the surface potential $V_o$ and the development bias potential $V_B$ constant in order to prevent a fog in the background of an image and to prevent the adhesion of carriers of two-component developer to the photoconductor.

The automatic density control and gradation correction of the present embodiment is based on the following consideration of the change of the gamma correction when the density is controlled according to the surface potential $V_o$ and the development bias potential $V_B$.

Figure 8:
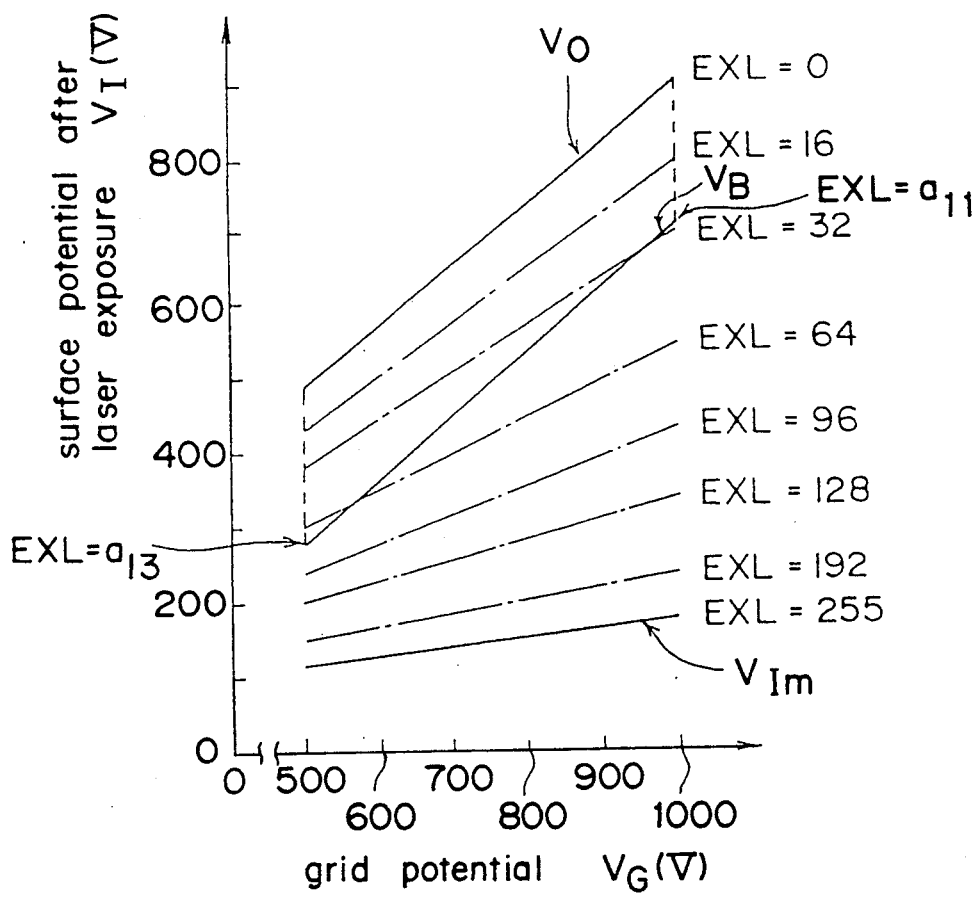
FIG. 8 is a graph of the surface potential $V_I$ just after the laser exposure and the development bias potential $V_B$ plotted against the grid potential $V_G$ when the density is controlled by keeping the difference between the surface potential $V_o$ and the development bias potential $V_B$ constant.

FIG. 8 shows a graph of the surface potential $V_I$ just after the laser exposure and the development bias potential $V_B$ plotted against the grid potential $V_G$ when the density is controlled by keeping the difference between the surface potential $V_o$ and the development bias potential $V_B$ constant. In FIG. 8, a region between a line of the surface potential $V_o$ before the laser exposure or the surface potential when the laser exposure level EXL is zero and another line of the development bias potential $V_B$ is a region for removing a fog when the laser exposure level EXL is zero. On the other hand, a region between the line of the development bias potential $V_B$ and a third line of the surface potential $V_{Im}$ when the laser exposure level EXL is 255 is a development region wherein an image is formed on a paper.

Figure 9:
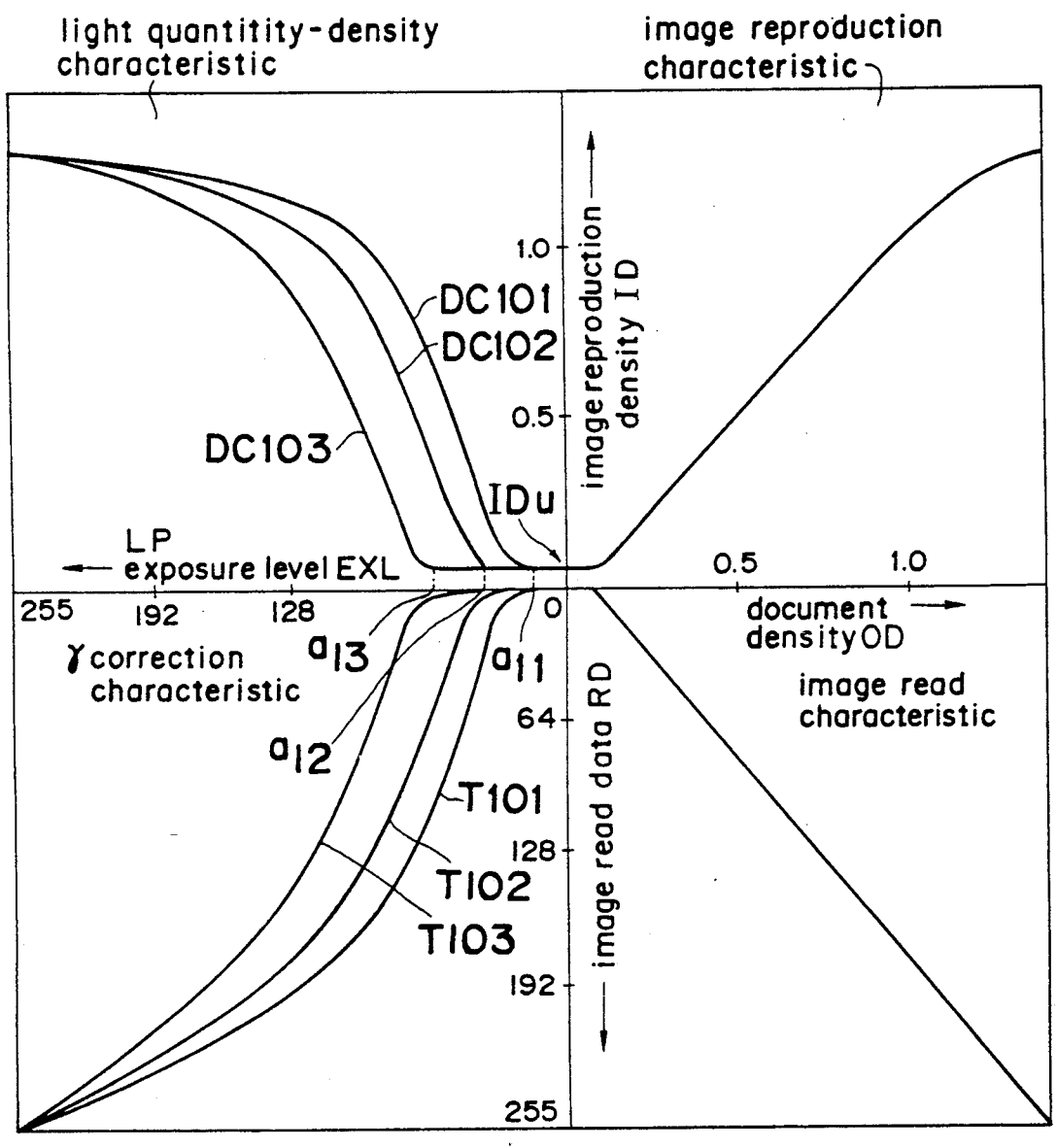
FIG. 9 is a graph of the sensitometry of a copying machine.

FIG. 9 shows a graph of the sensitometry of a prior art copying machine wherein the development bias voltage $V_B$ is set as shown in FIG. 8. The sensitometry includes a light quantity-density characteristic, an image reproduction characteristic, a gamma correction characteristic and an image read characteristic.

In FIG. 9, the image reproduction density ID is represented as the absolute density added with the density IDu of the background. (The reflection density of a white plate of calcium carbonate is set to be zero.) When the document density OD is zero, the density IDu of the background of a paper is measured. A characteristic DC101 in the light quantity-density characteristic designates a characteristic when the grid potential $V_G$ is 570 V and the development bias potential $V_B$ is 345 V, another characteristic DC102 designates a characteristic when the grid potential $V_G$ is 700 V and the development bias potential $V_B$ is 450 V, while a third characteristic DC103 designates a characteristic when the grid potential $V_G$ is 900 V and the development bias potential $V_B$ is 620 V. Gamma characteristics T101, T102 and T103 can be prepared beforehand, as explained above, according to the light quantity-density characteristic DC101, DC102 and DC103 so as to realize the image reproduction characteristic shown in the first quadrant.

In a previous digital copying machine wherein the density is controlled by keeping the difference between the surface potential $V_o$ and the development bias potential $V_B$ to be 200 V, FIGS. 8 and 9 show the following points (1)-(3).

(1) The initial light quantity at which the image is reproduced first when the exposure light quantity is increased from zero level is determined if a combination of the surface potential $V_o$ of the photoconductor and the development bias potential $V_B$ is determined.

(2) The initial light quantity becomes larger when larger values of the surface potential $V_o$ and the development bias potential $V_B$ are combined, and the change of the initial light quantity is very large.

(3) The gamma correction characteristic varies with the initial light quantity. As shown in FIGS. 8 and 9, if $V_o-V_B=200$ V, the initial light quantity increases largely from $a_{11}$=about 30 V to $a_{13}$=about 70 V if the grid voltage $V_G$ is changed from 500 V to 1000 V.

Though only three gamma correction tables T101, T102 and T103 are shown in FIG. 9, the investigation of many gamma correction characteristics show that the gamma correction characteristics align in parallel as shifted by a change of the initial light quantity due to the selection of $V_G$ and $V_B$.

Figure 10:
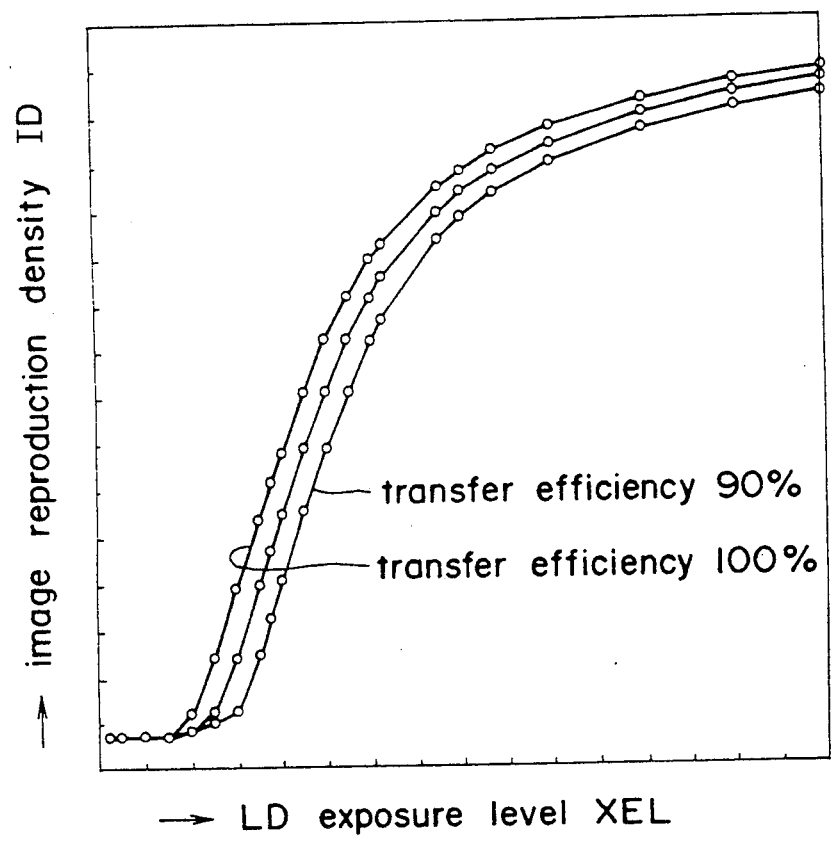
FIG. 10 is a plan view of an operational panel.

On the other hand, the transfer efficiency varies with the temperature and the humidity. FIG. 10 shows the image reproduction density (ID) plotted against the exposure level (EXL) when the transfer efficiency changes. It is clear that the image reproduction density shifts in parallel against the change in transfer efficiency. Therefore, the gamma correction characteristic also shifts in parallel with the humidity in correspondence with the change in image reproduction density.

The present embodiment takes notice of the change of gamma correction characteristic shown in FIGS. 9 and 10. A shift data due to the change in the gamma correction characteristic is added to a gamma correction table, and the gamma correction characteristic is shifted in parallel for each combination of the surface potential $V_o$ before exposure and the development bias voltage $V_B$. The combination is selected so that the difference between the surface potential $V_o$ and the development bias voltage $V_B$ is kept substantially constant.

(D) Examples of the Automatic Density Control and Gradation Correction

The above-mentioned automatic control will be explained below in detail.

Table 1 shows an example of combinations ($V_B$, $V_o$) of the bias voltage $V_B$ of the developer 45a-45d and the surface potential $V_o$ on the photoconductor drum 41. Though the development voltage $V_B$ is negative in this embodiment, it is expressed as absolute value in Table 1 for simplicity.

In Table 1, "detected amount of adhered toners" is the amount of adhered toners measured with the AIDC sensor 210 on the standard toner image formed in the standard image-forming conditions, and "development efficiency" is defined as a ratio of the detected amount of toners to the development voltage. Further, the development voltage $\Delta Vd$ needed to realize a desired amount of adhered toners, called as prescribed development voltage, is defined as a ratio of the desired amount to the development efficiency. In this embodiment, the desired amount of adhered toners is 1 mg/cm$^2$, and Table 1 shows the prescribed development voltage $\Delta Vd$ for the desired amount of adhered toners.

TABLE 1

| density detection level LBA | detected amount of adhered toners [mg/cm²] | development efficiency | ΔVd [V] | $V_G$ [V] | $V_o$ [V] | $V_B$ [V] | $V_{fm}$ [V] | γ correction shift value G |
| --- | --- | --- | --- | --- | --- | --- | --- | --- |
| 0 | 0.625 | 0.00625 | 160 | 500 | 480 | 280 | 120 | +20 |
| 1 | 0.510 | 0.00510 | 195 | 540 | 520 | 320 | 125 | +16 |
| 2 | 0.455 | 0.00455 | 220 | 570 | 545 | 345 | 125 | +12 |
| 3 | 0.410 | 0.00410 | 245 | 600 | 570 | 370 | 125 | +8 |
| 4 | 0.385 | 0.00385 | 260 | 630 | 590 | 390 | 130 | +4 |
| 5 | 0.345 | 0.00345 | 290 | 660 | 620 | 420 | 130 | 0 |
| 6 | 0.310 | 0.00310 | 320 | 700 | 650 | 450 | 130 | −4 |
| 7 | 0.280 | 0.00280 | 355 | 740 | 690 | 490 | 135 | −7 |
| 8 | 0.260 | 0.00260 | 385 | 780 | 720 | 520 | 135 | −11 |
| 9 | 0.240 | 0.00240 | 420 | 830 | 760 | 560 | 140 | −14 |
| 10 | 0.210 | 0.00210 | 480 | 900 | 820 | 620 | 140 | −17 |
| 11 | 0.180 | 0.00180 | 560 | 1000 | 910 | 710 | 150 | −20 |

Figure 11:
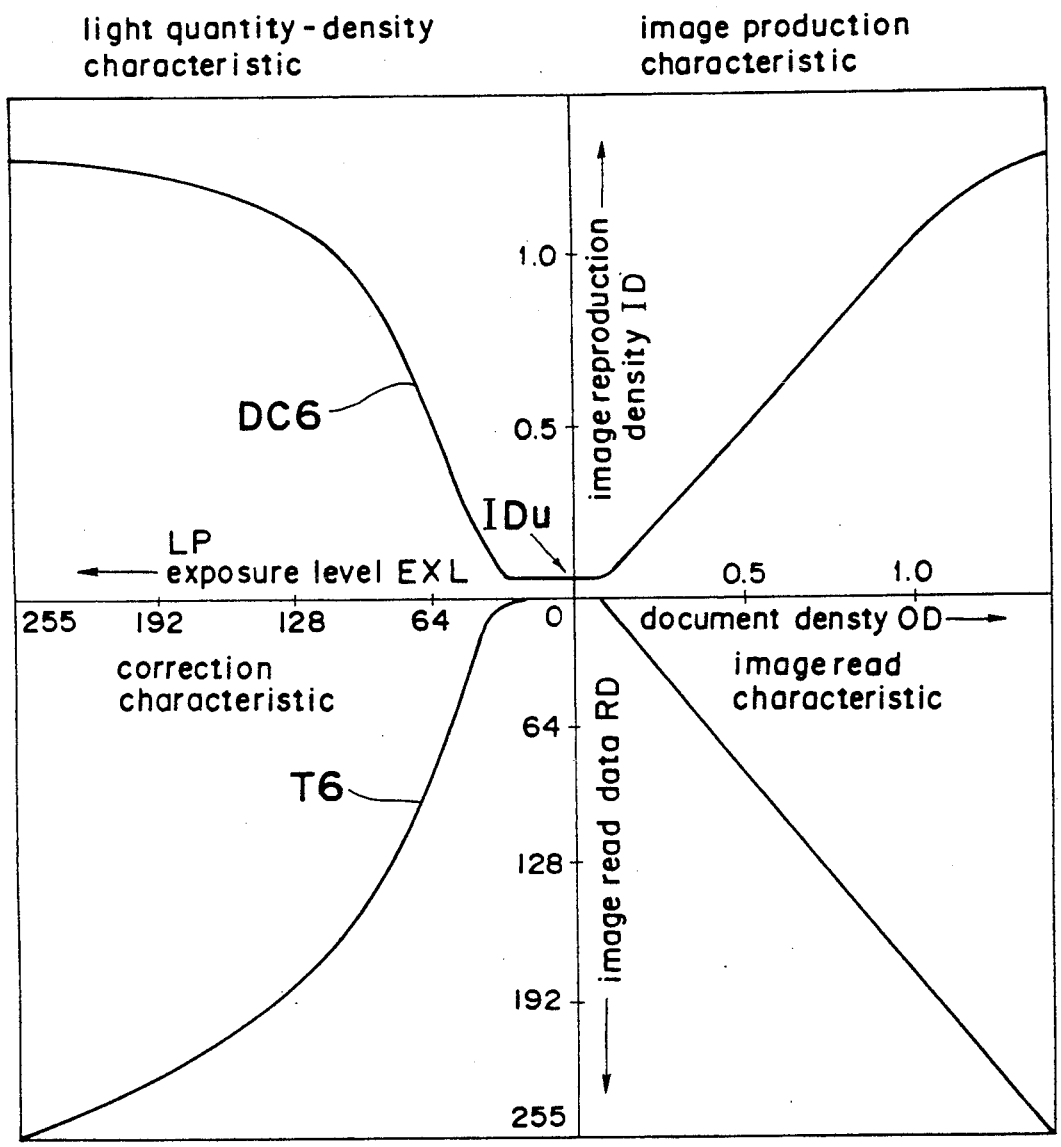
FIG. 11 is a diagram of the sensitometry of the gamma correction characteristic stored in the data ROM.

As shown in Table 1, the detection value of the AIDC sensor 210 is classified to density detection levels (LBA) 0-11 displayed in the left-most column according to the amplitude of the detection value. According to the density detection level LBA, the grid potential $V_G$ is changed from 500 V to 1000 V and the development bias voltage $V_B$ is changed from 280 to 710 V, while a shift value G is sent in order to prepare a gamma correction table improved for the gamma characteristics at low densities. In this embodiment, only one standard gamma correction table in correspondence to LBA level 7, for example T6 displayed in the sensitometry in FIG. 11, is stored in the data ROM 203. In other words, all gamma correction tables in correspondence to the LBA levels are not stored in the data ROM 203. Gamma correction tables for the other LBA levels are obtained by adding the shift value to the standard gamma correction table T6.

The density control of the copying machine will be explained below.

In the electrophotographic process of inversion development system of the present invention, the image reproduction density is controlled automatically according to the surface potential $V_o$ and the development bias voltage $V_B$. In this embodiment, the surface potential $V_o$ is controlled by the grid potential $V_G$. However, it may be controlled by other means.

The amount of adhered toners at a prescribed exposure light quantity is detected by the AIDC sensor 210. A standard toner image is formed in the image forming conditions ($V_G=600$ V, $V_B=400$ V, exposure level EXL=120). In this conditions, the surface potential $V_I$ after exposure is 300 V and the development voltage $\Delta V = |V_B - V_I| = 100$ V. The detection signal of the standard toner image by the AIDC sensor 210 is sent to the printer controller 201 which calculates the adhered amount of toners according to the detection signal or the density of the standard toner image is measured from the detected amount of adhered toners.

Then, the automatic density control is performed by changing the surface potential $V_o$ (or the grid potential $V_G$) and the development bias potential $V_B$ according to the detected signal in order to keep the adhered amount of toners constant at the maximum density level.

The gamma amendment coefficient (shift value) G is outputted according to the selected combination of ($V_o$, $V_B$) for the gradation amendment data. The gamma correction coefficient G is a shift value against the standard gamma correction table of LBA level 7 (T6 in FIG. 11).

The shift value G means the difference of the initial light quantity for image reproduction.

Figure 12:
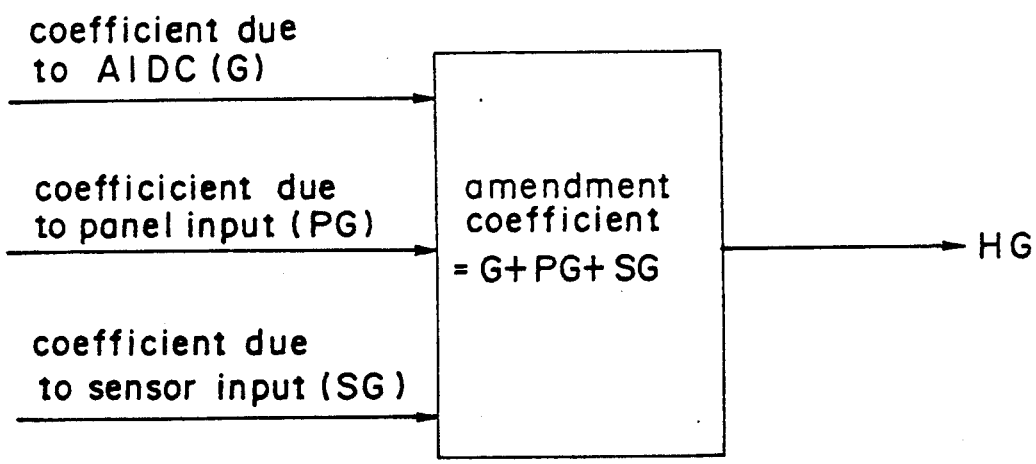
FIG. 12 is a diagram to explain the calculation of the gamma correction coefficient.

Next, the gamma amendment processing is explained. In the present embodiment, the gamma correction table is made finally by adding an amendment coefficient PG of a gradation control switch 225 or the like or an amendment coefficient SG due to the outputs of the temperature sensor 212 and the humidity sensor 213 to above-mentioned the gamma correction coefficient G. That is, as shown in FIG. 12, the amendment coefficient HG for amending the gamma correction table is calculated by adding a signal PG and a signal SG to the gamma amendment coefficient G. The signal PG is determined according to the selection with the gradation control key 6 in the operational panel 221 (FIG. 7) by a user or with a DIP switch or the like by a service man or to the addition of the two selections. The signal SG is determined according to the $V_o$ sensor 44 or to the temperature sensor 212 and the humidity sensor 213 or to both sensors.

Table 2 shows the amendment coefficient table according to the surface potential $V_o$.

TABLE 2

| amendment coefficient SG | |
| --- | --- |
| detection value | amendment coefficient |
| 530 | +8 |
| 540 | +6 |
| 550 | +4 |
| 560 | +2 |
| 570 | 0 |
| 580 | −2 |
| 590 | −4 |
| 600 | −6 |
| 610 | −7 |

Table 3 shows the amendment coefficient table according to the temperature and humidity signals of the temperature and humidity sensors 212 and 213.

TABLE 3

| | amendment data SG | | | | |
| --- | --- | --- | --- | --- | --- |
| | temperature | | | | |
| humidity | 10° C. | 18° C. | 25° C. | 32° C. | 40° C. |
| 90% | 0 | +2 | +4 | +8 | +12 |
| 70 | 0 | 0 | +2 | +4 | +8 |
| 50 | −2 | 0 | 0 | +2 | +4 |
| 30 | −3 | −2 | 0 | 0 | +2 |
| 10 | −4 | −3 | −2 | 0 | 0 |

In FIG. 12, if the panel input level (PG) and the sensor input level (SG) are standard values, the amendment coefficient is selected to be zero. The sign of the amendment according to the panel input level (PG) is plus in a side where a fog appears in the reproduction image, while it is minus in the other side where a part of image vanishes in the reproduction image. On the other hand, the sign of the amendment coefficient according to the sensor input level (SG) is plus in a side of higher surface potential $V_o$, while it is minus in the other side of lower surface potential Vo. Further, the sign of the amendment coefficient is plus in a side of higher humidity, while it is minus in the other side of lower humidity. Still further, the sign of the amendment coefficient is minus in a side of higher temperature, while it is plus in the other side of lower temperature.

The above-mentioned selection of amendment coefficient has meanings (1)-(5) explained below.

(1) The selection of amendment coefficient with a panel by a user

The reproducibility at low densities can be controlled according to the liking of a user or to the kind of a document.

(2) The selection of amendment coefficient with a DIP switch by a service man.

The difference of gradation due to factors inherent to each machine such as the lot scattering of sensors, the print head, the development bias voltage generator 244 or the sensitivity scattering of the photoconductor drum 41 can be controlled by a service man. The initial light quantity of image reproduction decreases with increasing a value which represent a gamma correction table, so that the sign of the amendment coefficient of the pulse input level (PG) is selected to be plus if a fog is desired while to be minus if the background is desired to be vanished.

(3) The selection of amendment coefficient according to the $V_o$ detection value with the surface potential sensor.

Figure 13:
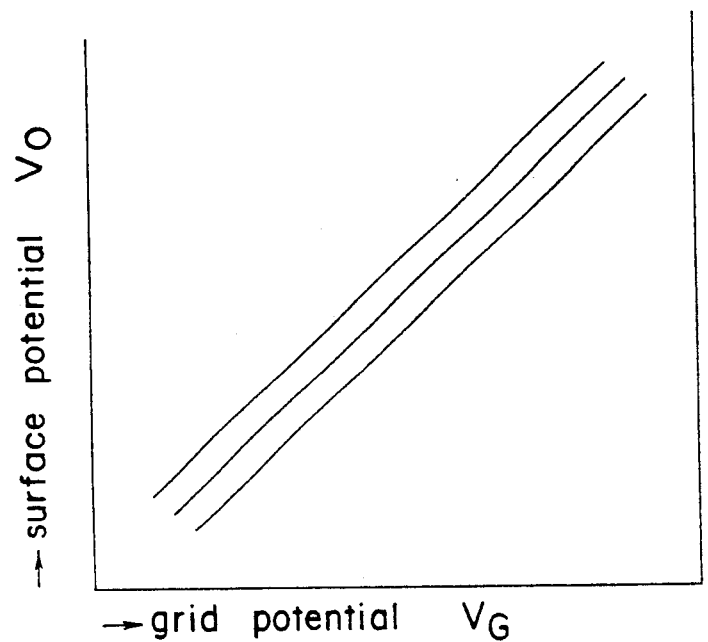
FIG. 13 is a diagram of the surface potential $V_o$ plotted against the grid potential $V_G$.

The difference of the surface potential $V_o$ detected in the AIDC measurement with use of the standard $V_G$ from the standard value is detected. As shown in FIG. 13, the surface potential $V_o$ changes against the grid potential $V_G$ so that a shift value is constant. Then, for a grid potential $V_G$ selected after the AIDC processing, the shift is the same as that of the surface potential $V_o$ for the standard grid potential $V_G$. As to the change of the surface potential $V_o$, if the surface potential $V_o$ increases, the gap $V_o-V_B$ increases, the initial light quantity increases and an image vanishes at low densities. Therefore, the sign of the amendment coefficient is selected to be plus for higher $V_o$, while minus for lower $V_o$.

(4) The selection of amendment coefficient according to the detected temperature with the temperature sensor.

Figure 14:
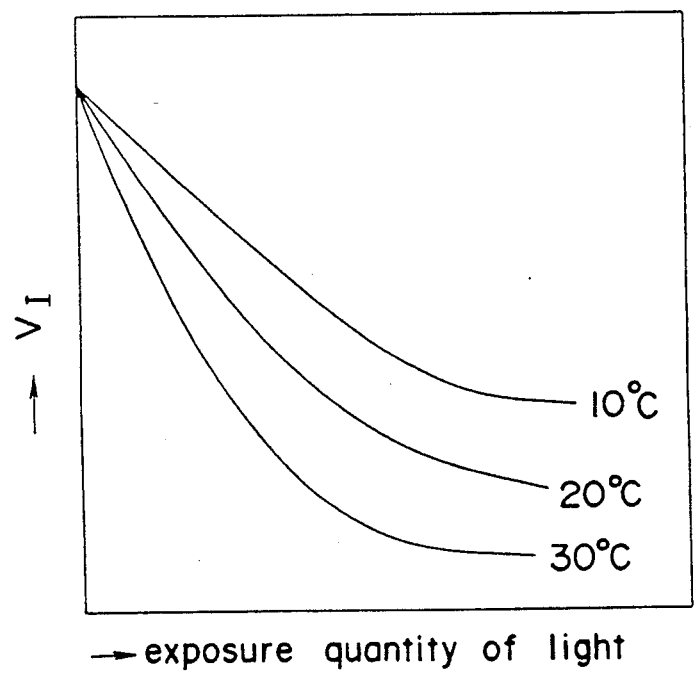
FIG. 14 is a diagram for explaining the change of sensitivity of photoconductor against humidity.

It is known that the photosensitive characteristic of the photoconductor drum 41 depends on temperature. As shown in FIG. 14, the sensitivity increases and the initial light quantity decreases with increasing temperature.

Therefore, the sign of the amendment coefficient is plus when the temperature is high, while minus when the temperature is low.

(5) The selection of amendment coefficient according to the detected humidity with the humidity sensor.

The transfer efficiency decreases with increasing humidity, and this is the same state when the initial light quantity increases. Therefore, the sign of the amendment coefficient is selected to be plus when the humidity is high, and it is set to be zero when the humidity is low.

(E) Flow of Printer Control

Figure 15:
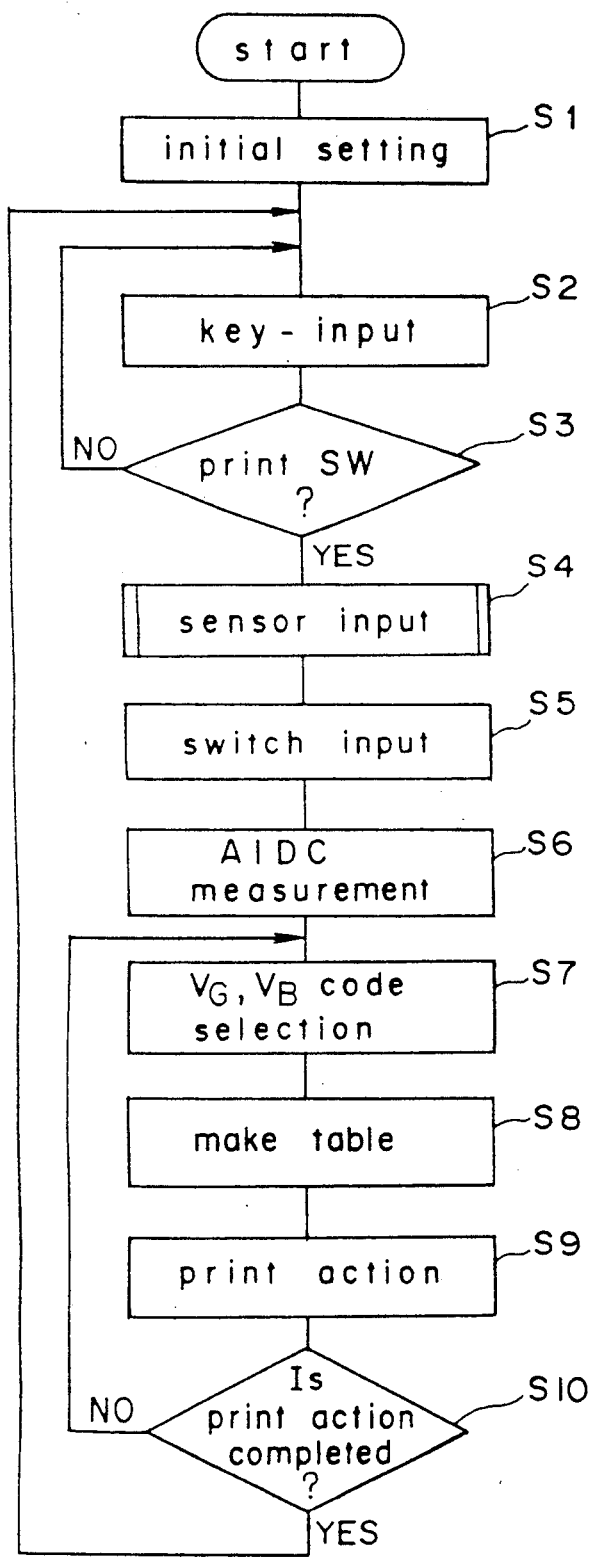
FIG. 15 is a flowchart of the control of digital color copying machine.

FIG. 15 shows a control flow of the printer controller 201.

At step S1, the initialization of the printer controller 201 is performed, and at step S2, the input processing of the operational panel 221 is performed. Next, at step S3, it is decided if the start key 8 in the operational panel 221 is pressed or not. If it is decided that the start key 8 is not pressed (NO at step S3), the flow returns to step S2 again, and waits until the start key 8 is pressed.

Figure 16:
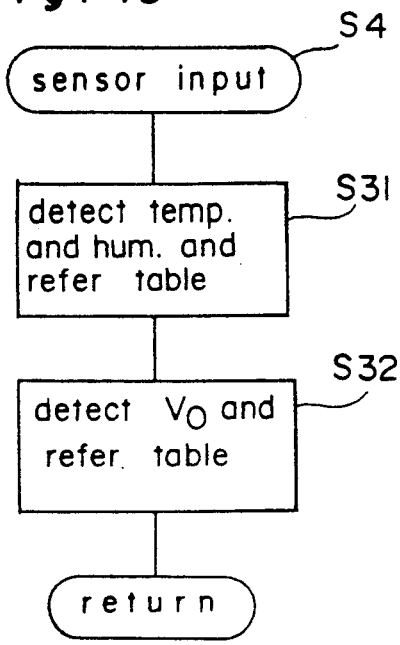
FIG. 16 is a flowchart of the sensor input processing.

If it is decided at step S3 that the start key 8 is pressed, the sensor input processing is performed at step S4. In this processing shown in detail in FIG. 16, the outputs of the temperature sensor 212 and the humidity sensor 213 are received and Table 3 is referred to determine the amendment coefficient (step S31). Next, the input of the $V_o$ sensor 44 is received and Table 2 is referred to determine the amendment coefficient (step S32). The amendment data are stored in the RAM of the printer controller 201. Then the flow returns to the main flow.

In FIG. 15, at step S5 of the switch input processing, the correction coefficient in correspondence to the input signal from the DIP switch and the gradation control switch 6 of the operational panel 221 shown in FIG. 7 is stored in the RAM in the printer controller 201.

Then, at step S6, the AIDC processing is performed. In the AIDC processing, after the grid potential $V_G$ and the development bias potential $V_B$ are set to be prescribed standard values, a toner image of a standard image pattern is formed on the photoconductor drum 41 and the amount of adhered toners of the image is measured with the AIDC sensor 210 and it is stored in the RAM in the printer controller 201.

Next, at step S7, the density detection level LBA is selected according to the amount of adhered amount measured at step S6, and the grid potential $V_G$, the development bias potential $V_B$ and the shift value G are also selected according to the density detection level LBA.

Next, at step S8, the correction code PG received from the operational panel 221 and the correction coefficient SG due to the sensor inputs are added to the shift value G to obtain an amendment coefficient HG, and the gamma correction table is made by adding the amendment coefficient HG to the standard gamma correction table.

At step S9, the known copy action is carried out by using the selected grid potential $V_G$, the selected bias potential $V_B$ and the gamma correction table.

Then, it is decided if the copy action completes or not at step S10. If the copy action is decided to complete, the flow returns to step S2, otherwise the flow returns to step S7.

As explained above, not the all gamma correction tables, but only the standard gamma correction table is stored in the data ROM 203. Therefore, the memory capacity can be decreased, while the gradation control can be performed simply and surely.

Further, the gamma amendment can be adjusted according to the scattering of $V_o$ of photoconductor, the change of transfer efficiency, the sensitivity change of photoconductor, the liking of a user or the like only by adding an amendment coefficient to the standard gamma correction table, and the gradation characteristic can be controlled against such factors at the same time.

If the standard gamma correction table is shifted according to the parameters of factors which affect the gamma characteristic for amendment of the standard gamma correction table, as explained above, the reproducibility of an image deteriorates at high and low density regions. The improvement of the reproducibility at high and low density regions will be explained below.

Figure 17:
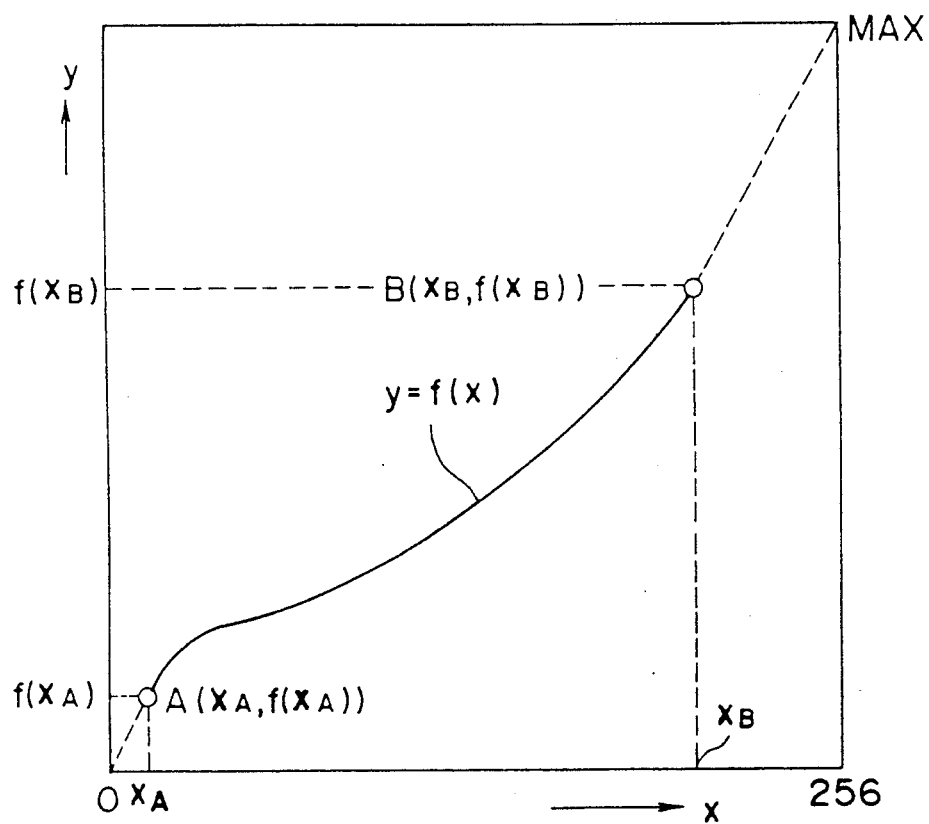
FIG. 17 is a diagram of linear approximation.

As shown in FIG. 17, the data ROM 203 stores the standard gamma correction table $y = f(x)$ in a range between $x_A$ and $x_B$ of laser exposure level EXL, and in the range between $x_A$ and $x_B$, the standard gamma correction table $f(x)$ is shifted by adding the amendment coefficient HG to the table $f(x)$ in correspondence to the changes of the parameters which affect the gamma correction.

On the other hand, in the low density region ($0 \leq x \leq x_A$) and in the high density region ($x_B \leq x$), the amended gamma correction table is approximated as a linear line. In the memory, only the data for expressing the linear lines are stored.

That is, in the low density region ($0 \leq x \leq x_A$), the amended gamma correction table is approximated by the following Equation (1).

$$y = x(f(x_A) + HG)/x_A \cdot (x = 0 - x_A) \quad (1)$$

Next, in the intermediate region ($x_A \leq x \leq x_B$), the gamma correction table is approximated by the following Equation (2).

$$y = f(x) + HG \cdot (x = x_A - x_B) \quad (2)$$

Finally, in the high density region ($x_B \leq x \leq 256$), the amended gamma correction table is approximated by the following Equation (3).

$$y = f(x_B) + HG + (x - x_A)(256 - f(x_B))/(256 - x_B) \cdot (x = x_B - 256) \quad (3)$$

By using the linear approximation in the low and high density regions, the difference from the ideal gamma correction characteristic becomes small and the gamma gradation reproducibility is improved.

Instead of the linear approximation, other approximation such as broken line approximations which can decrease the memory capacity can be used. In this case, only the data for the approximation equation are stored.

Figure 18:
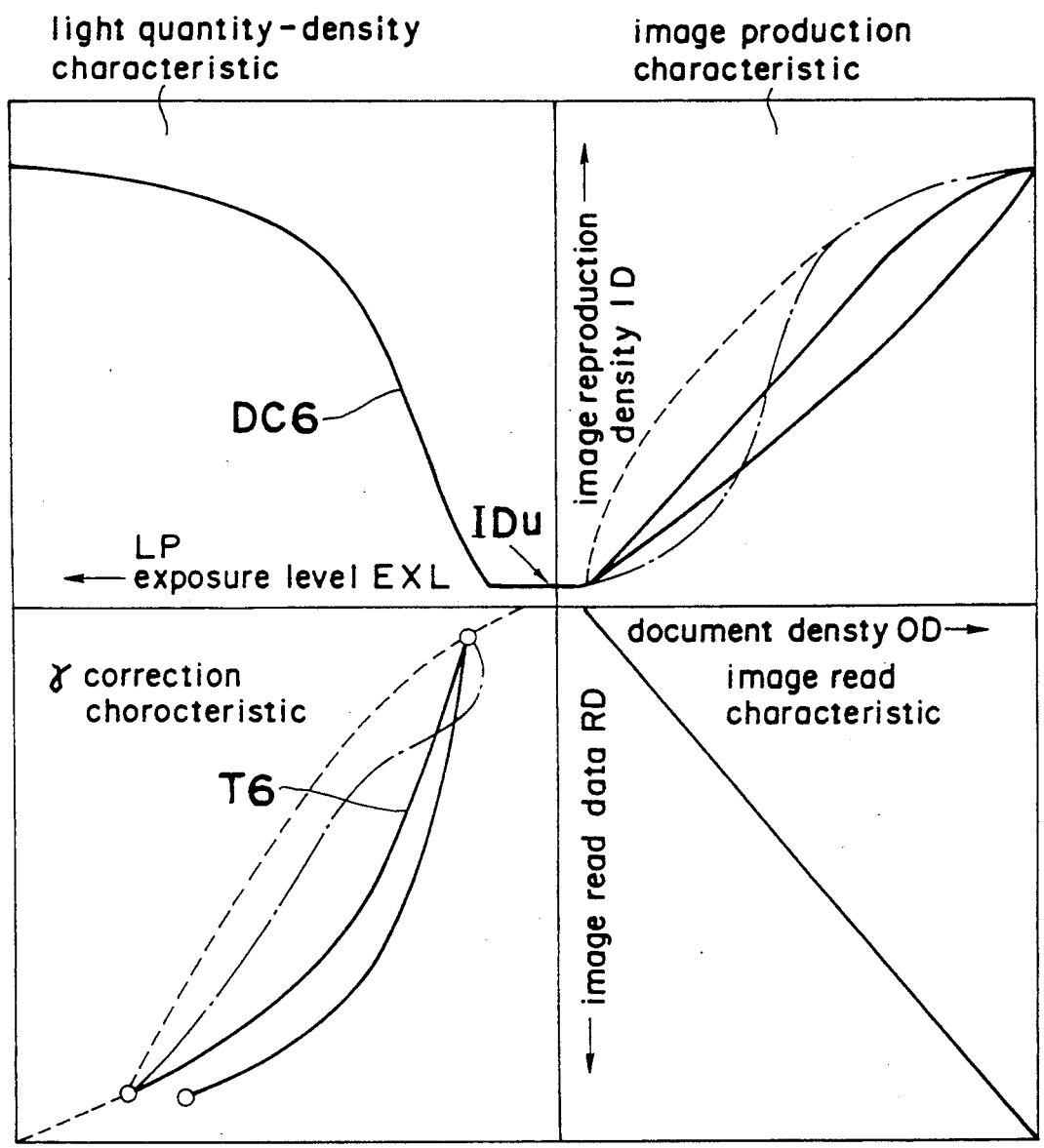
FIG. 18 is a diagram of sensitometry for a plurality of gamma correction tables for various image reproduction properties.

In the above-mentioned embodiment, only one standard gamma correction table is provided, and the memory capacity is reduced. However, as shown in FIG. 18, if various kinds of standard gamma correction tables of different reproduction characteristics are provided in the data ROM 203, a more appropriate gradation control can be performed by using a suitable standard gamma correction.

SECOND EMBODIMENT

A digital color copying machine of the second embodiment will be explained below in the following order:

(f) automatic density control and gradation correction in electrophotographic process of inversion development (g) flow of printer control The structure of digital color copying machine and the image data processing are the same as in the first embodiment except some points to be explained later.

(F) Automatic Density Control and Gradation Correction in Electrophotographic Process of Inversion Development In the present embodiment, the variation of the gradation reproducibility at the high-light portion is prevented against the changes of the surface potential $V_o$, the sensitivity of the photoconductor or the transfer efficiency.

This embodiment is also based on the consideration on the change of factors such as the gamma correction table shown in FIGS. 8–10, and this is already explained above in the first embodiment.

Table 4 shows an example of combinations ($V_B$, $V_o$) of the development bias voltage $V_B$ of the developer 45a–45d and the surface potential $V_o$ on the photoconductor drum 41. Though the development bias voltage $V_B$ is negative in this embodiment, it is expressed as absolute value in Table 4 for simplicity.

TABLE 4

| | | AIDC TABLE | | | | | | |
|---|---|---|---|---|---|---|---|---|
| density detection level LBA | detected amount of adhered toners [mg/cm$^2$] | development efficiency | $\Delta$Vd [V] | $V_G$ [V] | $V_o$ [V] | $V_B$ [V] | $V_m$ [V] | selection code LBA2 |
| 0 | 0.625 | 0.00625 | 160 | 500 | 480 | 280 | 120 | 2 |
| 1 | 0.510 | 0.00510 | 195 | 540 | 520 | 320 | 125 | 3 |
| 2 | 0.455 | 0.00455 | 220 | 570 | 545 | 345 | 125 | 4 |
| 3 | 0.410 | 0.00410 | 245 | 600 | 570 | 370 | 125 | 5 |
| 4 | 0.385 | 0.00385 | 260 | 630 | 590 | 390 | 130 | 6 |
| 5 | 0.345 | 0.00345 | 290 | 660 | 620 | 420 | 130 | 7 |
| 6 | 0.310 | 0.00310 | 320 | 700 | 650 | 450 | 130 | 8 |
| 7 | 0.280 | 0.00280 | 355 | 740 | 690 | 490 | 135 | 9 |
| 8 | 0.260 | 0.00260 | 385 | 780 | 720 | 520 | 135 | 10 |
| 9 | 0.240 | 0.00240 | 420 | 830 | 760 | 560 | 140 | 11 |
| 10 | 0.210 | 0.00210 | 480 | 900 | 820 | 620 | 140 | 12 |
| 11 | 0.180 | 0.00180 | 560 | 1000 | 910 | 710 | 150 | 13 |

In Table 4, "detected amount of adhered toners", "development efficiency" and the development voltage $\Delta$Vd are the same as in Table 1. In this embodiment, the standard amount of adhered toners is 1 mg/cm$^2$, and Table 4 shows the prescribed development voltage $\Delta$Vd for the standard amount of adhered toners.

As explained in the first embodiment, the amount of the adhered toners or the density of a standard toner image formed in the prescribed conditions is detected by the AIDC sensor 210, and the amount of adhered toners of an image at the maximum exposure light quantity is controlled automatically by changing the grid potential $V_G$ and the development bias voltage $V_B$ according to the detected density by the AIDC sensor 210.

As displayed in Table 4, a gamma correction code LBA2 for selecting a gamma correction table to be set as a standard before the amendment with use of an amendment data is outputted against a selected combination of ($V_o$, $V_B$). The LBA corresponds to gamma correction tables T2-T13 among the gamma correction tables T0-T15 stored in the data ROM 203.

Next, the amendment of the gamma correction will be explained below. In this embodiment, amendment codes obtained with the temperature sensor 212, the humidity sensor 213, the gradation control switches 6a-6c in the operational panel (FIG. 19) or the like are added to the gamma correction code selected according to the AIDC sensor 210 in order to select a gamma correction table finally.

The output signals of the temperature sensor 212 and the humidity sensor 213 are received at the start of a copy action.

Tables 5, 6 and 7 show amendment code generation tables in correspondence to the surface potential $V_o$ of the $V_o$ sensor 44, the temperature of the temperature sensor 212 and the humidity of the humidity sensor 213, respectively.

TABLE 5

| detection value | amendment code SG amendment code |
| --- | --- |
| 530 | −2 |
| 540 | −1.5 |
| 550 | −1 |
| 560 | −0.5 |
| 570 | 0 |
| 580 | +0.5 |
| 590 | +1 |
| 600 | +1.5 |
| 610 | +2 |

TABLE 6

| detection value | amendment code SG amendment code |
| --- | --- |
| 10° C. | +1 |
| 15° C. | +0.5 |
| 20° C. | +0 |
| 25° C. | 0 |
| 30° C. | −0 |
| 35° C. | −0.5 |
| 40° C. | −1 |

TABLE 7

| detection value | amendment code SG amendment code |
| --- | --- |
| 0% | 0 |
| 20% | 0 |
| 40% | 0 |
| 60% | 0 |
| 70% | −0.5 |
| 80% | −1 |
| 85% | −1.5 |
| 90% | −2 |

Figure 20:
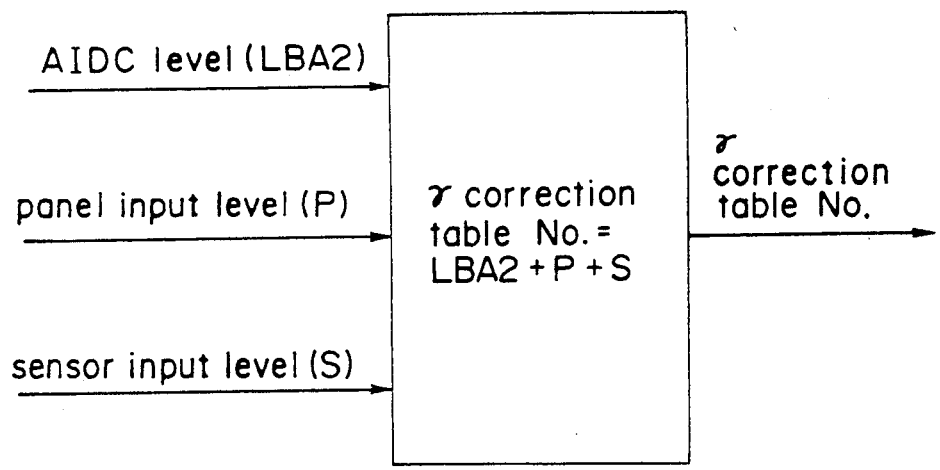
FIG. 20 is a diagram for explaining the amendment of gamma table correction.
Figure 21:
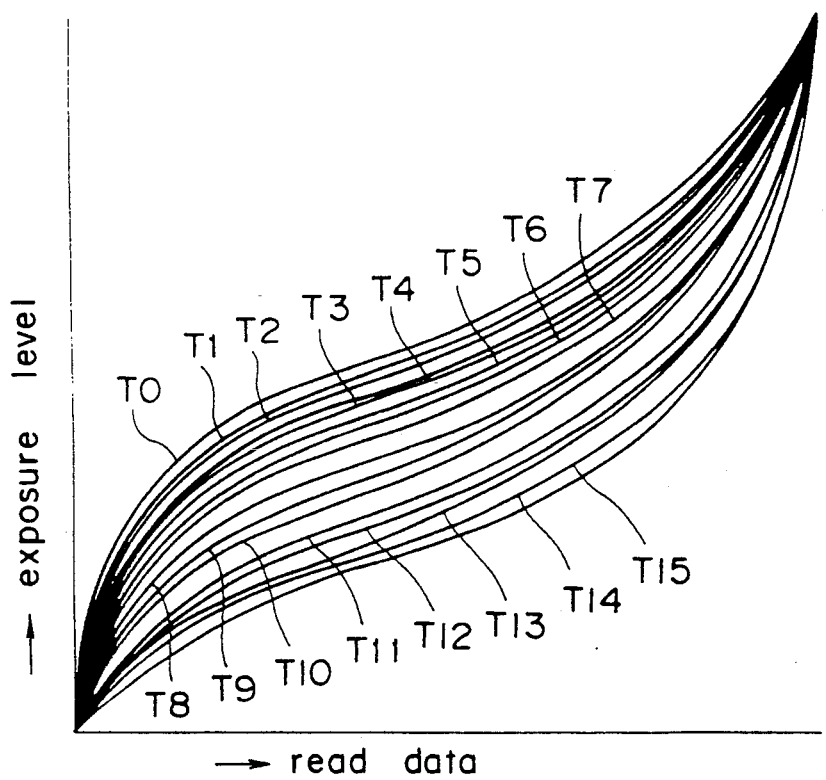
FIG. 21 is a diagram of gamma correction tables T0-T15.

As shown in FIG. 20, an amendment code is obtained by adding a panel input level (P) (−2−+2) and a sensor input level (S) (−2−+2) to the gamma correction code LBA2, and a gamma correction code T0-T15 shown in FIG. 21 is selected according to the sum. The panel input level (P) is determined according to the selection by a user with the gradation control switches 6a-6b and/or to the change of the DIP switch or the like by a serviceman, while the sensor input level (S) (−2−+2) is outputted from the temperature sensor 212 and/or the humidity sensor 213.

Figure 19:
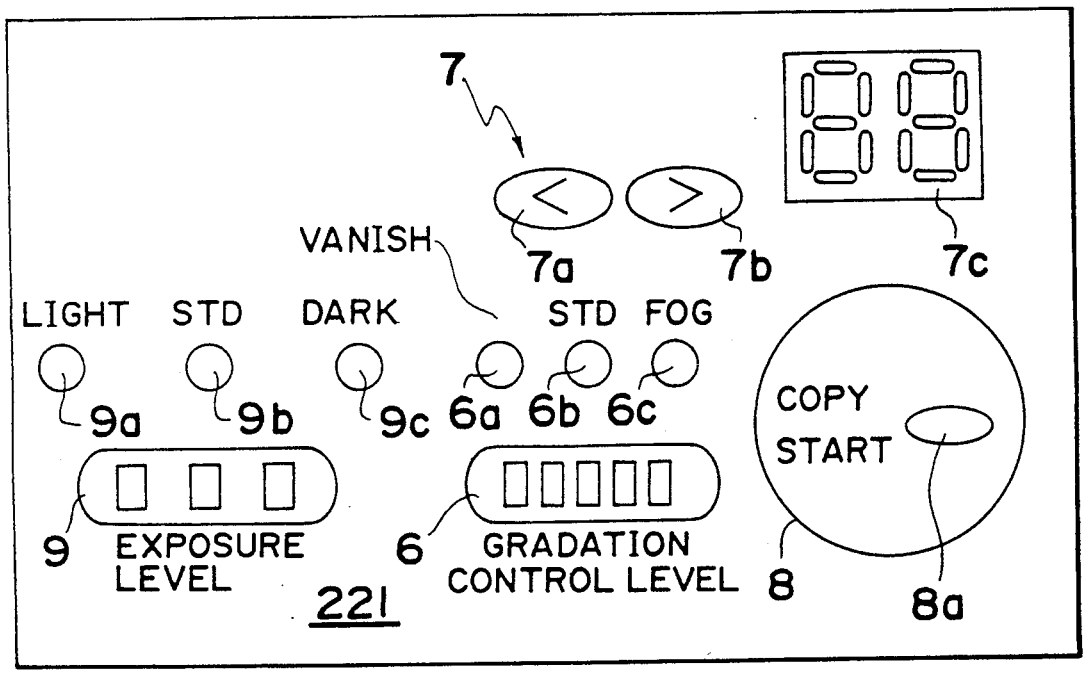
FIG. 19 is a plan view of an operational panel.

In the operational panel 221 shown in FIG. 19, when the gradation control switch 6a is pressed, the gamma amendment code in increased by one, while when the gradation control switch 6c is pressed, the gamma amendment code in decreased by one, and the gradation level is displayed by the gradation level display 6. The remainder of the operational panel 221 is similar to the operational panel 221 (FIG. 7) of the first embodiment.

In FIG. 20, if the panel input level (P) and the sensor input level (S) are the standard levels, the amendment code 0 is selected. The sign of the amendment code for the panel input level (P) is plus in a side where a fog appears in the reproduction image, while it is minus in the other side where the background vanishes in the reproduction image. On the other hand, the sign of the amendment code for the sensor input level (S) is plus in a side of higher surface potential $V_o$, while it is minus in the other side of lower surface potential $V_o$. Further, the sign of the amendment code is plus in a side of higher humidity, while it is minus in the other side of lower humidity. Still further, the sign of the amendment coefficient is minus in a side of higher temperature, while it is plus in the other side of lower temperature.

The selection of the amendment code explained above has similar meanings to the five meanings on the selection of the amendment coefficients explained in the first embodiment.

(G) Flow of Printer Control

Figure 22:
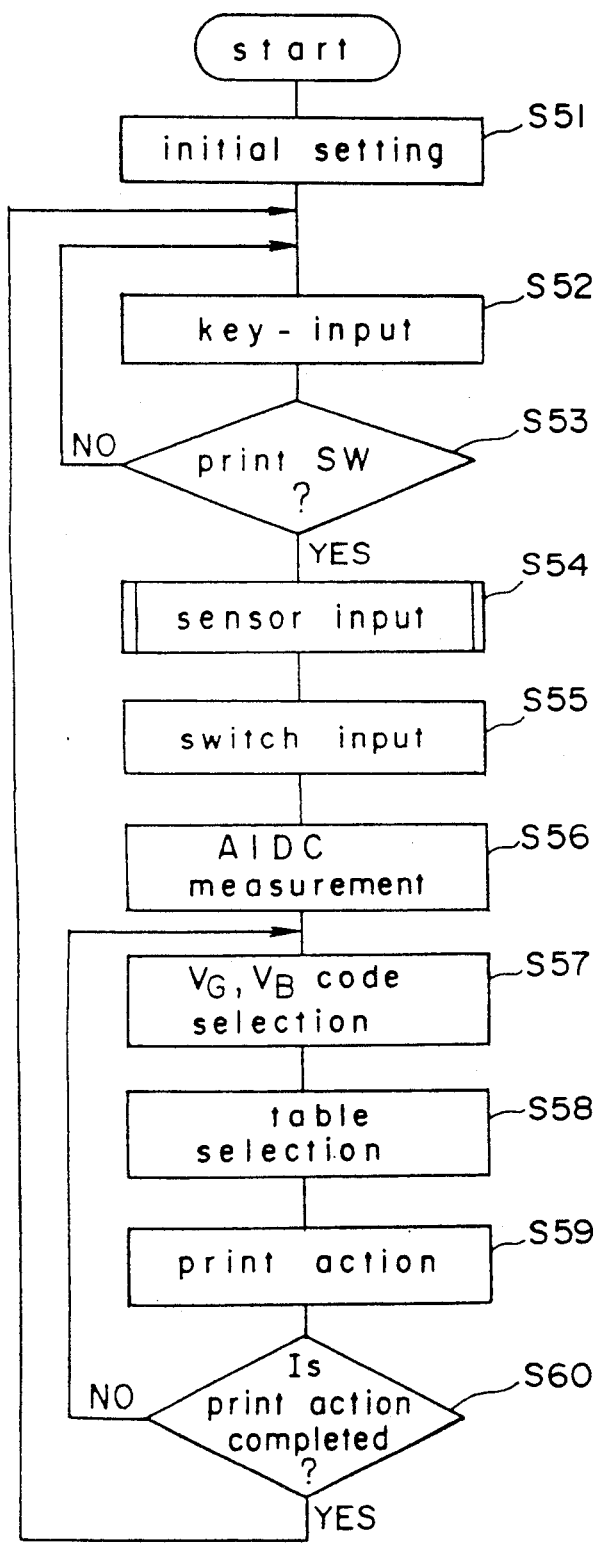
FIG. 22 is a flowchart of the control of digital color copying machine.

FIG. 22 shows a control flow of the printer controller 201 of the digital color copying machine.

At step S51, the initialization of the printer controller 201 is performed, and at step S52, the input processing of the operational panel 221 is performed. Next, at step S53, it is decided if the start key 8 in the operational panel 221 is pressed or not. If it is decided that the start key 8 is not pressed (NO at step S53), the flow returns to step S52 again, and waits until the start key 8 is pressed.

Figure 23:
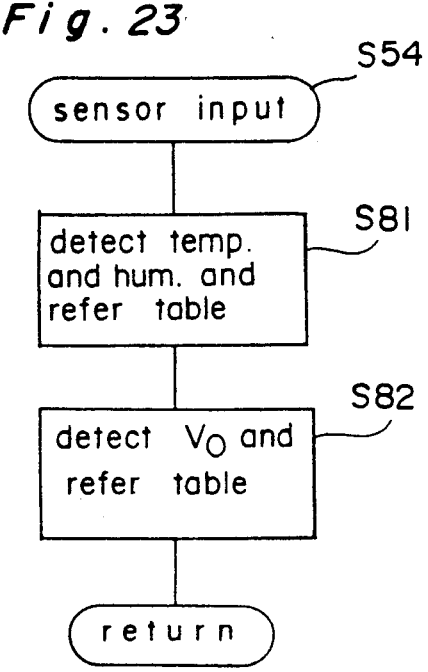
FIG. 23 is a flowchart of the sensor input processing.

If it is decided at step S53 that the start key 8 is pressed, the sensor input processing is performed at step S54. In this processing shown in detail in FIG. 23, the outputs of the temperature sensor 212 and the humidity sensor 213 are received and Tables 6 and 7 are referred to determine the amendment code (step S81). Next, the input of the $V_o$ sensor 44 is received and Table 5 is referred to determine the amendment code (step S82). The amendment codes are stored in the RAM of the printer controller 201. Then the flow returns to the main flow.

In FIG. 22, at step S55 of the switch input processing, the amendment code in correspondence to the input signal from the DIP switch and the gradation control switch of the operational panel 221 shown in FIG. 7 is stored in the RAM in the printer controller 201.

Then, at step S56, the AIDC processing if performed. In the AIDC processing, after the grid potential $V_G$ and the development bias potential $V_B$ are set to be prescribed standard values, a toner image of a standard image pattern is formed on the photoconductor drum 41 and the amount of adhered toners of the image is measured with the AIDC sensor 210 and it is stored in the RAM in the printer controller 201.

Next, at step S57, the density detection level LBA is selected according to the amount of adhered amount measured at step S56, and the grid potential $V_G$, the development bias potential $V_B$ and the gamma correction code LBA2 (a value between 2 and 13) are also selected according to the density detection level LBA.

Next, at step S58, the amendment codes P and S from the operational panel and the sensor are added to LBA2, and a gamma correction table is selected among T0–T15.

At step S59, the known copy action is carried out by using the selected grid potential $V_G$, development bias potential $V_B$ and the gamma correction table.

Then, it is decided if the copy action completes or not at step S60. If the copy action is decided to complete, the flow returns to step S52, otherwise the flow returns to step S57.

In the above-mentioned embodiment, the gamma correction table is amended by adding amendment codes S, P to the gamma correction code LBA2. However, it is also possible to amend the gamma correction table by using only the standard correction table as in the first embodiment and by adding the amendment value in correspondence with the amendment codes and a value which represents the difference of a gamma correction table from the standard gamma correction table.

THIRD EMBODIMENT

A digital color copying machine of the third embodiment will be explained below in the following order:
(h) automatic density control and gradation correction in electrophotographic process of inversion development
(i) examples of the automatic density control and gradation correction
(j) flow of printer control The structure of digital color copying machine and the image data processing are the same as in the first embodiment, and they are not explained here.

(H) Automatic Density Control and Gradation Correction in Electrophotographic Process of Inversion Development The present embodiment is based on the following consideration of the change of the gamma correction when the transfer efficiency varies with humidity and of the change of gradation due to a change in the grid potential $V_G$ and the development bias potential $V_B$.

In general, the transfer efficiency varies with humidity. FIG. 10 shows the image reproduction density (ID) plotted against the exposure level (EXL) when the transfer efficiency changes. It is clear that the image reproduction density shifts in parallel against the change in transfer efficiency. Therefore, the gamma correction characteristics shifts in parallel with the humidity in correspondence with the change in image reproduction density.

Figure 24:
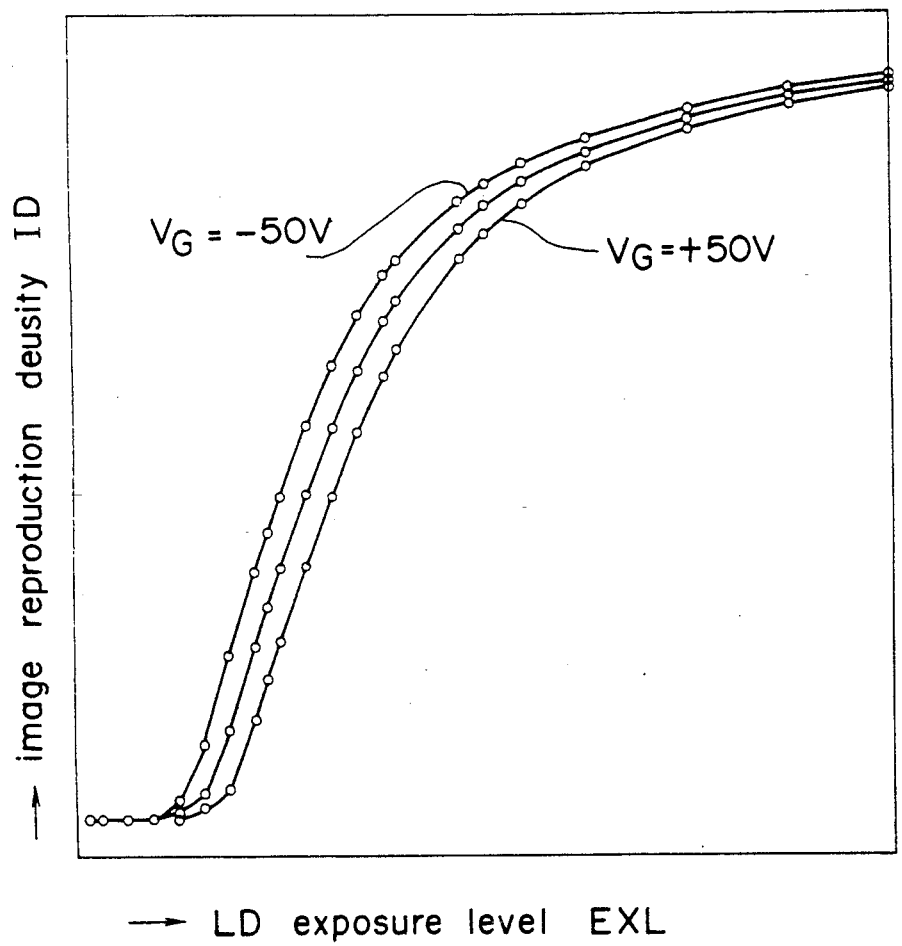
FIG. 24 is a graph of image reproduction density plotted against exposure level when the grid potential changes.

Further, the gradation of reproduction image varies also with the grid potential $V_G$ of the sensitizing charger. FIG. 24 shows the image reproduction density (ID) plotted against the exposure level (EXL) when the grid potential $V_G$ changes. It is clear that the image reproduction density shifts in parallel against the change in grid potential $V_G$.

Figure 25:
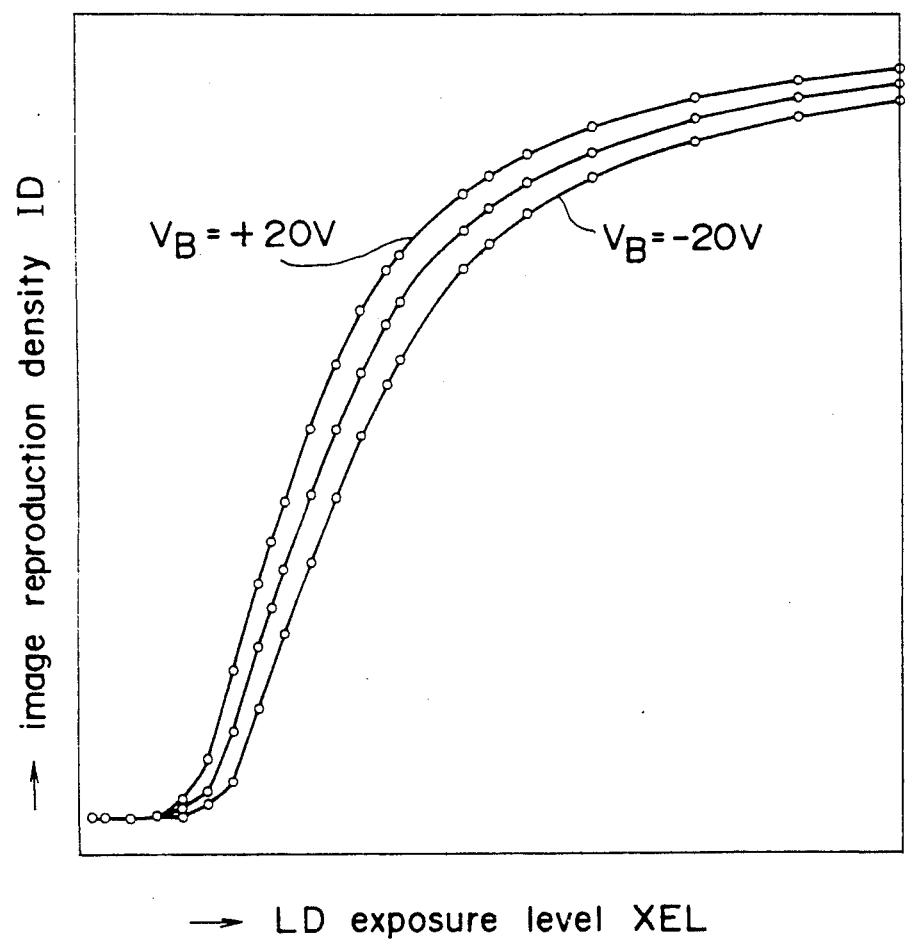
FIG. 25 is a graph of image reproduction density plotted against exposure level when the bias potential changes.

Further, the gradation of reproduction image varies also with the development bias potential $V_B$ of the developer. FIG. 25 shows the image reproduction density (ID) plotted against the exposure level (EXL) when the development bias potential $V_B$ changes. It is clear that the image reproduction density shifts also in parallel against the change in development bias potential $V_B$.

It is understood from FIGS. 10, 24 and 25 that when the gradation of reproduced image changes with the grid potential $V_G$ or with the development bias potential $V_B$, this change of the gradation is similar to the change of the gradation due to transfer efficiency. Therefore, the change of the gradation due to the grid potential $V_G$ or the development bias potential $V_B$ can be substituted by the change of the initial light quantity. Thus, the change of transfer efficiency with humidity can be compensated by the grid potential $V_G$ or the development bias potential $V_B$.

Further, as shown in FIG. 24, when the grid potential $V_G$ is changed, the image reproduction density changes largely at the highlight portion. Therefore, if the gradation is amended by changing the grid potential $V_G$, the amendment of the gradation is effective at the highlight portion, while the change at high densities is not remarkable in an image though the difference of gradation is not neglected. That is, the change of transfer efficiency can be suppressed surely.

Further as shown in FIG. 25, when the development bias potential $V_B$ of the developer is changed, the image reproduction density changes largely even at high densities if compared with the change with the grid potential $V_G$. Therefore, if the gradation is amended by changing the development bias potential $V_B$, the amendment is effective at high densities, while the change at highlight portions decreases in an image though the difference of gradation is not neglected. That is, the change can be suppressed in a certain range and it is smaller than the change of the development bias potential $V_B$. Therefore, in order to get the same amount of the amendment effect, it is advantageous to change the development bias potential $V_B$ from the points of view of a fog in the highlight portions and of the adhesion of carriers.

Then, in this embodiment, the moisture in air is detected, and the surface potential before exposure or the bias potential is shifted according to the moisture to compensate the decrease in the transfer efficiency. Then, an image is reproduced with the amended surface potential or bias potential. It is not needed to prepare gamma correction tables for different humidities, and the memory capacity for storing the gamma correction tables is small. The sequence to amend the gamma correction table is simple and the grid potential or the bias potential can be changed by using the AIDC processing.

(I) Examples of the Automatic Density Control and Gradation Correction

As explained above, the standard grid potential $V_G$ of the sensitizing charger 43 and the standard bias potential $V_B$ of the developer 45a–45d before the moisture amendment are determined according to the detection value of the AIDC sensor 210. Then, by using the detection value, the grid potential $V_G$ and the bias potential $V_B$ are determined and the gamma correction table is determined.

(1) determination of the grid potential $V_G$ and the development bias potential $V_B$ (1-1) $V_G$-$V_o$ characteristic and $V_G$-$V_I$ characteristic.

Figure 26:
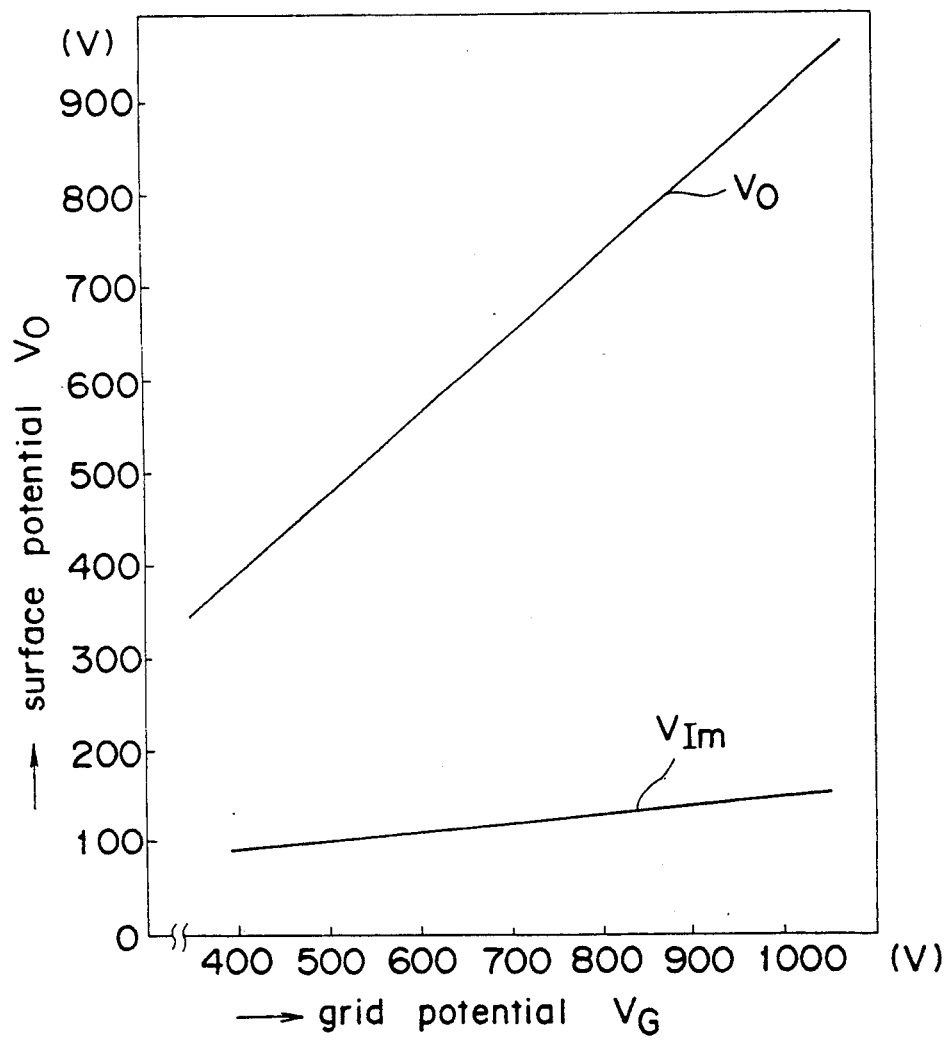
FIG. 26 is a graph of surface potential $V_o$ plotted against the grid potential.

FIG. 26 shows a relation between the grid potential $V_G$ and the surface potential $V_o$ before the exposure of the photoconductor drum 41 and a relation between the grid potential $V_G$ and the surface potential $V_{Im}$ after the maximum exposure. The surface potentials $V_o$ and $V_{Im}$ are determined by using the relations if the grid potential $V_G$ is determined.

(1-2) development efficiency

Figure 27:
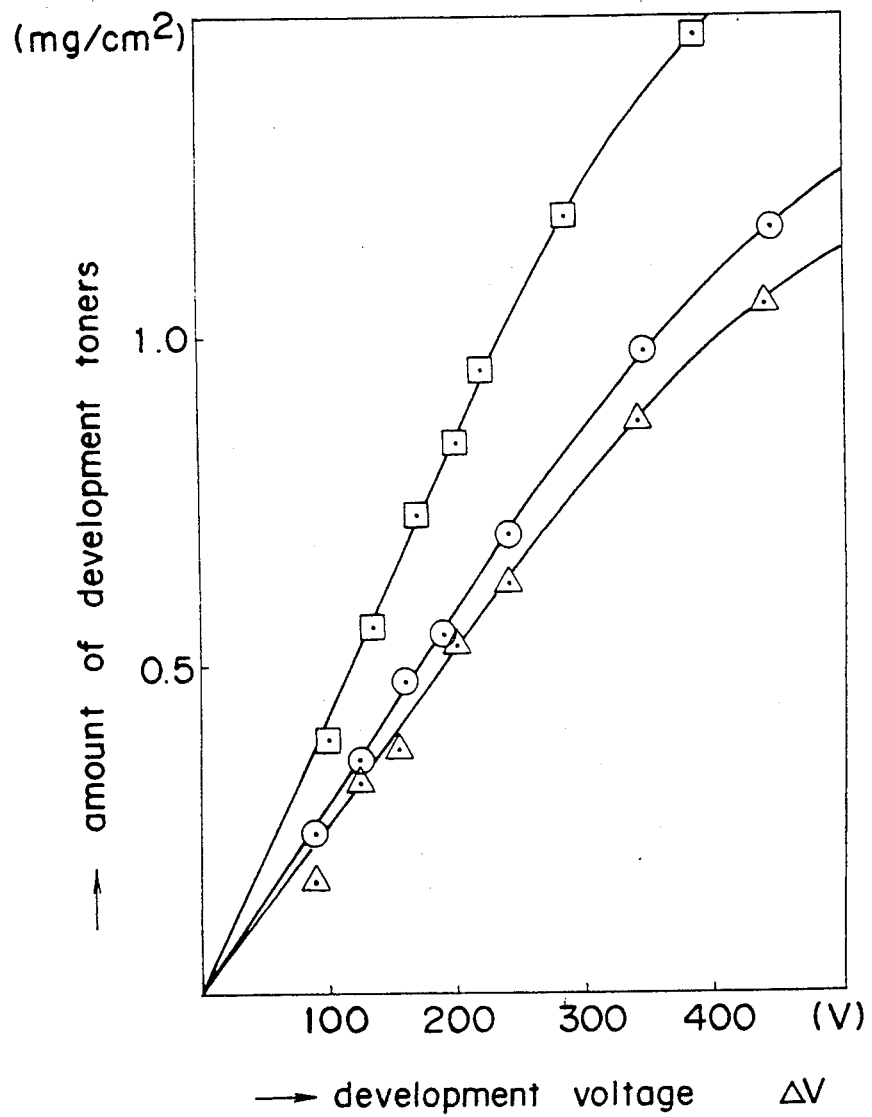
FIG. 27 is a graph of the amount of development toners plotted against development voltage.

On the other hand, as shown in the relation between the development efficiency and the development potential $\Delta V = |V_B - V_I|$ in FIG. 27, the development efficiency changes almost linearly against the development potential $\Delta V$. However, the development efficiency varies with the temperature and the humidity of the environment or the moisture in air. A development potential $\Delta V$ necessary for realizing the standard amount of adhesive toners is determined for each development efficiency. That is, the development efficiency is detected with the AIDC sensor 210 and the development potential $\Delta Vd$ to be set is calculated as will be explained below.

First, a pattern is formed in the following conditions: The development potential $\Delta V$ is set to be constant. For example, $V_G = 600$ V and $V_B = 400$ V. The light quantity level is set to be 120/256, and $\Delta V_o = 100$ V.

Then, the development efficiency is calculated from the detected amount of the adhered toners as follows:

$$\text{development efficiency} = \text{amount of adhered toners}/\Delta V_O = \text{amount of adhered toners}/100. \quad (4)$$

Next, the development potential $\Delta Vd$ for realizing the standard amount of adhered toners is calculated from the development efficiency and the standard amount of adhered toners as follows:

$$\Delta Vd = \text{standard amount of adhered toners/development efficiency}. \quad (5)$$

(1-3) fog and carrier adhesion

Figure 28:
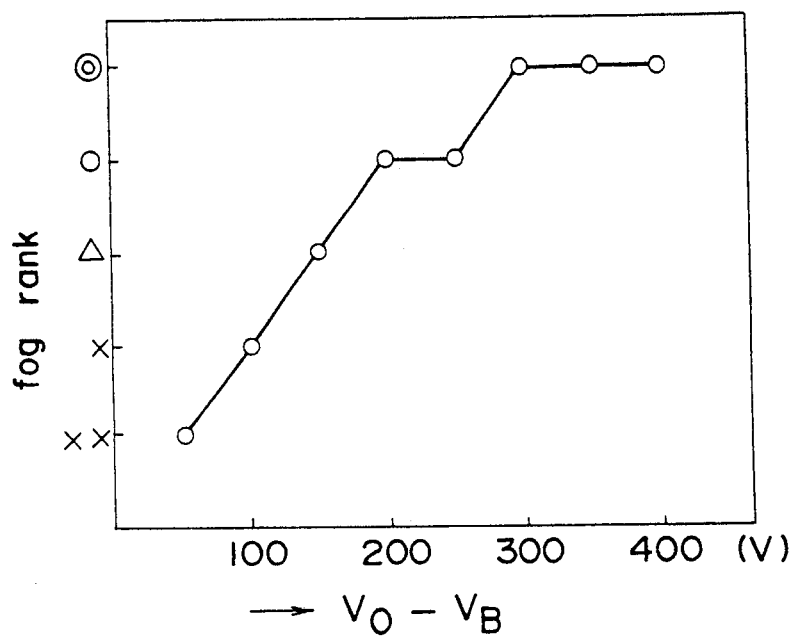
FIG. 28 shows a graph of fog rank plotted against the development voltage.
Figure 29:
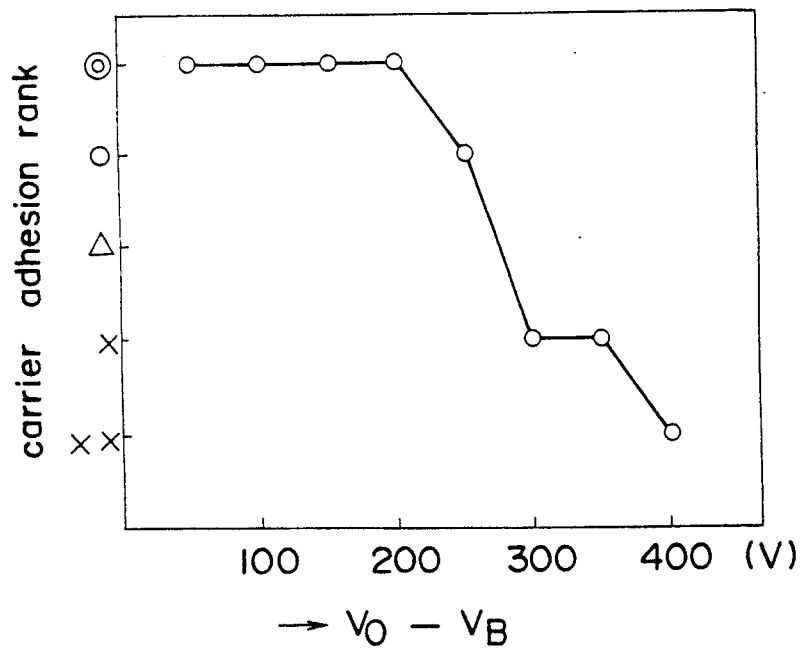
FIG. 29 shows a graph of carrier adhesion rank plotted against the development voltage.

The characteristic on fog and carrier adhesion is determined according to $(V_o - V_B)$, as shown in FIGS. 28 and 29, respectively. The fog characteristic becomes better with increasing $(V_o - V_B)$, while the carrier adhesion characteristic becomes better with decreasing $(V_O - V_B)$. The value $(V_O - V_B)$ appropriate both for the fog and carrier adhesion is from 150 to 250 V. Then, a combination of the standard grid potential $V_G$ and bias potential $V_B$ is determined in order to realize $(V_o - V_B) \approx 200$ V in this embodiment.

Table 8 shows an example of combinations $(V_B, V_o)$ of the bias voltage $V_B$ of the developer 45a–45d and the surface potential $V_o$ on the photoconductor drum 41. Though the development bias potential $V_B$ is negative in this embodiment, it is expressed as absolute value in Table 8 for simplicity.

In this embodiment, the standard amount of adhered toners is 1 mg/cm$^2$, and Table 8 shows the prescribed development voltage $\Delta Vd$ for the standard amount of adhered toners.

Figure 30:
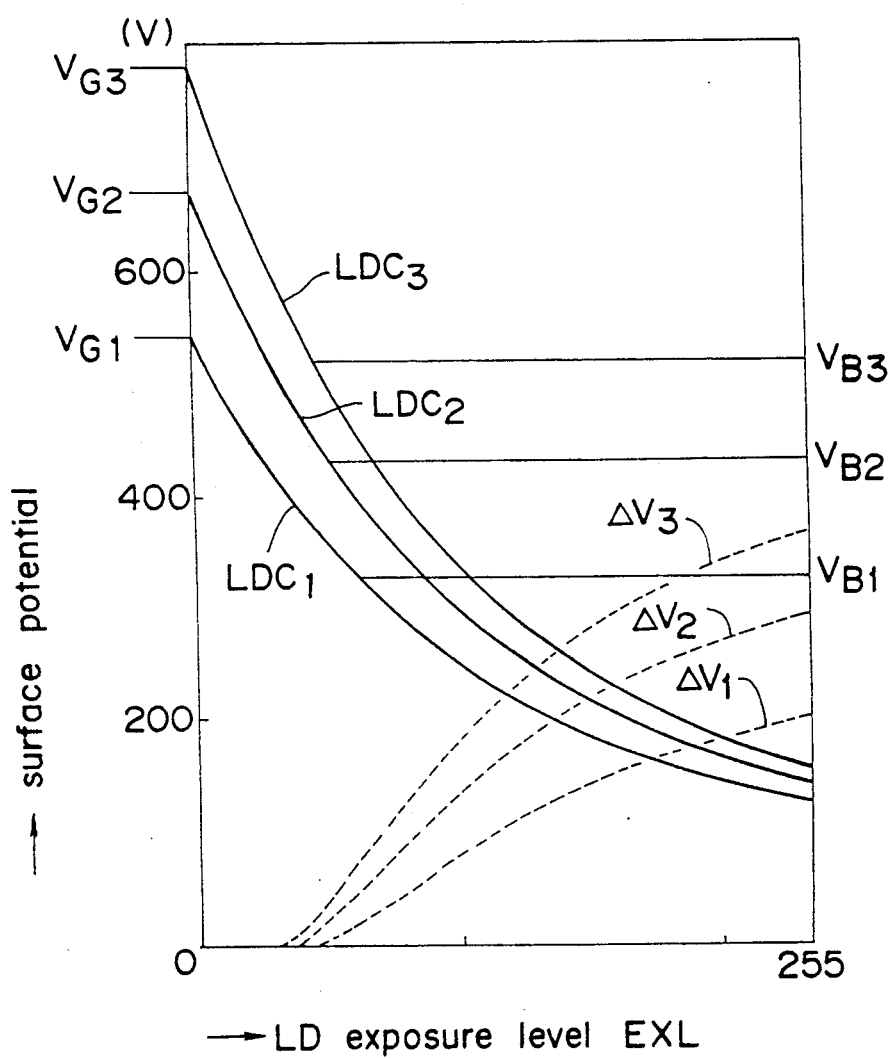
FIG. 30 is a graph of surface potential plotted against the exposure level.

(2) generation of gamma correction table (2-1) sensitivity characteristic of photoconductor drum As shown in FIG. 30, a sensitivity characteristic curve of the photoconductor drum 41 is determined in correspondence to the grid potential $V_G$ selected as mentioned above. The maximum light quantity level is set to be 255. The sensitivity characteristic of the photoconductor drum 41 of the present invention has a characteristic as expressed by the following equation:

$$V(i) = (V_o - V_R)\exp(-i/k) + V_R, \quad (6)$$

wherein $V_R$ denotes the residual potential and k denotes the sensitivity constant of the photoconductor.

In FIG. 30. the development voltage $\Delta V = |V_B - V_I|$ is also shown against the light quantity of the laser light source.

(2-2) gradation reproduction characteristic

Figure 31:
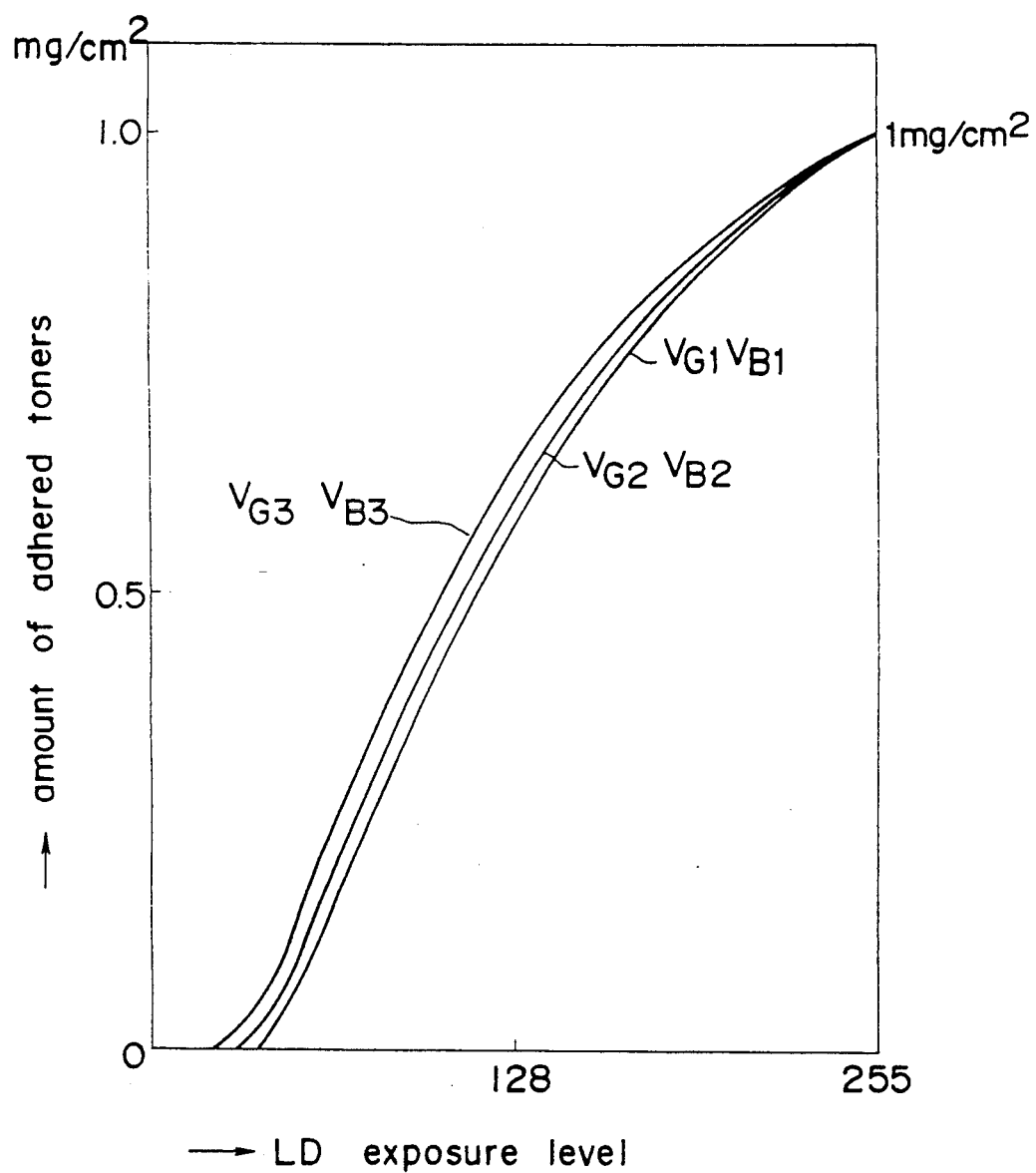
FIG. 31 is a graph of the amount of the adhered toners plotted against the exposure level.
Figure 32:
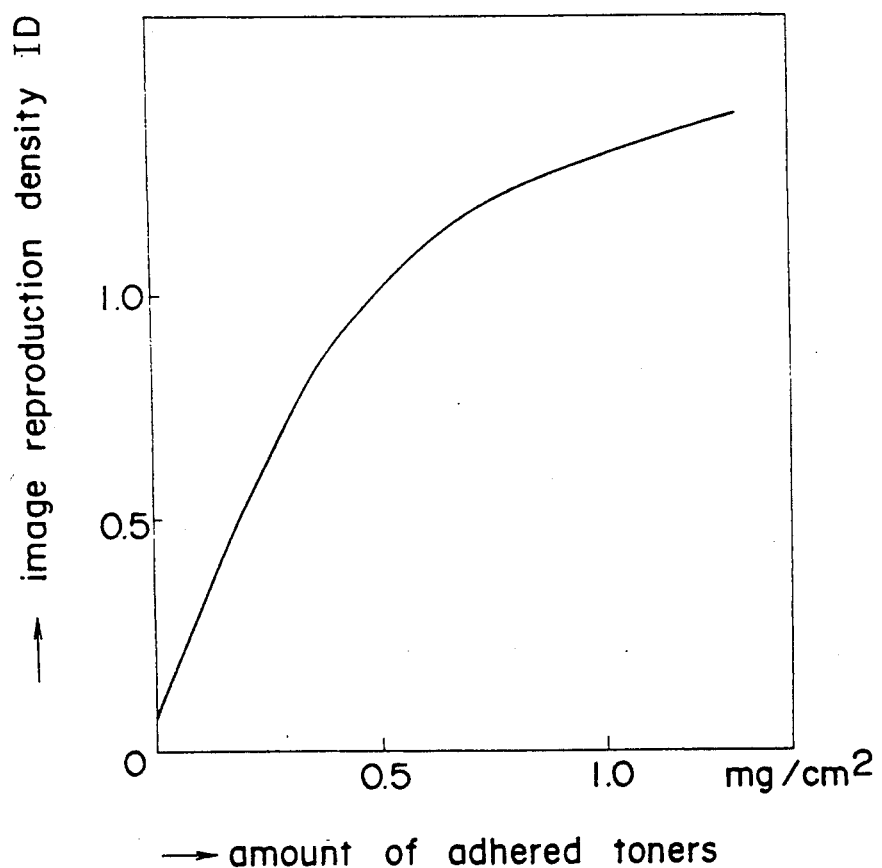
FIG. 32 is a graph of the image reproduction density plotted against the amount of adhered toners.

On the basis of the development efficiency characteristic of FIG. 27, the amount of adhered toners can be expressed against light quantity as shown in FIG. 31. Because the standard amount of adhered toners is the amount at the maximum light quantity 255, the characteristic of the amount of adhered toners against the light quantity is a curve which attains the standard amount at light quantity 255. Then, the characteristic is rewritten as a characteristic of density against light quantity by using the characteristic of the amount of adhered toners against the reproduction density of FIG. 32. Actually, near $\Delta V \approx 0$, the image reproduction starts from a region $\Delta V < 0$ due to the fluctuations of $V_o$ and the distribution of toner charges. This is shown in FIG. 33, and the initial light quantity of image reproduction is denoted as "a".

(2-3) gamma correction table

Figure 33:
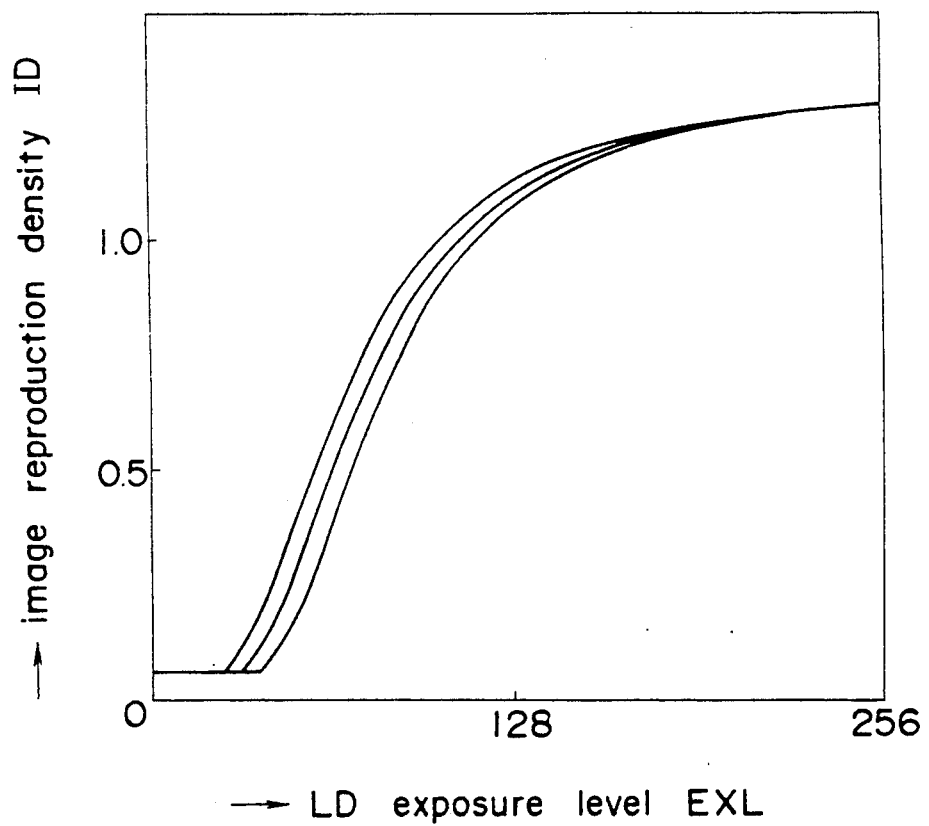
FIG. 33 is a graph of the image reproduction density plotted against the exposure level.

In order to convert the light quantity—reproduction density characteristic as shown in FIG. 33 to a desirable gradation, a nonlinear conversion of light quantity is performed as the gamma correction table as shown in the third quadrant of FIG. 1. As shown above in Table 8, a gamma correction table T0–T11 can be determined for each combination of $V_G$ and $V_B$.

In Table 8, the detection value of the AIDC sensor 210 is classified to density detection levels (LBA) 0–11 displayed in the left-most column according to the amplitude of the detection value. According to the density

TABLE 8

| AIDC TABLE | | | | | | | | |
|---|---|---|---|---|---|---|---|---|
| density detection level LBA | detected amount of adhered toners [mg/cm$^2$] | development efficiency | $\Delta Vd$ [V] | $V_G$ [V] | $V_o$ [V] | $V_B$ [V] | $V_I m$ [V] | $\gamma$ correction table |
| 0 | 0.625 | 0.00625 | 160 | 500 | 480 | 280 | 120 | T0 |
| 1 | 0.510 | 0.00510 | 195 | 540 | 520 | 320 | 125 | T1 |
| 2 | 0.455 | 0.00455 | 220 | 570 | 545 | 345 | 125 | T2 |
| 3 | 0.410 | 0.00410 | 245 | 600 | 570 | 370 | 125 | T3 |
| 4 | 0.385 | 0.00385 | 260 | 630 | 590 | 390 | 130 | T4 |
| 5 | 0.345 | 0.00345 | 290 | 660 | 620 | 420 | 130 | T5 |
| 6 | 0.310 | 0.00310 | 320 | 700 | 650 | 450 | 130 | T6 |
| 7 | 0.280 | 0.00280 | 355 | 740 | 690 | 490 | 135 | T7 |
| 8 | 0.260 | 0.00260 | 385 | 780 | 720 | 520 | 135 | T8 |
| 9 | 0.240 | 0.00240 | 420 | 830 | 760 | 560 | 140 | T9 |
| 10 | 0.210 | 0.00210 | 480 | 900 | 820 | 620 | 140 | T10 |
| 11 | 0.180 | 0.00180 | 560 | 1000 | 910 | 710 | 150 | T11 | detection level LBA, the grid potential $V_G$ is changed from 500 V to 1000 V and the development bias voltage $V_B$ is changed from 280 to 710 V. Further, each of twelve gradation correction tables T0–T11 corresponds to the density detection level LBA, and the gradation correction tables are stored in the data ROM 203.

Amendment terms for the standard grid potential $V_G$ and the standard development potential $V_B$ determined as explained above are determined by the printer controller 201 according the moisture in air determined with the outputs of the temperature sensor 212 and the humidity sensor 213. Then, the grid potential $V_G$ and the development bias potential $V_B$ are shifted according to the amendment terms as mentioned above.

(J) Flow of Printer Control

The control of the printer controller 203 will be explained below.

A. amendment with used of the grid potential $V_G$

Figure 34:
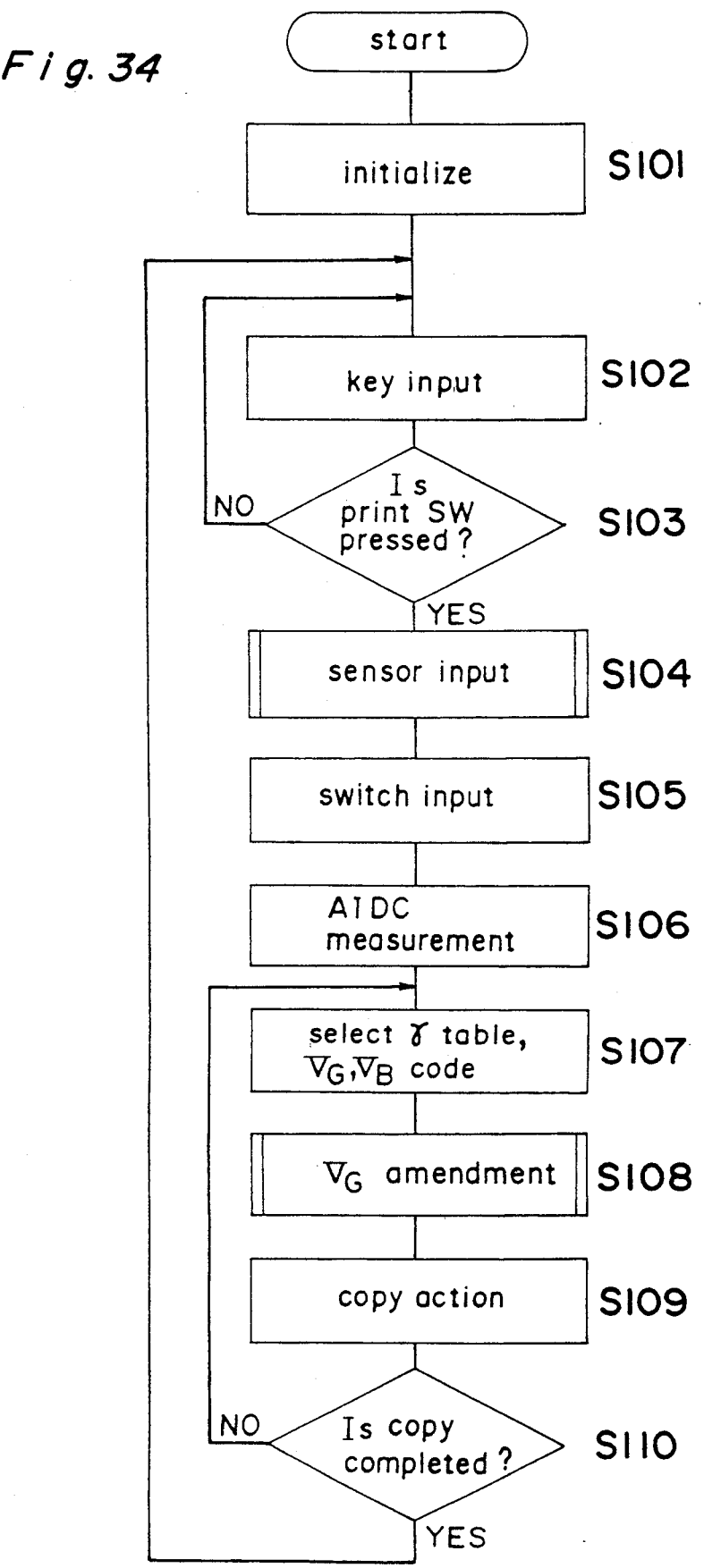
FIG. 34 is a flowchart of the control of digital color copying machine.

FIG. 34 shows a flow of the printer controller 201 when the amendment of the gradation correction table is performed by changing the grid potential $V_G$ according to the moisture.

At step S101, the initialization of the printer controller 201 is performed, and at step S102, the input processing of the operational panel 221 is performed. Next, at step S103, it is decided if the start key 8 in the operational panel 221 is pressed or not. If it is decided that the start key 8 is not pressed (NO at step S103), the flow returns to step S102 again, and waits until the start key 8 is pressed.

Figure 35:
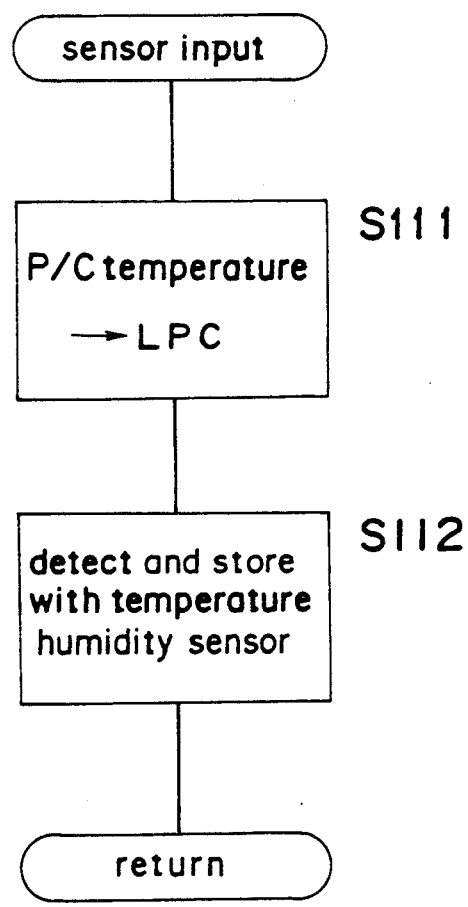
FIG. 35 is a flowchart of the sensor input processing.

If it is decided at step S103 that the start key 8 is pressed, the sensor input processing is performed at step S105. In this processing shown in detail in FIG. 35, the temperature of the photoconductor detected by the temperature sensor 212 is received at step S121, and the code LPC determined according to the temperature is stored. Then, at step S122, the output of the humidity sensor 213 is stored, and the flow returns to the main flow.

In step S105 in FIG. 34 of the switch input processing, the correction code in correspondence to the input signal from the DIP switch and the gradation control switch of the operational panel 221 shown in FIG. 7 is stored in the RAM in the printer controller 201.

Then, at step S106, the AIDC processing is performed. In the AIDC processing, after the grid potential $V_G$ and the development bias potential $V_B$ are set to be prescribed standard values, a toner image of a standard image pattern is formed on the photoconductor drum 41 and the amount of adhered toners of the image is measured with the AIDC sensor 210 and it is stored in the RAM in the printer controller 201.

Next, at step S107, the density detection level LBA is selected according to the amount of adhered amount measured at step S106, and the grid potential $V_G$, the development bias potential $V_B$ and the gamma correction table (one of T0–T11) are selected according to the density detection level LBA (Table 8).

Figure 36:
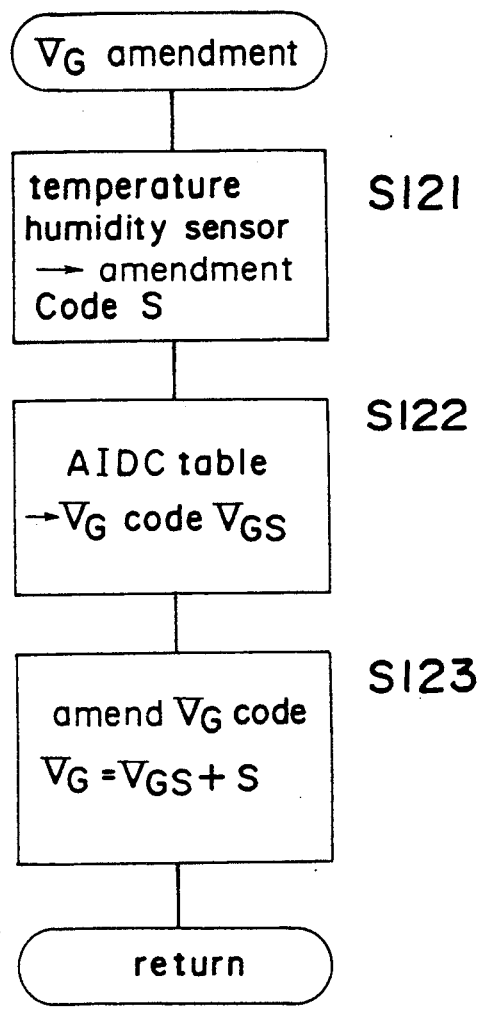
FIG. 36 is a flowchart of $V_G$ amendment processing.

Next, at step S108, the grid potential $V_G$ is amended as shown in FIG. 36 in detail. That is, at step S141 in FIG. 36, the amendment code S in correspondence to the moisture in air is obtained according to the output signals of the temperature sensor 212 and the humidity sensor 213 with use of the table processing shown in Table 9.

TABLE 9

| humidity | $V_G$ amendment code temperature | | | | |
|---|---|---|---|---|---|
| | 10° C. | 18° C. | 25° C. | 32° C. | 40° C. |
| 90% | 0 | −1 | −2 | −3 | −5 |
| 70 | 0 | 0 | −1 | −2 | −3 |
| 50 | 0 | 0 | 0 | −1 | −2 |
| 30 | +1 | 0 | 0 | 0 | −1 |
| 10 | +2 | +1 | 0 | 0 | 0 |

Then, at step S142, a $V_G$ code $V_{GS}$ of the $V_G$ generator 243 which generates the grid potential $V_G$ is selected according to Table 10 in correspondence to the grid potential $V_G$ determined in the AIDC table of Table 8.

Then, at step S143, the amendment code S of stop S141 and the $V_G$ code $V_{GS}$ are added. The sum is the $V_G$ code amended as mentioned above. Then, the flow returns to the main flow.

TABLE 10

| Step | $V_G$ |
|---|---|
| 0 | −445 |
| 1 | −460 |
| 2 | −475 |
| 3 | −500 |
| 4 | −520 |
| . | . |
| . | . |
| 25 | −1000 |
| 26 | −1050 |
| 27 | −1100 |
| 28 | −1150 |

Next, at step S109 in FIG. 34, the known copy action is carried out by using the amended grid potential $V_G$, the standard development bias potential $V_B$ not amended and the selected gamma correction table.

Then, it is decided if the copy action completes or not at step S110. If the copy action is decided to complete, the flow returns to step S102, otherwise the flow returns to step S107.

B. amendment with development bias potential $V_B$

Another case where the grid potential $V_G$ is amended is explained above. On the other hand, a case where the development bias potential $V_B$ will be explained below.

Figure 37:
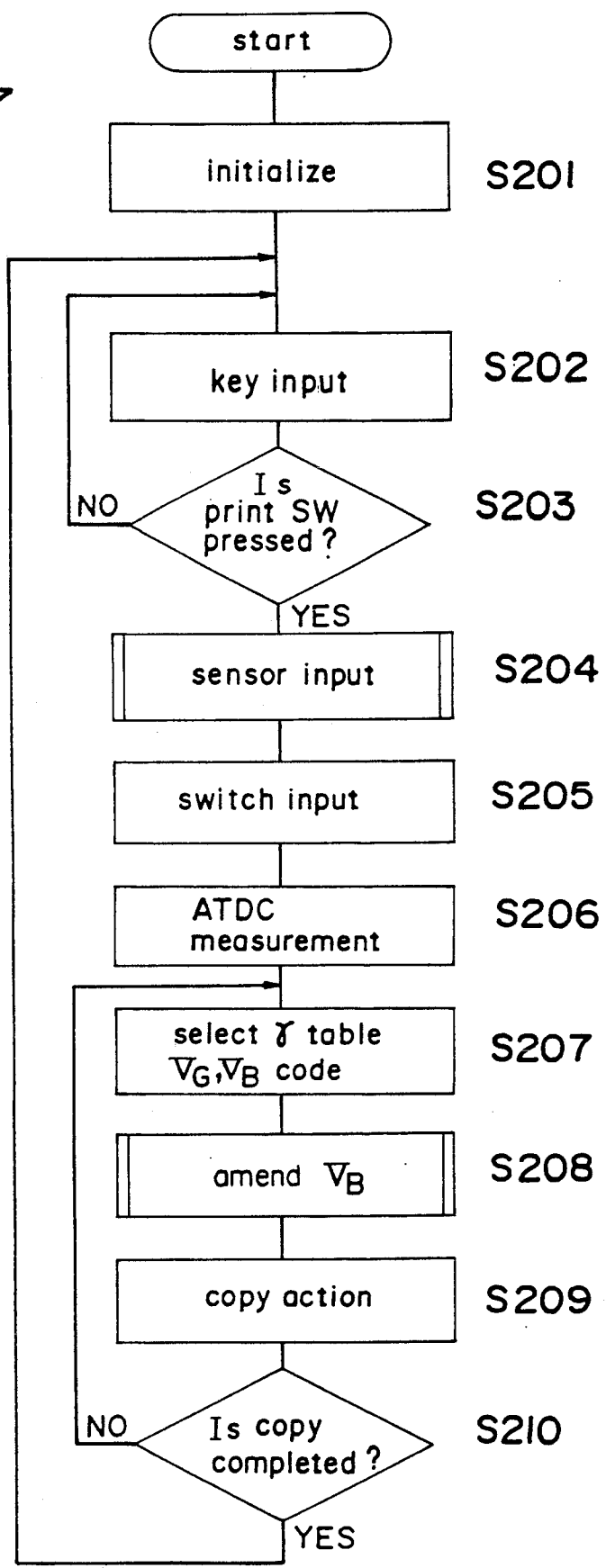
FIG. 37 is a flowchart of the control of digital color copying machine.

FIG. 37 shows a flow of the printer controller 201 in this case. This flow is different only at steps S208 and S209. The other steps are the counterparts in FIG. 35, and the explanation of these steps are omitted for simplicity.

Figure 38:
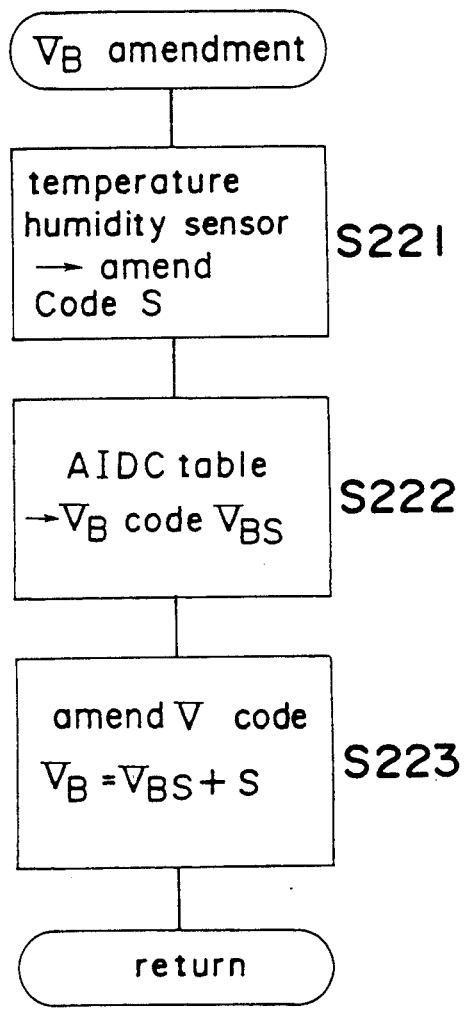
FIG. 38 is a flowchart of $V_B$ amendment processing.

At step S208, the development bias potential $V_B$ is amended as shown in FIG. 38 in detail. That is, at step S241 in FIG. 38, the amendment code S in correspondence to the moisture in air is obtained according to the output signals of the temperature sensor 212 and the humidity sensor 213 with use of the table processing shown in Table 11.

TABLE 11

| humidity | $V_B$ amendment code temperature | | | | |
|---|---|---|---|---|---|
| | 10° C. | 17° C. | 24° C. | 31° C. | 38° C. |
| 10% | −2 | −2 | −1 | 0 | 0 |
| 30% | −1 | −1 | 0 | 0 | 0 |
| 50% | −1 | 0 | 0 | 0 | +1 |
| 70% | 0 | 0 | 0 | +1 | +1 |
| 90% | 0 | 0 | +1 | +2 | +2 |

Then, at step S242, a $V_B$ code $V_{BS}$ of the $V_B$ generator 244 which generates the development bias potential $V_B$ is selected according to Table 12 in correspondence to the development bias potential $V_B$ determined in the AIDC table of Table 8.

Then, at step S243, the amendment code S of step S241 and the $V_B$ code $V_{BS}$ are added and the flow returns to the main flow. The sum is the $V_B$ code amended as mentioned above. Then, the flow returns to the main flow.

TABLE 12

| Step | $V_B$ |
|---|---|
| 0 | −230 |
| 1 | −245 |
| 2 | −260 |
| 3 | −280 |
| 4 | −300 |
| . | . |
| . | . |
| . | . |
| 25 | −680 |
| 26 | −710 |
| 27 | −740 |
| 28 | −770 |

Next, at step S209 in FIG. 37, the known copy action is carried out by using the standard grid potential $V_G$ not amended, the amended development bias potential $V_B$ and the selected gamma correction table.

Figure 39:
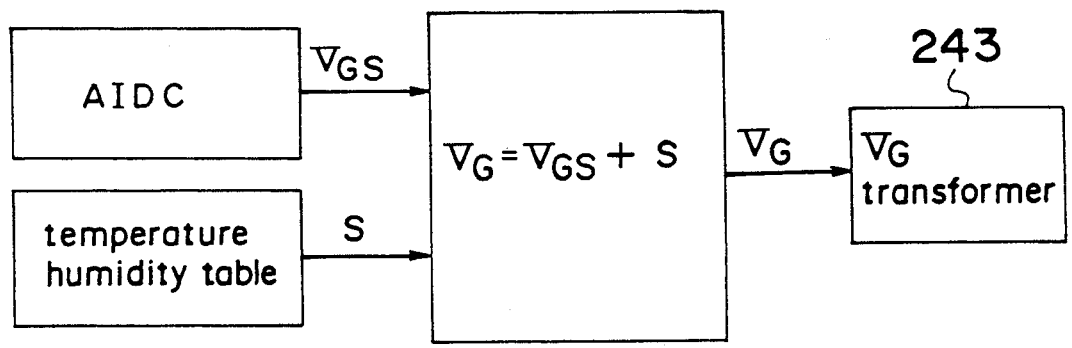
FIG. 39 is a diagram of the amendment of the grid potential $V_G$.
Figure 40:
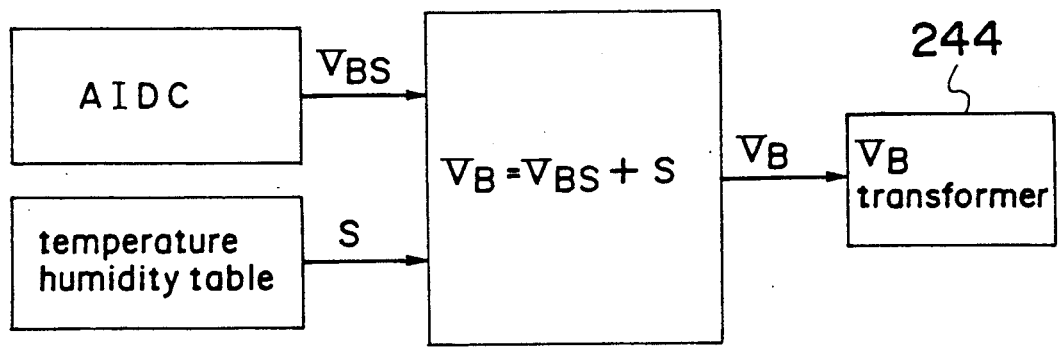
FIG. 40 is a diagram of the amendment of the grid potential $V_B$.

In the above-mentioned two cases, the grid potential $V_G$ or the development bias potential $V_B$ is amended as shown in FIGS. 39 and 40. Further, the amendments of the two potentials may be combined at the same time. For example, if the amendment is not sufficient even when the grid potential $V_G$ after the amendment exceeds the prescribed potential, the development bias potential may be amended to compensate the insufficient portion.

FOURTH EMBODIMENT

A digital color copying machine of the fourth embodiment will be explained below in the following order:
(k) sensitivity characteristic of photoconductor
(l) examples of the automatic density control and gradation correction in electrophotographic process of inversion development The structure of digital color copying machine and the image data processing are the same as in the first embodiment, and they are not explained here.

(K) Sensitivity Characteristic of Photoconductor

When the photoconductor is exposed uniformly, the sensitivity characteristic has a characteristic as expressed by the following equation:

$$V(i) = (V_o - V_R) \exp(-i/k) + V_R, \quad (6)$$

wherein $V_o$ denotes the sensitized potential, $V_R$ denotes the residual potential of latent image and k denotes the sensitivity constant.

On the other hand, in a method of modulating the intensity of exposure light, not only the sensitivity constant k changes, but also the distribution of the potential has a decay when the exposure quantity increases. This is ascribable to the exposure light quantity distribution in the subscan direction.

Figure 41:
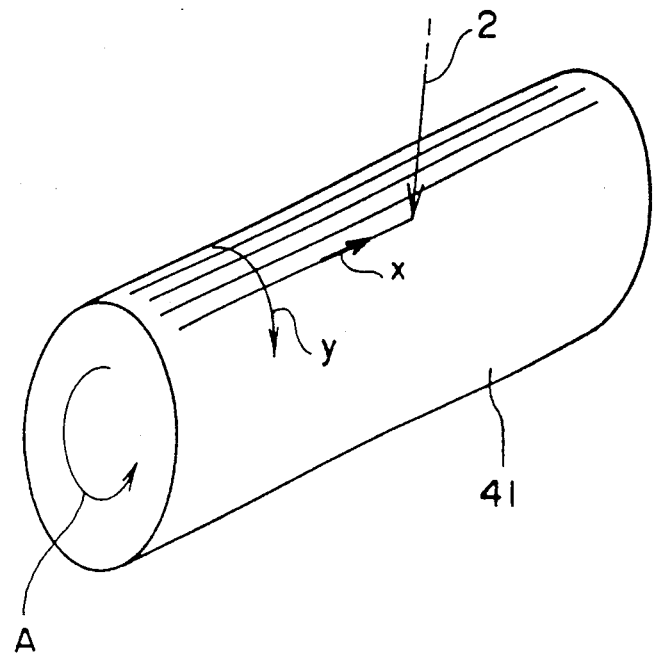
FIG. 41 is a diagram of the scan of laser beam on the photoconductor.

FIG. 41 shows the laser exposure schematically in the intensity modulation method. The photoconductor drum 41 rotates in the direction of an arrow A, while the laser beam 2 scans the surface of the photoconductor in the main scan direction continuously and at a subscan pitch of say 1/300 inch in the subscan direction.

Figure 42:
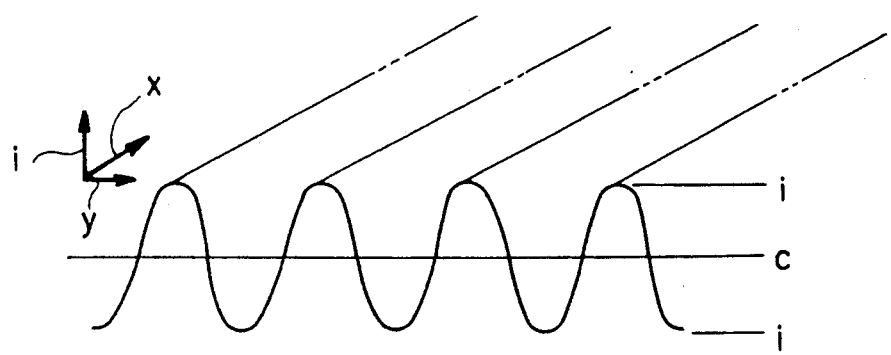
FIG. 42 is a diagram of the light quantity distribution on the photoconductor.

FIG. 42 shows the distribution of exposure light quantity (i) on the surface of the photoconductor drum 41 schematically.

In the following, the latent half-tone image in the method of the modulation of the intensity of exposure light is analyzed by assuming that the laser spot of the laser beam 2 has a Gaussian distribution. The analysis is easy in the points that the exposure light distribution only in the subscan modulation is taken into account and that the shape of the laser spot does not change with the modulation.

The light quantity distribution in the main scan direction x and in the subscan direction y is expressed by the following equation when the light quantity exceeds an average light quantity i.

$$p(i, x, y) = i \rho_a(y), \quad (7)$$

wherein $\rho_a$ denotes the normalized light quantity distribution in the subscan direction. The distribution of latent image potential is obtained from the Eqs. 6 and 7.

$$V(i, y) = F(i \rho_a(y)). \quad (8)$$

Figure 43:
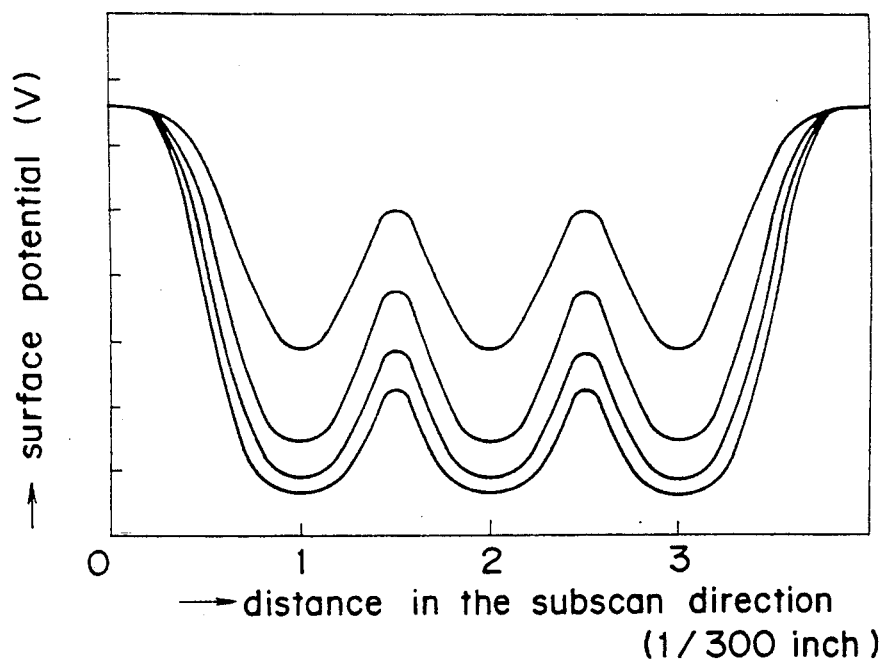
FIG. 43 is a diagram of the surface potential in the subscan direction.
Figure 44:
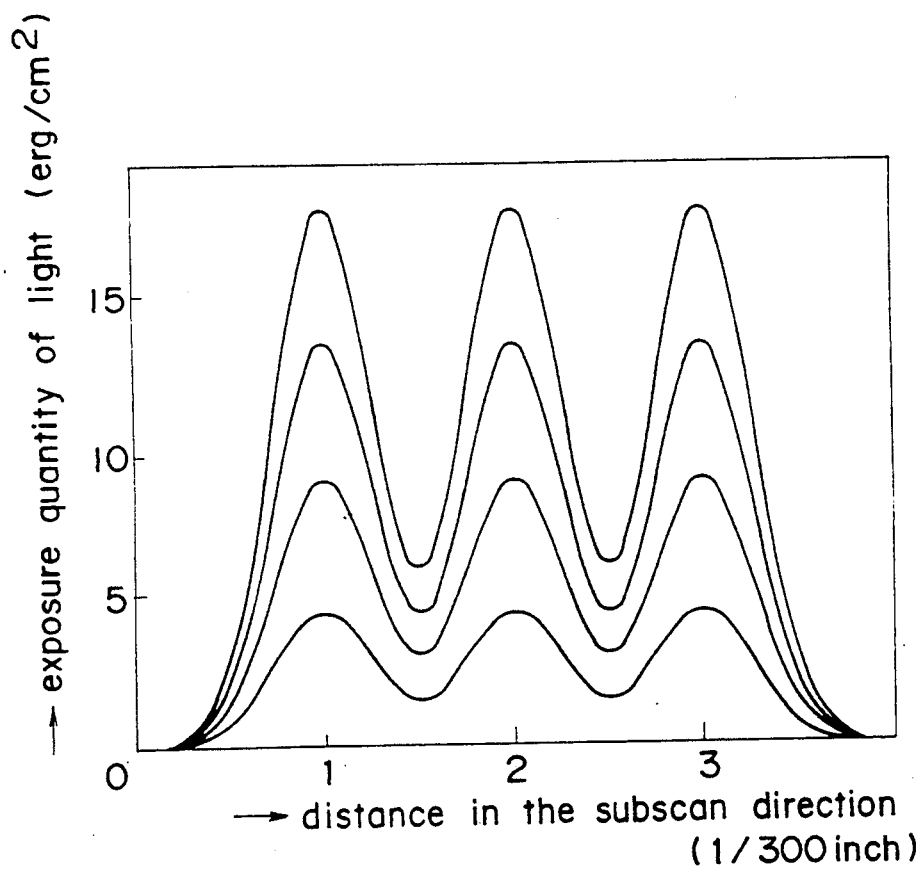
FIG. 44 is a diagram of the exposure light quantity in the subscan direction.

FIGS. 43 and 44 shows the results of the calculations of the light quantity distribution in the subscan direction y and the potential distribution of latent image, respectively.

Figure 45:
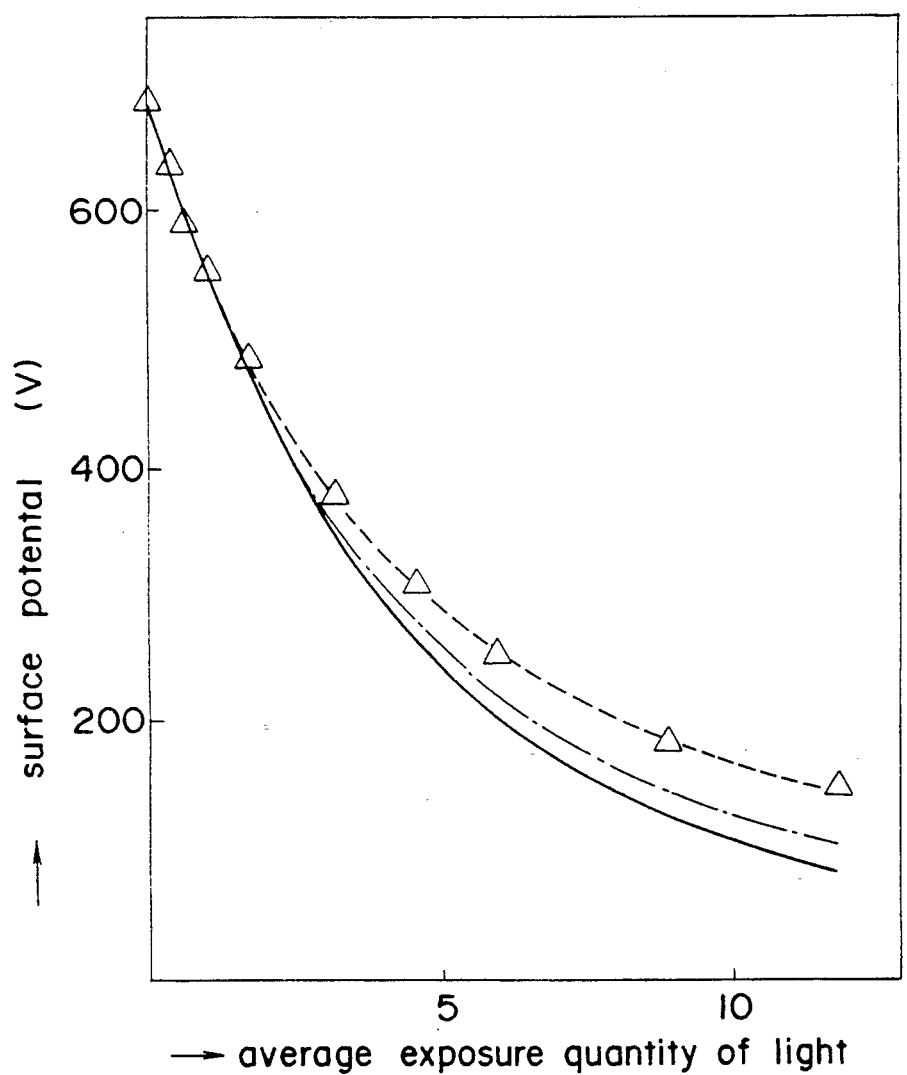
FIG. 45 is a graph of the surface potential plotted against the average exposure light quantity.

The average of the potential distribution of latent image of FIG. 44 is displayed as a dash and point line against the average light quantity in FIG. 45. The average does not agree with the observed light attenuation data. On the other hand, a dashed line in FIG. 12 shows an average of the maximum and minimum of the potential distribution of latent image plotted against the average light quantity, and it agrees well with the observed values denoted as triangle marks. It is confirmed that this holds for the difference between photoconductors and for the difference of the spot diameter of print head. In FIG. 45, a solid line which represents a light attenuation curve in case of uniform exposure is displayed for comparison. Thus, the "apparent" light attenuation curve in the exposure light intensity modulation method can be approximated well by the following equation.

$$V_{ob}(i) = (F(ai) + F(bi))/2, \quad (9)$$

wherein a and b denote the maximum and the minimum in $\rho_a(y)$, respectively, which are determined by the laser spot size.

Figure 46:
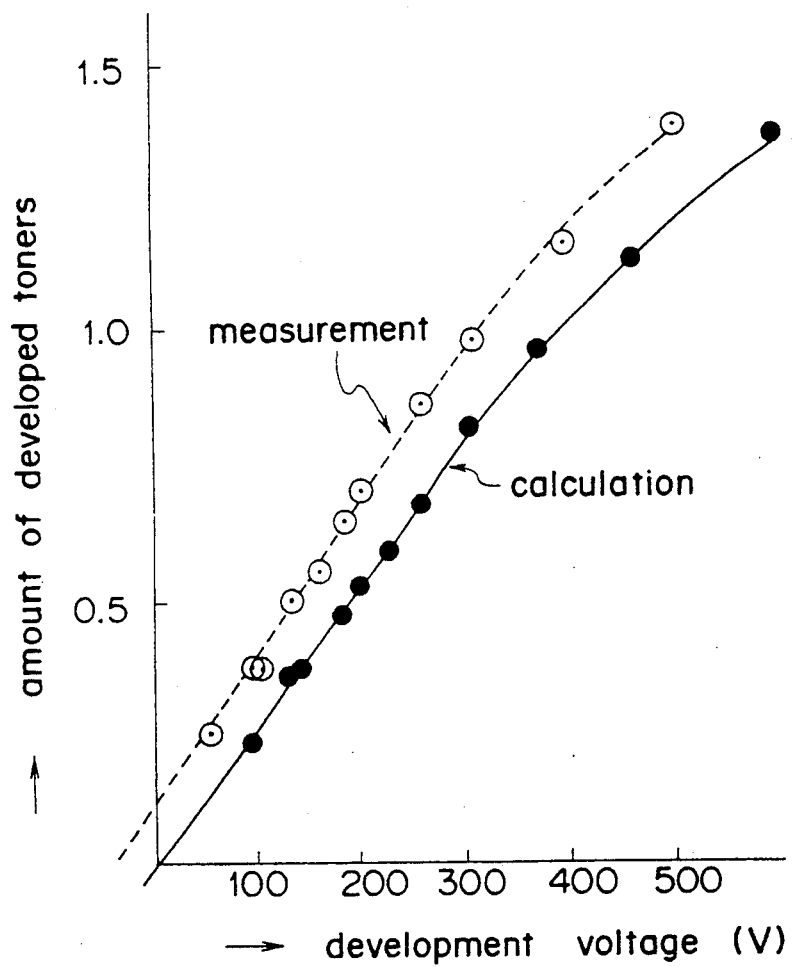
FIG. 46 is a graph of the amount of developed toners plotted against the development voltage.

On the other hand, a half-tone image does not have a texture in the light intensity modulation method. Therefore, a half-tone image is determined only by the half-tone density and the amount of adhered toners. As a parameter which determines the amount of adhered toners, it is found that the development potential obtained from the average of the potential distribution is more appropriate than the development potential obtained from the "apparent" light attenuation curve $(V_I - V_B)$, because the former is a line which passes the origin as shown in FIG. 46.

The light attenuation curve obtained from the average of the potential distribution of latent image is called as the "effective" light attenuation curve, and it is defined as the following equation.

$$V_{ef}(i) = 1/d \int_0^d F(ip_d(y))dy, \quad (10)$$

wherein d denotes the pitch in the subscan direction.

If the light quantity distribution function is approximated as a flat distribution, the following approximate equation holds well.

$$V_{ef}(i) = 1/(a-b)i \int_b^a F(ix)dx. \quad (11)$$

Figure 47:
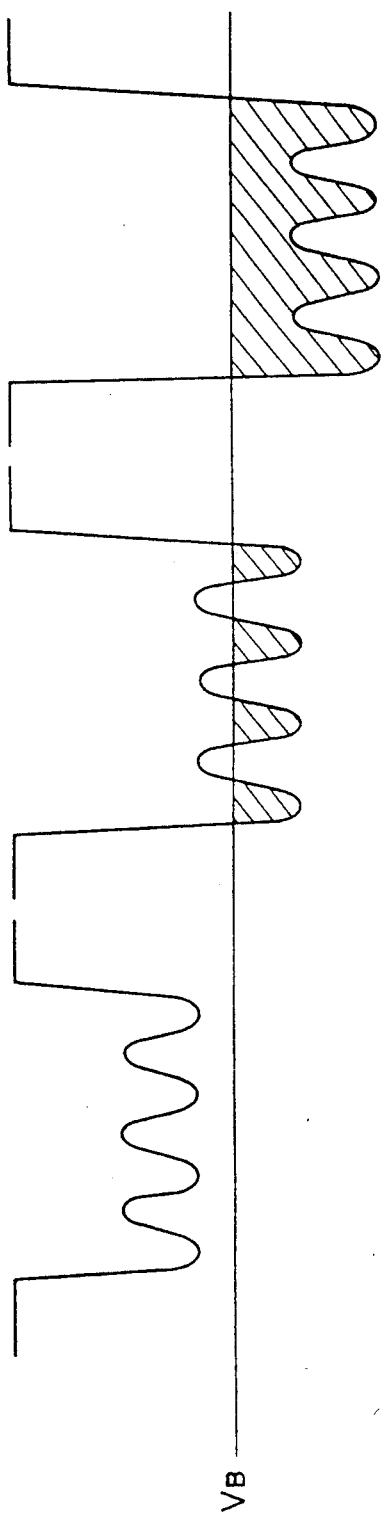
FIG. 47 is a diagram for explaining the adhesion of toners in the shaded region.

The effective development potential which determines the amount of developed toners can be obtained from the effective light attenuation function. The development starts when the potential at the maximum "ai" of the exposure light quantity becomes smaller than the development bias potential $V_B$. Toners adhere only the portions where the latent image potential is larger than the development potential when the potential at the minimum "bi" of the exposure light quantity is smaller than the development bias potential. FIG. 47 shows this state as a shaded area. That is, the effective development quantity can be expressed as the following equations, wherein "c" denotes the light quantity so the $V(c)=V_B$.

If $C > ai$, $$\Delta V_{ef}(i) = 0. \quad (12)$$

If $ai < c < bi$, $$\Delta V_{ef}(i) = 1/(a-b)i \int_c^{ai} F(x)dx - V_B. \quad (13)$$

If $bi < c$, $$\Delta V_{ef}(i) = V_{ef}(i) - V_B. \quad (14)$$

When the effective development potential determined by the Eqs. 12-14 is compared with the apparent development potential as to the gradation reproducibility by changing the surface potential $V_o$ and the development bias potential $V_B$, it is found that the effective development potential $\Delta V_{ef}$ is a good parameter which determines the amount of developed toners.

Eqs. 12-14 show that the modulation characteristic or the effective development potential $\Delta V_{ef}$ is a function of the maximum (light quantity distribution constant) a, the sensitivity constant k and the residual potential $V_R$.

The residual potential $V_R$ and the sensitivity constant k determine the sensitivity characteristic of the photoconductor drum 41, and they are affected by the temperature and the humidity. Further, the light quantity distribution constant "a" is a function of the optical system of laser beam 2, and it is affected by the distortion of the components of the optical system due to the temperature and humidity.

In this embodiment, the temperature and the humidity around the photoconductor are detected, while the surface potential, the exposure potential and the residual potential of the photoconductor are also detected. Then, the sensitivity characteristic of the photoconductor is calculated. Then, the detection data, and the exposure light quantity, the development bias potential, the surface potential or the gamma correction table is amended according to the sensitivity characteristic. Thus, stable gradation reproducibility can be realized. Further, the reproduced image is stabilized against the sensitivity change of photoconductor, and the surface potential of the photoconductor and the optical system can be amended.

(1) Examples of the Automatic Density Control and Gradation Correction in Electrophotographic Process of Inversion Development Five examples of the automatic density control and the gradation correction in electrophotographic process of inversion development will be explained below.

(1-1) first example

The same combinations ($V_B$, $V_o$) of the bias voltage $V_B$ the developer 45a-45d and the surface potential $V_o$ on the photoconductor drum 41 of Table 1 in the first embodiment is used.

As shown in Table 1, the detection value of the AIDC sensor 210 is classified to density detection levels (LBA) 0-11 displayed in the left-most column according to the amplitude of the detection value. According to the density detection level LBA, the grid potential $V_G$ is changed from 500 V to 1000 V (step 3-25 as to the input step $V_GS$ of the grid potential transformer of the grid potential generator 243) and the development bias voltage $V_B$ is changed from 280 to 710 V (step 3-25 as to the input step $V_BS$ of the development bias potential transformer of the development bias potential generator 244), while a shift value G is sent in order to prepare a gamma correction table improved for the gamma characteristics at low densities. In this embodiment, only one standard gamma correction table in correspondence to LBA level 7 is stored in the data ROM 203, and other gamma correction tables for the other LBA levels are obtained by adding the shift value to the standard gamma correction table T6.

The density control of the copying machine will be explained below.

In the electrophotographic process of inversion development of the present invention, the image reproduction density is controlled automatically according to the surface potential $V_o$ and the development bias voltage $V_B$. In this embodiment, the surface potential $V_o$ is controlled by the grid potential $V_G$. However, it may be controlled by other means.

The amount of adhered toners at a prescribed quantity of exposure light is detected by the AIDC sensor 210. A standard toner image is formed in the image forming conditions ($V_G=660$ V, $V_B=420$ V, exposure level EXL=100). In these conditions, the surface potential $V_I$ after exposure is 300 V and the development voltage $\Delta V = |V_B - V_I| = 100$ V. The detection signal of the standard toner image by the AIDC sensor 210 is sent to the printer controller 201 which calculated the adhered amount of toners according to the detection signal or the density of the standard toner image is measured from the detected amount of adhered toners.

In this embodiment, the image forming conditions of the standard toner image is changed according to the prediction of the sensitivity characteristic of the photoconductor. Thus, the reliability of the AIDC sensor 210 is improved.

Then, the automatic density control is performed by changing the surface potential $V_o$ (or the grid potential $V_G$) and the development bias potential $V_B$ according to the detected signal in order to keep the adhered amount of toners constant at the maximum density level.

The gamma correction coefficient G is outputted according to the selected combination of ($V_O$, $V_B$) in order to select the gamma correction table as a standard before the amendment due to the gradation amendment data. The gamma correction coefficient G is a shift value against the standard gamma correction table of LBA level 7 (T6 in FIG. 11). The shift value means the difference of the initial light quantity for image reproduction.

Figure 48:
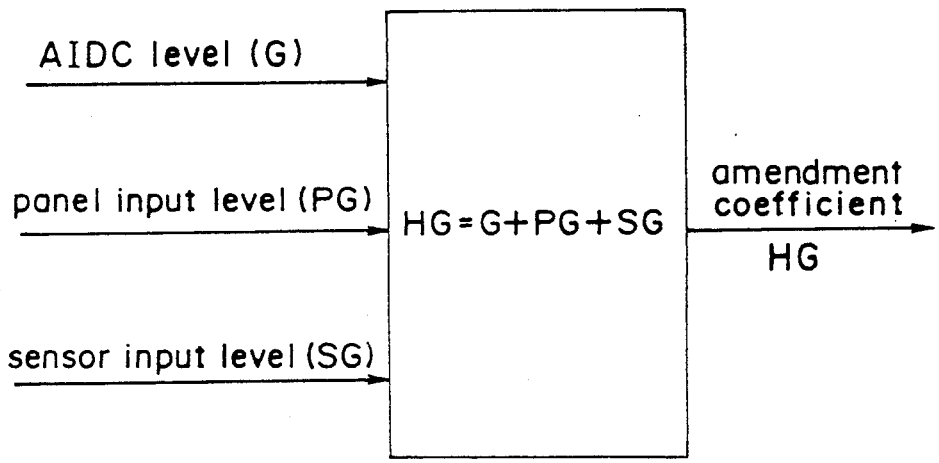
FIG. 48 is a diagram of calculation of the amendment coefficient HG.

Next, the gamma amendment processing is explained. In the present embodiment, the gamma correction table is made finally by adding an amendment coefficient PG of a gradation control switch 6 or the like or an amendment coefficient SG due to the outputs of the temperature sensor 212 and the humidity sensor 213 to abovementioned the gamma amendment coefficient G. That is, as shown in FIG. 48, the amendment coefficient HG for amending the gamma correction table is calculated by adding a signal PG and a signal SG to the gamma amendment coefficient G. The signal PG is determined according to the selection with the gradation control switch 6 in the operational panel 221 (FIG. 7) by a user or to the change of a DIP switch or the like by a service man or to the addition of the two selections. The signal SG is determined according to the $V_O$ sensor 44 or to the temperature sensor 212 and the humidity sensor 213 or to both sensors.

Table 13 shows the amendment coefficient table according to the surface potential $V_O$, while Table 14 shows the amendment coefficient table according to the temperature and humidity signals of the temperature and humidity sensors 212 and 213.

Figure 49:
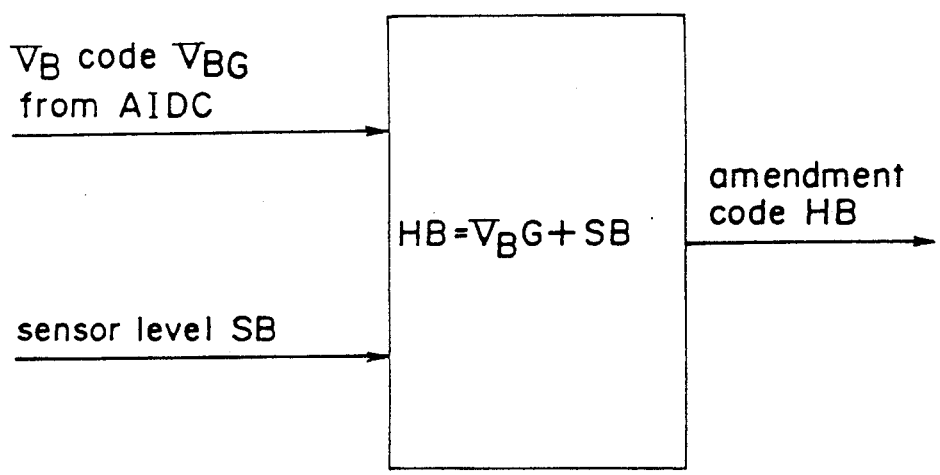
FIG. 49 is a diagram of calculation of the amendment coefficient HB.

The amendment is also performed as to the development bias potential $V_B$. As shown in FIG. 49, the $V_B$ amendment code SB ($-2-+2$) is added to the bias potential $V_B$ code $V_BG$ selected by the AIDC action, and the amended development bias $V_B$ code HB is calculated.

TABLE 13

| Temp | SB |
| --- | --- |
| 10° C. | +2 |
| 18° C. | +1 |
| 25° C. | 0 |
| 32° C. | −1 |
| 40° C. | −2 |

Figure 50:
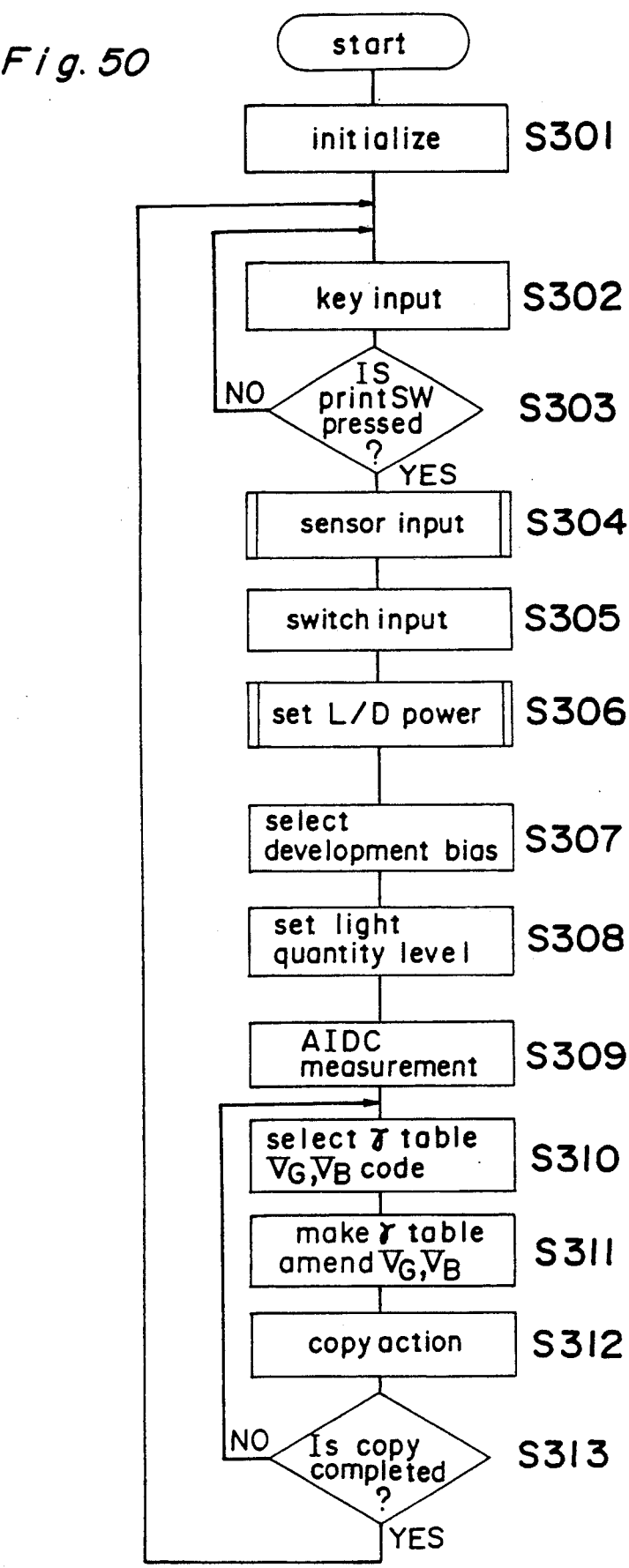
FIG. 50 is a flowchart of the control of digital color copying machine.

FIG. 50 shows a control flow of the printer controller 201 of the digital color copying machine.

At step S301, the initialization of the printer controller 201 is performed, and at step S302, the input processing of the operational panel 221 is performed. Next, at step S303, it is decided if the start key 8 in the operational panel 221 is pressed or not. If it is decided that the start key 8 is not pressed (NO at step S303), the flow returns to step S302 again, and waits until the start key 8 is pressed.

If it is decided at step S303 that the start key 8 is pressed, the sensor input processing is performed at step S304. In this processing shown in detail in FIG. 51, first, at step S3041, the temperature and the humidity detected by the temperature sensor 212 and the humidity sensor 213 are received, and the photoconductor sensitivity amendment data SP, the gamma correction amendment data SG and the development bias potential $V_B$ amendment data SB are determined according to Table 14. Then, at step S3042, data of other sensors are received. Then, the flow returns to the main flow. Thus, the residual potential $V_R$, the sensitivity constant k and the light quantity distribution constant "a" are obtained later from the detection results of the temperature sensor 212 and the humidity sensor 213 with table processing, and the amendment values for the development bias potential $V_B$, the light quantity and the gamma correction are determined with table processing. The results are stored in the RAM.

TABLE 14

| | amendment data SP | | | | |
| --- | --- | --- | --- | --- | --- |
| | temperature | | | | |
| humidity | 10° C. | 18° C. | 25° C. | 32° C. | 40° C. |
| 90% | +3 | +2 | +1 | +1 | 0 |
| 70% | +2 | +1 | 0 | 0 | −1 |
| 50% | +2 | +1 | 0 | −1 | −2 |
| 30% | +2 | +1 | 0 | −1 | −2 |
| 10% | +2 | +1 | 0 | −2 | −3 |

At step S305 in FIG. 50 of the switch input processing, the correction code in correspondence to the input signal from the DIP switch and the gradation control switch of the operational panel 221 shown in FIG. 7 is stored in the RAM in the printer controller 201.

Figure 52:
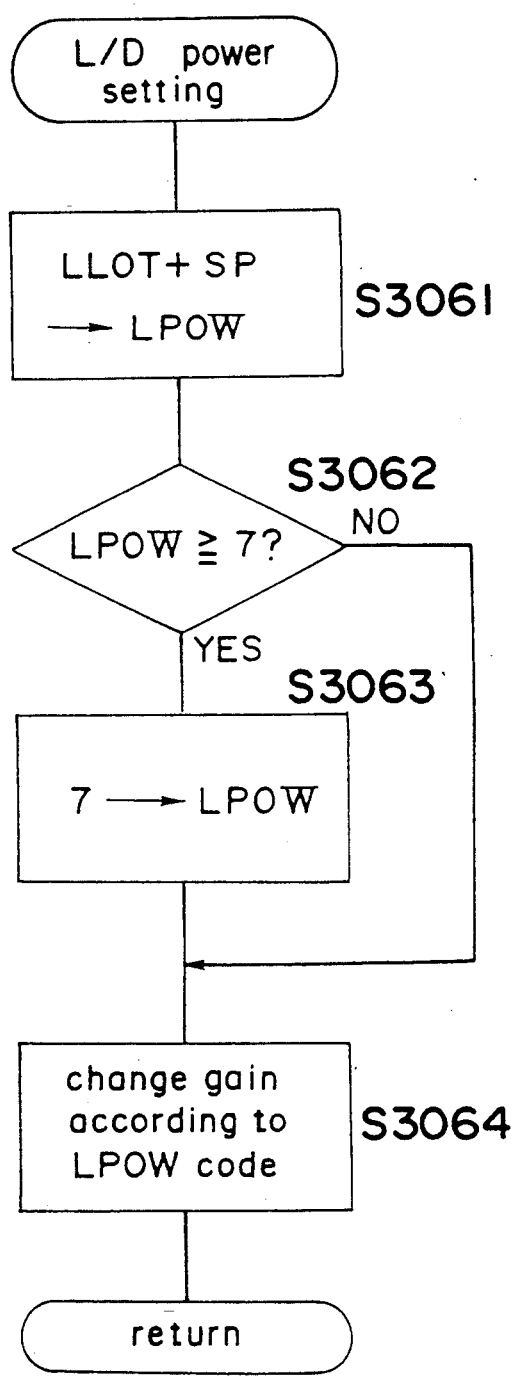
FIG. 52 is a diagram of the semiconductor laser power setting processing.

Then, at step S306, the power of the semiconductor laser 264 is set. FIG. 52 shows the flow of the power setting processing in detail. First, at step 3061, LLOT (photoconductor lot switch code) and SP (sensitivity amendment data) are added to obtain a 3-bit power code (LPOW). Then, at step S3062, it is decided if LPOW is larger than the maximum (7), and if LPOW is larger than 7, LPOW is set to be 7 at step S3063. Then, at step S3064, the gain is changed according to the LPOW code shown in Table 15, and the flow returns to the main flow.

TABLE 15

| rank | light quantity level |
| --- | --- |
| A | 2 |
| B | 3 |
| C | 4 |
| D | 5 |

Then, at step S307 in FIG. 50, the development bias potential $V_B$ for the AIDC action is determined by adding the $V_B$ amendment code SB stored in the RAM to the standard $V_B$ code for the AIDC processing.

Next, at step S308, the light quantity for detecting the standard toner image in the AIDC action is determined by adding the gamma correction table amendment code SG stored in the RAM to the light quantity level (standard = 120).

Then, at step S309, the AIDC processing is performed. In the AIDC processing, after the grid potential $V_G$ and the development bias potential $V_B$ are set to be prescribed standard values, a toner image of a standard image pattern is formed on the photoconductor drum 41 and the amount of adhered toners of the image is measured with the AIDC sensor 210 and it is stored in the RAM in the printer controller 201.

Next, at step S310, the density detection level LBA is selected according to the amount of adhered amount measured at step S306, and the grid potential $V_G$, the development bias potential $V_B$ and the shift value G are also selected according to the density detection level LBA.

Next, at step S311, the amendment code PG received from the operational panel and the correction coefficient SG due to the sensor inputs are added to the coefficient G to obtain an amendment coefficient HG, and the gamma correction table is made by adding the amendment coefficient HG to the standard gamma correction table. Further, as to the development bias potential $V_B$, an amended code HB is obtained by adding the $V_B$ code $V_BG$ selected in the AIDC processing to the sensor level SB.

Further, at step S312, the known copy action is carried out by using the selected grid potential $V_G$, development bias potential $V_B$ and the gamma correction table.

Then, it is decided if the copy action completes or not at step S313. If the copy action is decided to completes, the flow returns to step S302, otherwise the flow returns to step S310.

(1-2) broken line approximation

Next, a modified example of the first example is explained. The gamma correction characteristic of broken line approximation can also be used instead of the above-mentioned standard gamma correction table. In this case, only the gamma correction data at the kink points of the broken line approximation are stored in the data ROM 203. As to the read data between two kink points, a line between the two kink points is used to calculate the laser exposure level EXL. Thus, the memory capacity for the gamma correction data can be reduced largely.

It is desirable that the gradation characteristic is approximated at least in three sections, the low density section, the high density section and the intermediate section between the low and high density sections wherein the density varies most rapidly. Therefore, two or more kink points are provided. In this example, the approximation of ten broken lines is used and the data of the kink points in the input level 0–255 are stored in the data ROM 203. Then, the data capacity can be reduced to 1/10 of the example 1.

The eleven kink points for the ten sections are selected to improve the reproducibility at low densities. To be concrete, as shown in Table 16, the points of 0, 4, 8, 16, 31, 64, 128, 160, 192, 224 and 255 are selected. Table 16 also compiles the slope a(N) and the constant b(N) of the lines in the ten sections. The gamma correction section 253 rewrites the gamma correction table in the data ROM 203 according to HG, and store the data in the RAM.

TABLE 16

| N | upper limit k(N) of input level section | a (N) | b (N) |
|---|---|---|---|
| 1 | 4 | 92 | 0 |
| 2 | 8 | 24 | 68 |
| 3 | 16 | 10 | 96 |
| 4 | 32 | 8 | 104 |
| 5 | 80 | 8 | 104 |
| 6 | 96 | 11 | 32 |
| 7 | 128 | 15 | −96 |
| 8 | 160 | 17 | −168 |
| 9 | 176 | 23 | −408 |
| 10 | 255 | 21 | −320 |

The gamma correction table is rewritten according to HG in the first section of 0 to $x_A$ with use of the following equations:

$$a'(1) = (x_A a(1) + 4 \times HG/x_A, \tag{15}$$

and $$b'(1) = b(1) = 0. \tag{16}$$

The following equations are used in the last section of $x_B$ to 255:

$$a'(10) = a(10) + 4 \times HG/(K(10) - K(9)), \tag{17}$$

and $$b'(10) = 1024 - 255 x a'(10). \tag{18}$$

In an N-th section between the first and last sections, the following equations are used:

$$a'(N) = a(N), \tag{19}$$

and $$b'(N) = b(N) + 4 \times HG. \tag{20}$$

Thus, a continuous gradation curve can be generated in the intermediate sections from $x_A$ to $x_B$ by adding HG to the light quantity.

In the broken line approximation, when the input level X is received, the coefficients a'(N) and b'(N) for the section including the input level X are read, and the calculation $Y = a'(N) \times X + b'(N)$ is performed. For example, if the gamma correction table of Table 16 is used, when the input level is 50, the section N is found to be 5. Then, a(5)=5 and b(5)=24 are read and the calculation of $a(5) \times 50 + b(5)$ is performed and the conversion level Y is obtained.

Other approximations which can reduce the number of the gradation correction data may be used. In those cases, the data for expressing the approximation equations are stored in the memory.

(1-3) amendment for photoconductor lot characteristic

In this example, the gamma correction table selected by taking into account the difference between lots of photoconductor drum 41. The difference is set as a photoconductor lot switch code LLOT.

The same combination of the development bias voltage $V_B$ and the surface potential $V_0$ of Table 1 is used, and the image forming conditions of the standard toner image in the AIDC measurement are changed according to the calculation of the sensitivity characteristic of the photoconductor. Thus, the reliability of the AIDC sensor 210 is improved.

Figure 53:
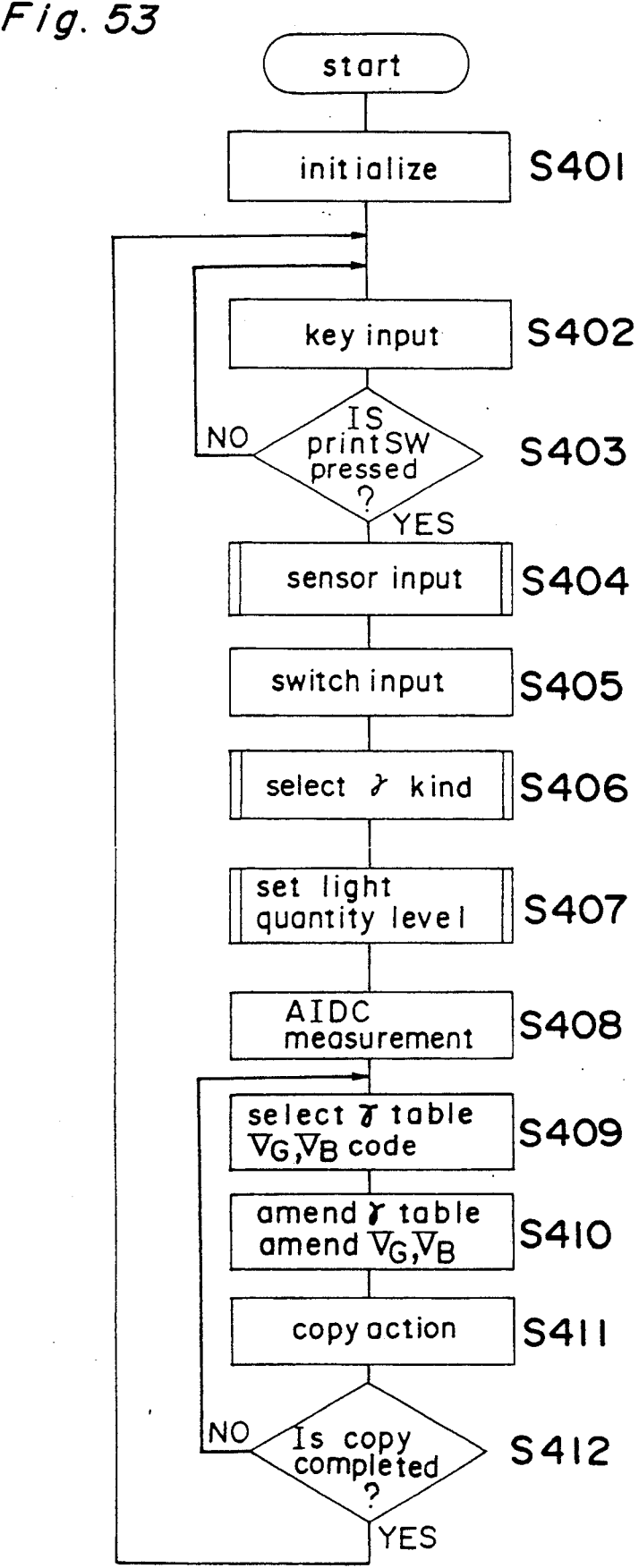
FIG. 53 is a flowchart of the control of digital color copying machine.

FIG. 53 shows a control flow of the printer controller 201.

At step S401, the initialization of the printer controller 201 is performed, and at step S402, the input processing of the operational panel 221 is performed. Next, at step S403, it is decided if the start key 8 in the operational panel 221 is pressed or not. If it is decided that the start key 8 is not pressed (NO at step S403), the flow returns to step S402 again, and waits until the start key 8 is pressed.

Figure 51:
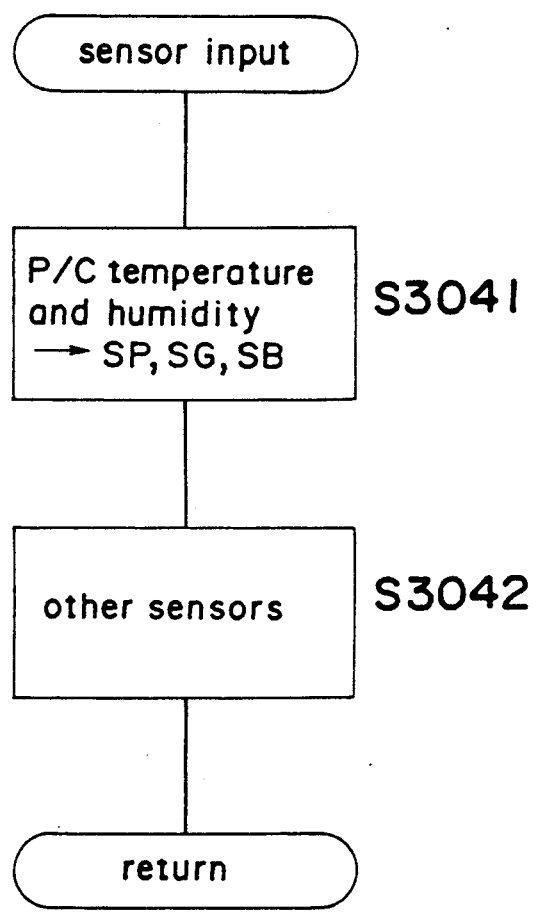
FIG. 51 is a flowchart of the sensor input processing.
Figure 54:
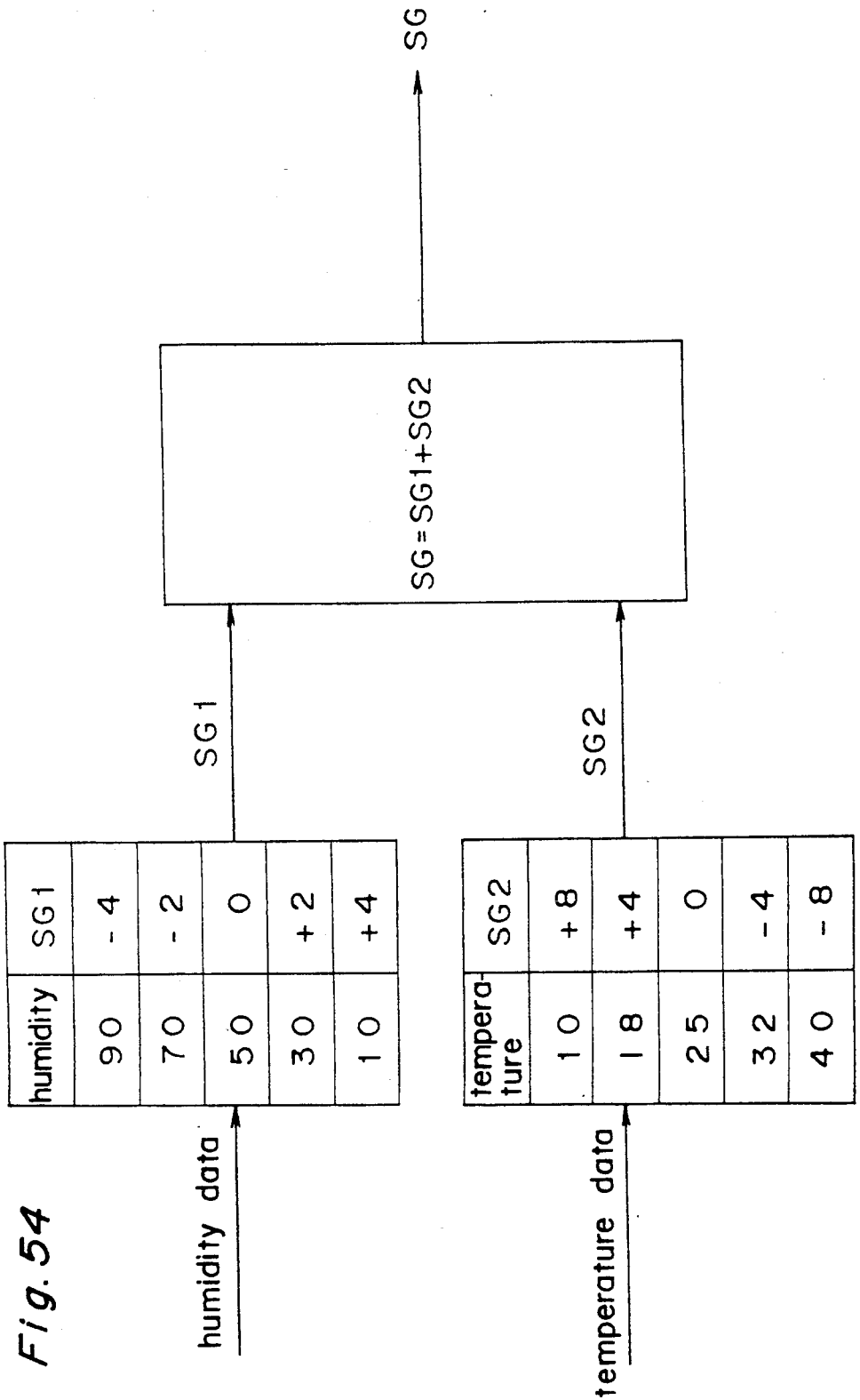
FIG. 54 is a diagram of calculation of the amendment coefficient SG.

If it is decided at step S403 that the start key 8 is pressed, the sensor input processing shown in detail in FIG. 51 is performed at step S404. In this processing, the temperature and the humidity measured by the sensors 212 and 213 are processed with tables to obtain the residual resistivity $V_R$, the sensitivity constant k and the maximum "a". Then, the gamma kind selection code is obtained from "k" and the amendment data for the gamma correction is obtained from the residual potential $V_R$ and the sensitivity constant "k". That is, the photoconductor sensitivity amendment data SP, SS and the gamma correction amendment data SG are obtained from the detection results of the temperature sensor 212 and the humidity sensor 213 by using Table 17 and as shown in FIG. 54.

TABLE 17

| humidity | amendment data SS temperature | | | | |
|---|---|---|---|---|---|
| | 10° C. | 18° C. | 25° C. | 32° C. | 38° C. |
| 90% | +3 | +2 | +1 | +1 | 0 |
| 70 | +2 | +1 | 0 | 0 | −1 |
| 50 | +2 | +1 | 0 | −1 | −2 |
| 30 | +2 | +1 | 0 | −1 | −2 |
| 10 | +2 | +1 | 0 | −2 | −3 |

At step S405 in FIG. 53 of the switch input processing, an amendment code in correspondence to the input signal from the DIP switch and the gradation control switch 6 of the operational panel 221 shown in FIG. 7 is stored in the RAM in the printer controller 201.

Figure 55:
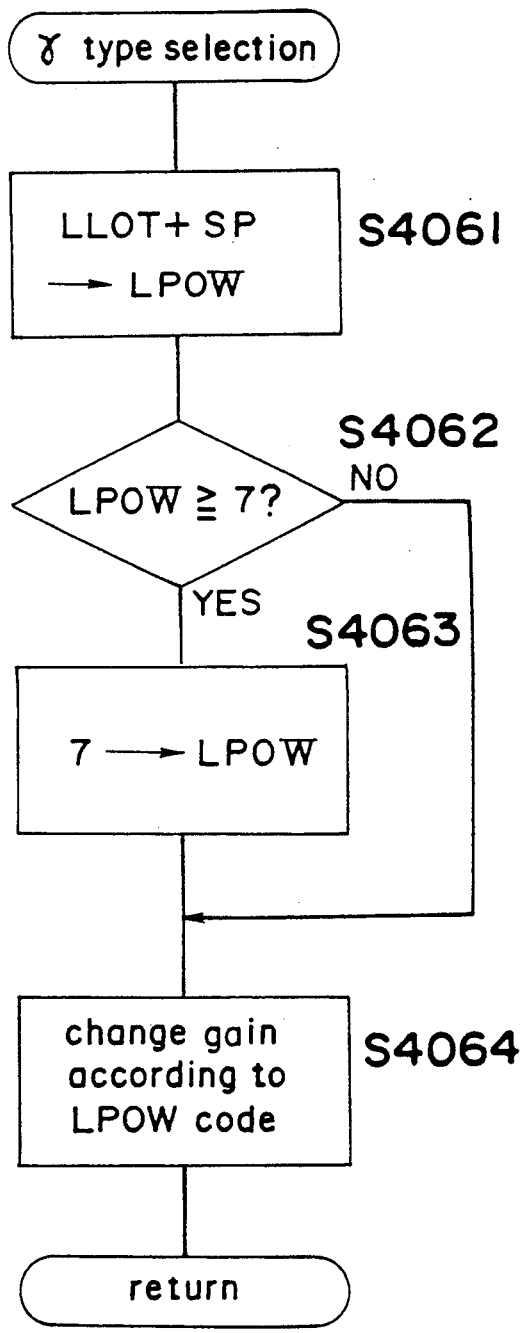
FIG. 55 is a flowchart of the gamma type selection processing.

Next, at step 406, the gamma kind selection processing is performed. As shown in detail in FIG. 55, first, at step 4061, LLOT (photoconductor lot switch code) and SP (sensitivity amendment data) are added to obtain a 3-bit gamma selection code (HS). Tables 18 and 19 show the gamma selection code HS and the gamma kind set level due to LOT rank, respectively. Next, at step S4062, it is decided if HS is larger than the maximum (7), and if HS is larger than 7, HS is set to be 7 at step S4063. Then, at step S3064, the gamma correction table T0–T7 is selected according to the HS code, and the flow returns to the main flow.

TABLE 18

| HS | γ correction table |
|---|---|
| 0 | T0 |
| 1 | T1 |
| 2 | T2 |
| 3 | T3 |
| 4 | T4 |
| 5 | T5 |
| 6 | T6 |
| 7 | T7 |

TABLE 19

| rank | LLOT |
|---|---|
| A | 2 |
| B | 3 |
| C | 4 |
| D | 5 |

Figure 56:
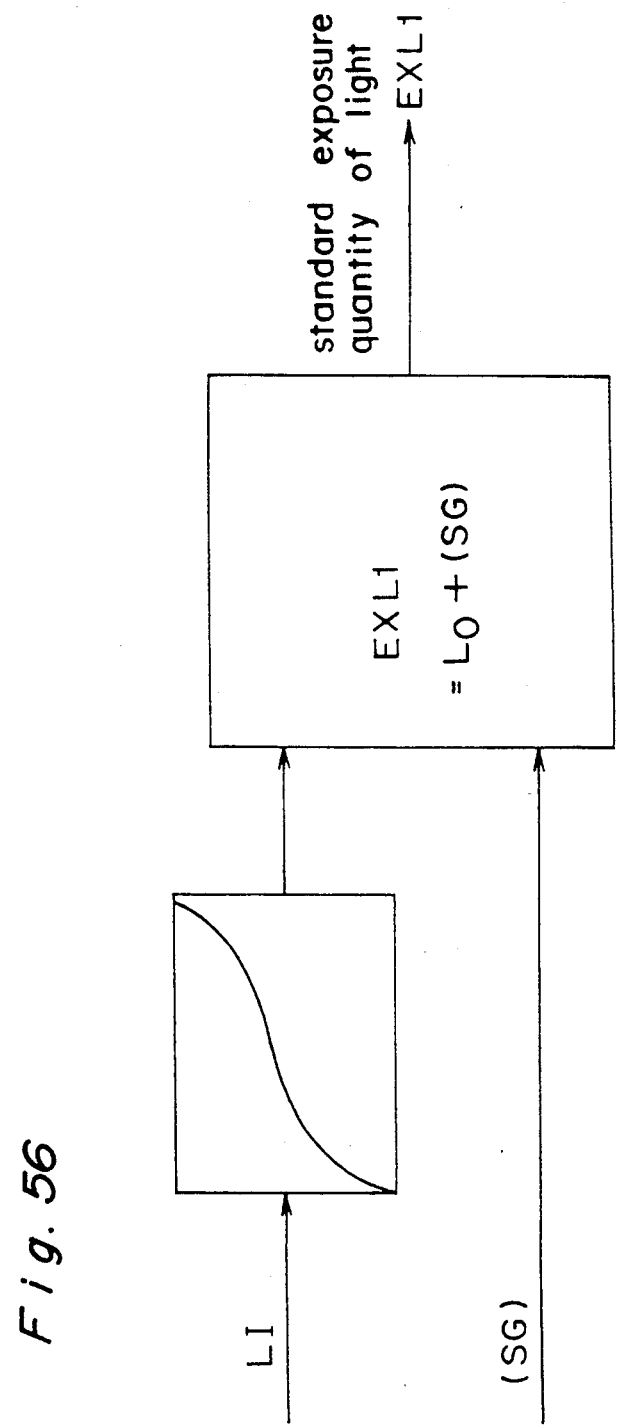
FIG. 56 is a diagram of the amendment of the exposure light quantity.
Figure 57:
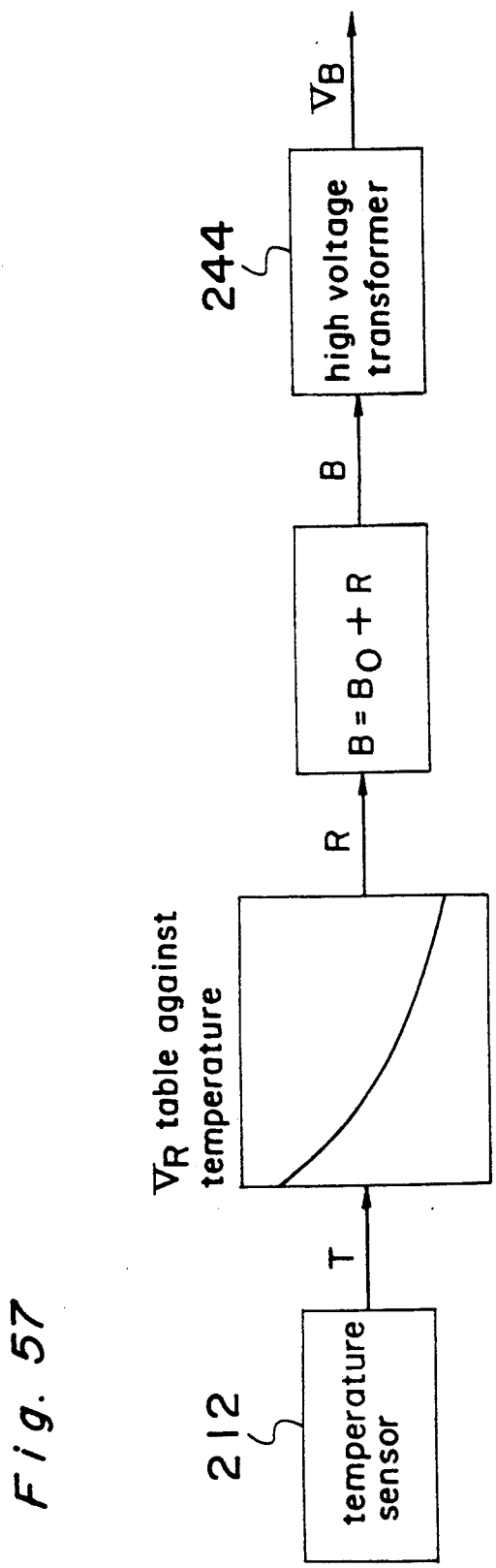
FIG. 57 is a diagram of the amendment of the bias potential.
Figure 58:
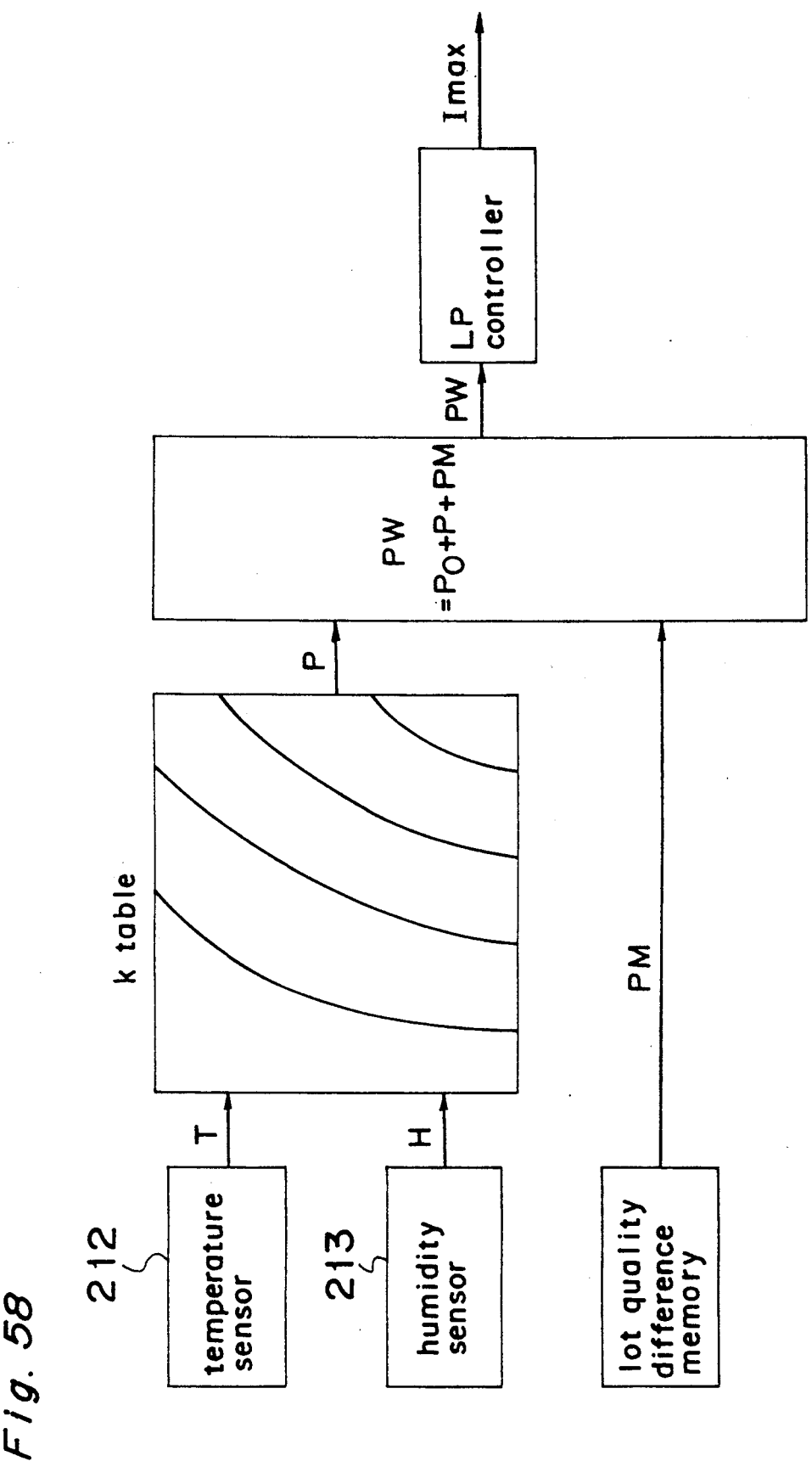
FIG. 58 is a diagram of the amendment of the laser power.
Figure 59:
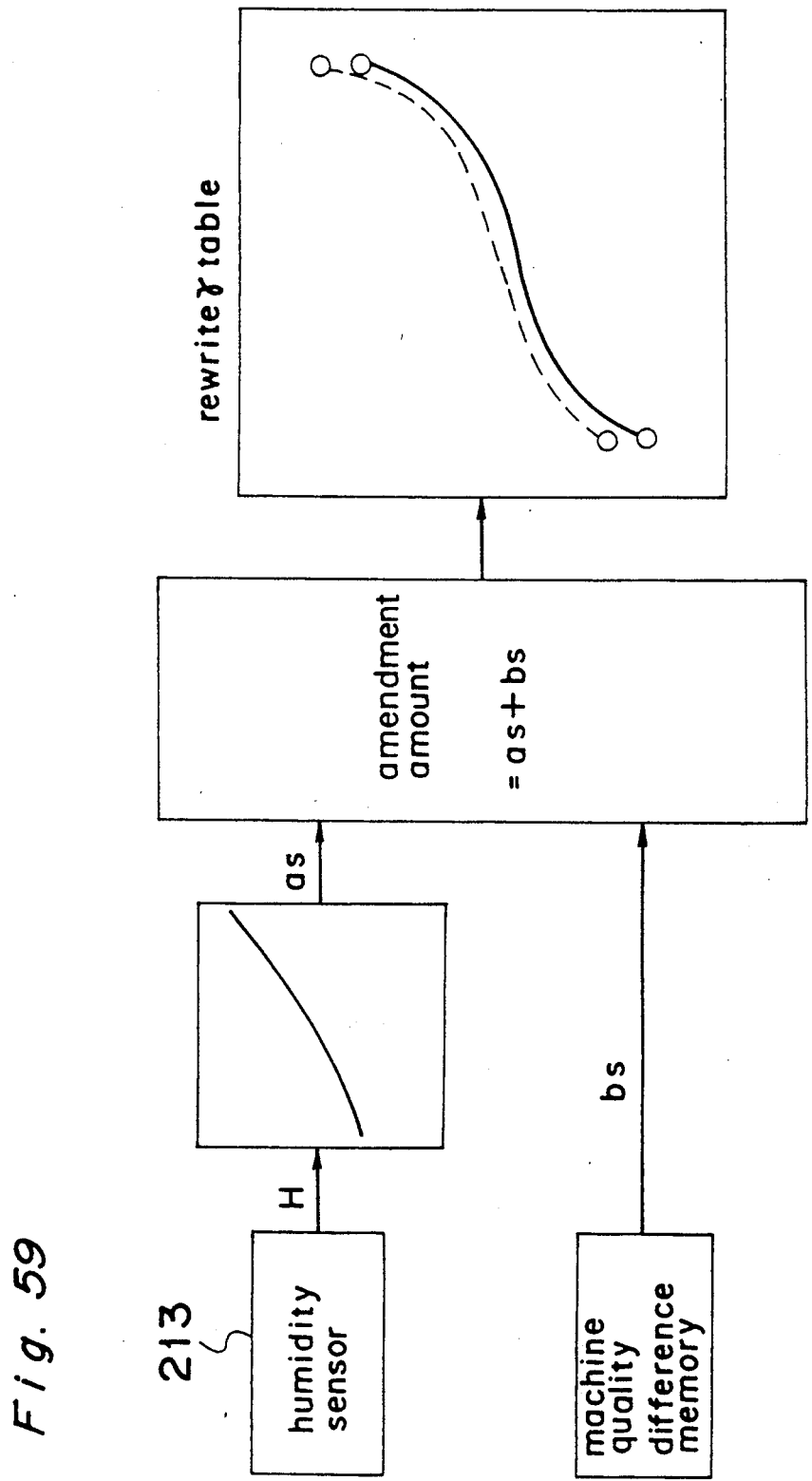
FIG. 59 is a diagram of the amendment of the gamma correction table.
Figure 60:
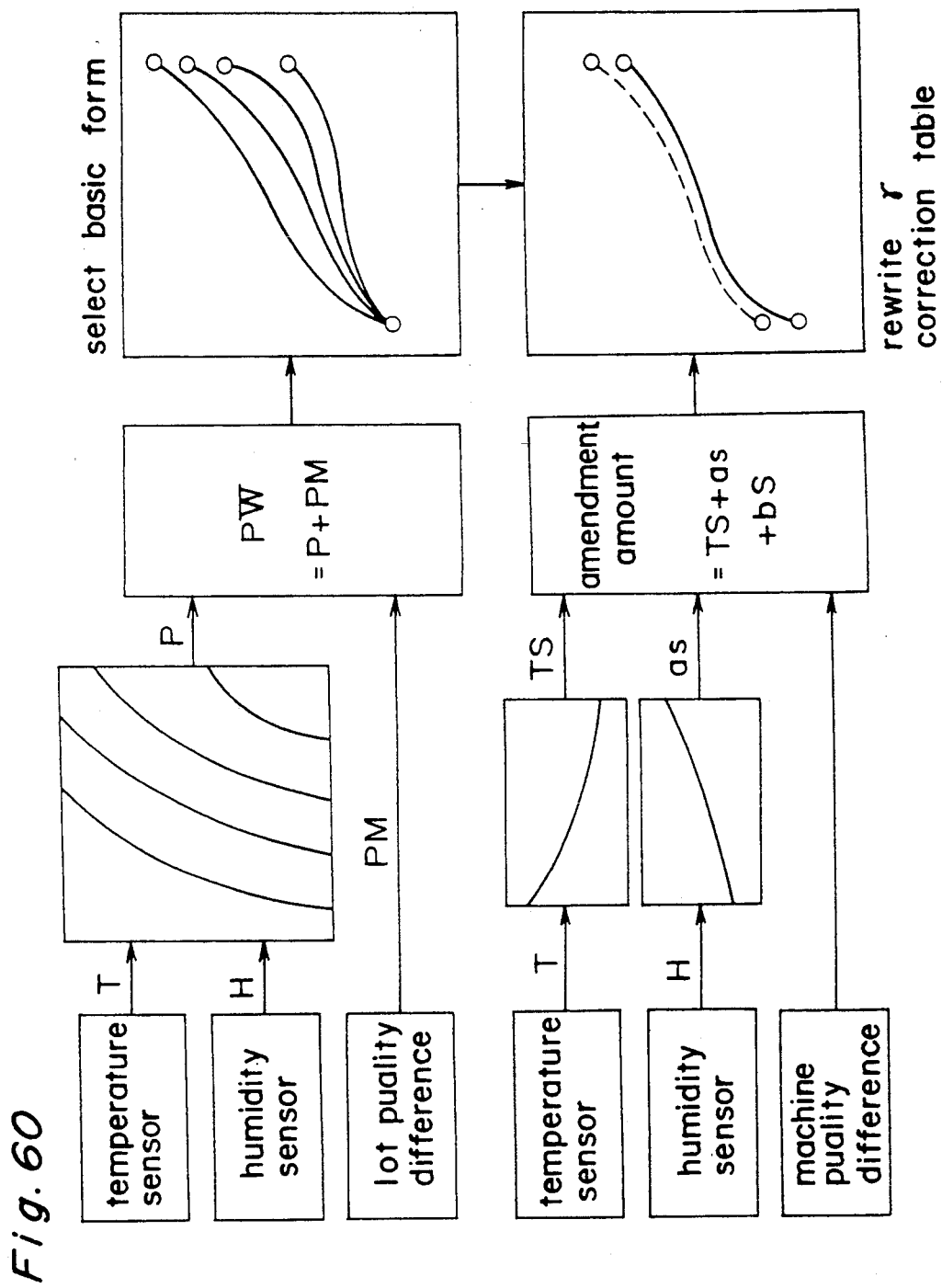
FIG. 60 is a diagram of the amendment of the gamma correction table.

Next, at step S407 in FIG. 53, the light quantity level is set as in FIG. 52. As shown in FIG. 56, the light quantity is converted at input level LI=140 by using the selected gamma correction table to obtain the light quantity LO. Thus, the light quantity is amended against the sensitivity constant k. Further, the LD exposure light quantity level EXL1 is obtained by adding the gamma correction amendment data SG, PG stored in the steps S404 and S405 to the light quantity LO.

Then, at step S408, when the start switch 8 is pressed, the AIDC processing is performed. In the AIDC processing, after the grid potential $V_G$ and the development bias potential $V_B$ are set to be prescribed standard values, a toner image of a standard image pattern is formed on the photoconductor drum 41 at the amended light quantity. Then, the amount of adhered toners of the image is measured with the AIDC sensor 210, and it is stored in the RAM in the printer controller 201.

Next, at step S409, the density detection level LBA is selected according to the amount of adhered amount measured at step S408, and the grid potential $V_G$, the development bias potential $V_B$ and the gamma correction shift value G are also selected according to the density detection level LBA.

Next, at step S410, the amendment coefficient PG received from the operational panel and the amendment coefficient SG due to the sensor inputs are added to the gamma shift value G to obtain an amendment coefficient HG, and the gamma correction table is made by adding the amendment coefficient HG to the standard gamma correction table.

Further, at step S411, the known copy action is carried out by using the selected grid potential $V_G$, development bias potential $V_B$ and the gamma correction table.

Then, it is decided if the copy action completes or not at step S412. If the copy action is decided to completes, the flow returns to step S402, otherwise the flow returns to step S409.

(1-4) amendment due to accumulating total number of printing

In this example, the changes of the maximum exposure light quantity $a_m$, the sensitivity constant k and the residual potential $V_R$ due to printing is amended according to the accumulating total number of the rotation of the photoconductor drum 41.

The accumulating total number affects the sensitivity constant k and the residual potential $V_R$.

The residual potential $V_R$ has a component which increases gradually with the accumulating total number and a component which changes rapidly on continuous printing. Then, a photoconductor counter (not shown) for counting the accumulating total number of the rotation of the photoconductor drum and a continuous copy counter (not shown) for counting the continuous printing number are provided. The photoconductor drum counter is back-upped by a back-up power source to store the cont value when the power source of the printer is turned off, and it is reset by a user or a service man when a photoconductor drum 41 is changed. On the other hand, the continuous copy counter loses the count when the power source of the printer is turned off. Further, the count value decreases with the timer value in order to adapt the calculated residual potential $V_R$ to the actual machine characteristics.

Table 20 shows the changes of the accumulating total number PK, the sensitivity constant k and the residual potential $V_R$.

TABLE 20

| accumulating total number of printing | 5000 | 10000 | 15000 | 20000 |
|---|---|---|---|---|
| CS (or PS) | +1 | +2 | +3 | +4 |
| CG1 | +2 | +4 | +6 | +8 |

Table 21 shows the continuous copy addition coefficient CG selected according to the temperature and the humidity.

TABLE 21

| humidity | addition coefficient CK temperature | | | | |
|---|---|---|---|---|---|
| | 10° C. | 18° C. | 25° C. | 32° C. | 40° C. |
| 90% | 0 | 0 | +3 | +6 | +9 |
| 70% | 0 | 0 | 0 | +3 | +6 |
| 50% | −3 | 0 | 0 | 0 | +3 |
| 30% | −6 | −3 | 0 | 0 | 0 |
| 10% | −9 | −6 | −3 | 0 | 0 |

The development bias potential $V_B$, the maximum light quantity $I_{max}$ and the gamma correction table are amended according to the temperature and the humidity around the photoconductor 41, as shown schematically in FIGS. 57–60.

The same combination of the development vias voltage $V_B$ and the surface potential $V_o$ of Table 1 is used, and the image forming conditions of the standard toner image in the AIDC measurement are changed according to the prediction of the sensitivity characteristic of the photoconductor. Thus, the reliability of the AIDC sensor 210 is improved.

Figure 61:
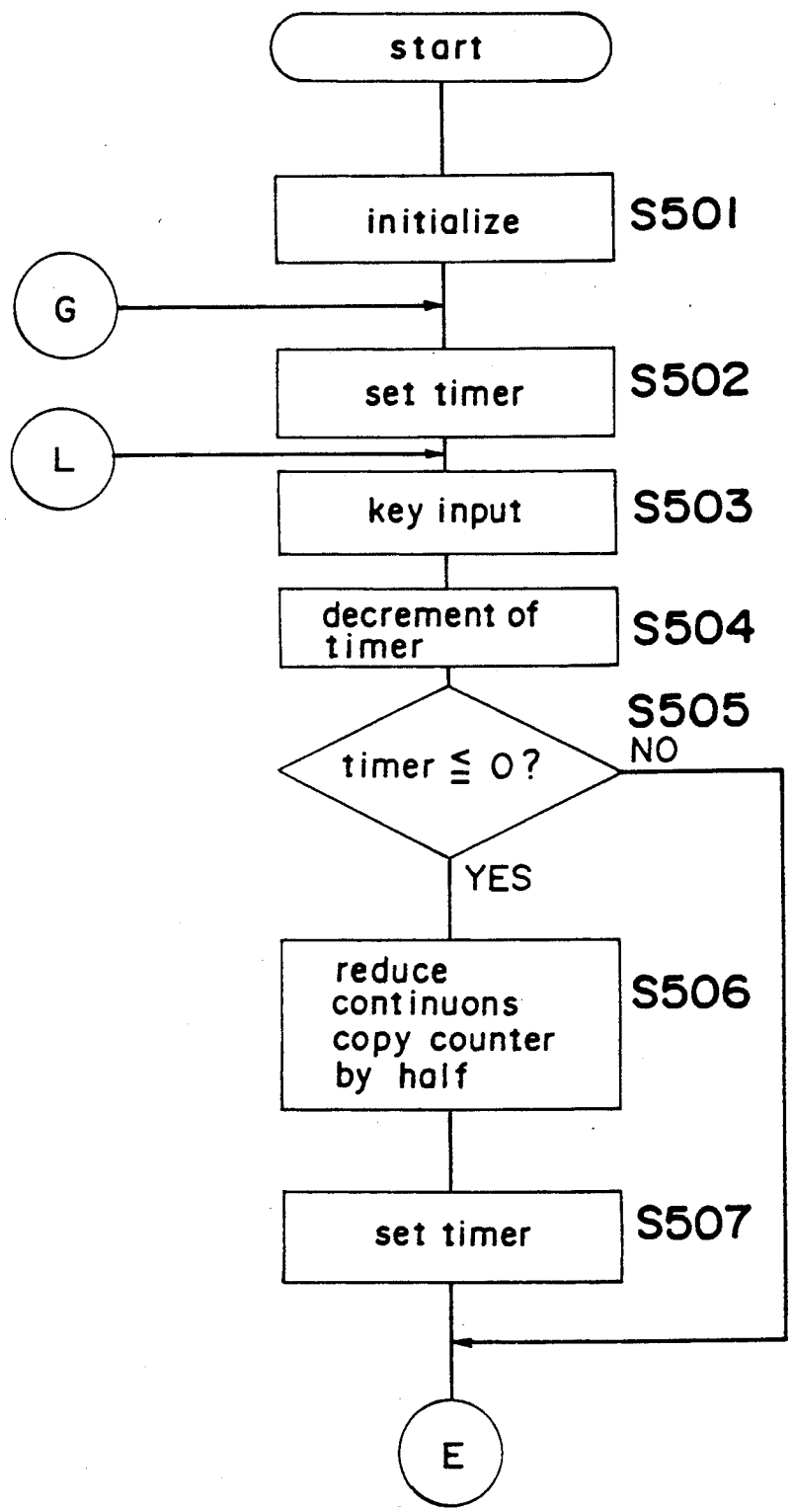
FIGS. 61-63 are a flowchart of the control of digital color copying machine.
Figure 62:
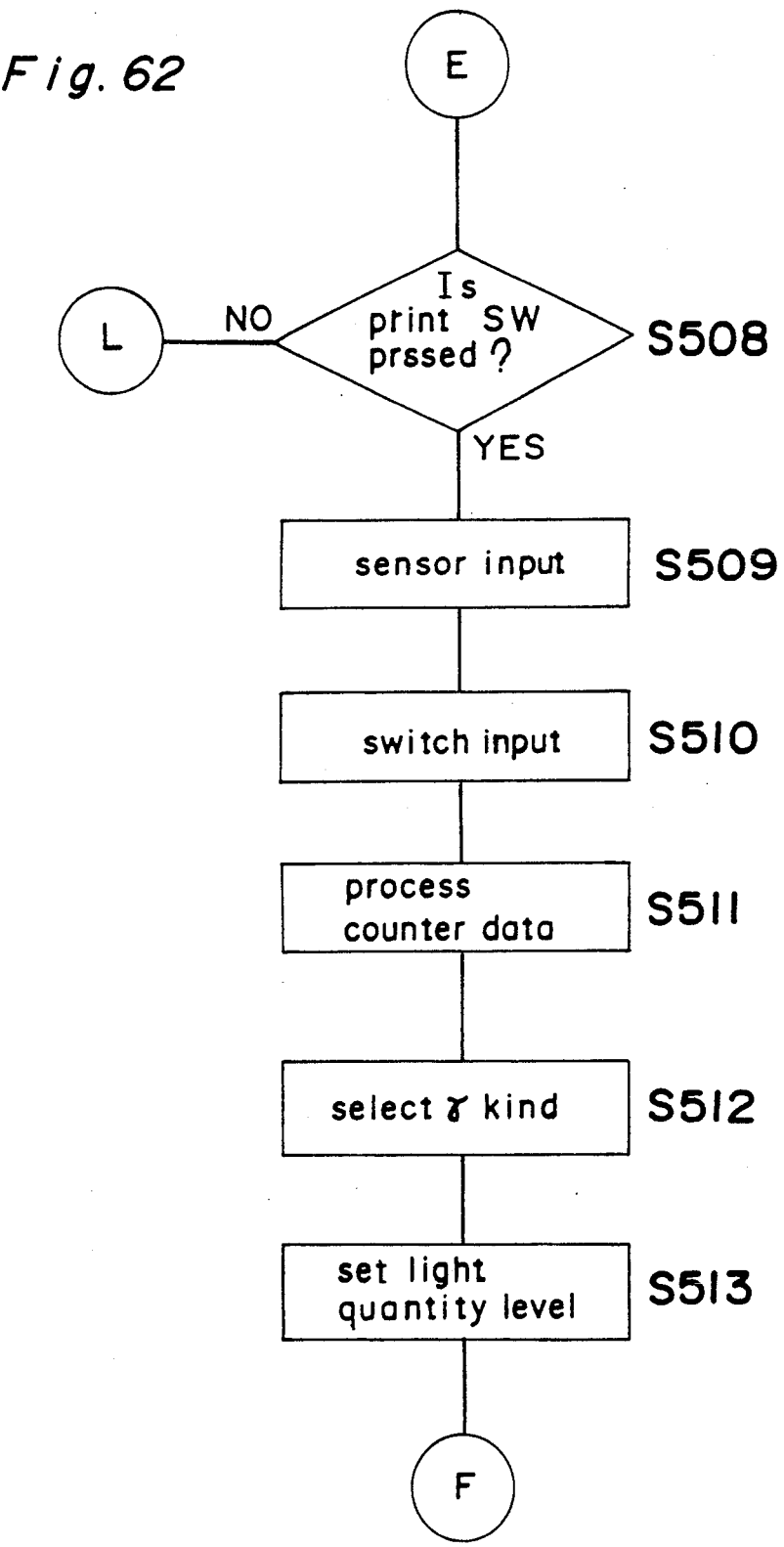
Figure 63:
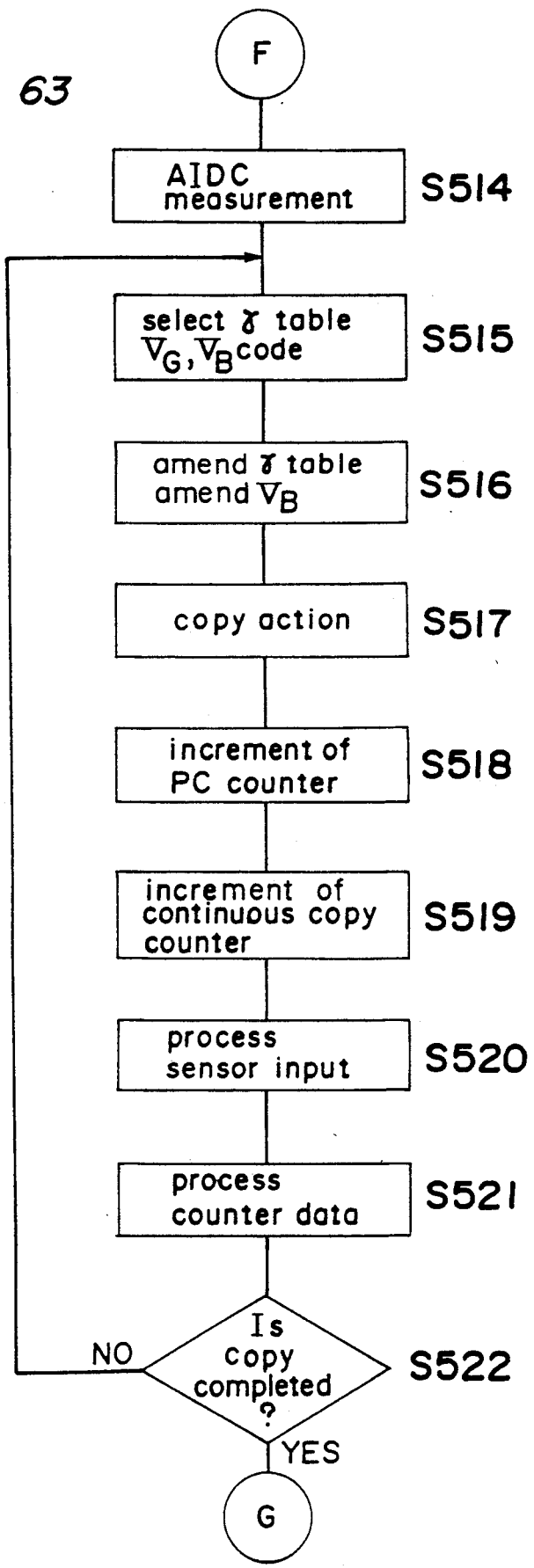

FIGS. 61–63 show a control flow of the printer controller 201. In this flow, steps S502–513, step S518–S521 are added to the flow of FIG. 53..

At step S501, the initialization of the printer controller 201 is performed, and at step S402, a timer value is set. Next, at step S503, the input processing of the operational panel 221 is performed. Then, at step S504, the increment of the timer value is performed. If it is decided at step S505 that the timer value is smaller than zero, the continuous copy counter is reduced by half at step S506 and the timer value is set again at step S507.

Next, at step S508, it is decided if the start key 8 in the operational panel 221 is pressed or not. If it is decided that the start key 8 is not pressed (NO at step S508), the flow returns to step S503 again, and waits until the start key 8 is pressed.

If it is decided at step S508 that the start key 8 is pressed, the sensor input processing is performed at step S509. In this processing, the photoconductor sensitivity amendment data CS (or PS), CG1 and the addition coefficient CK are obtained from the detection results of the temperature sensor 212 and the humidity sensor 213 by using Tables 19 and 20.

At step S510 of the switch input processing, an amendment code in correspondence to the input signal from the DIP switch and the gradation control switch 225 of the operational panel 6 shown in FIG. 7 is stored in the RAM in the printer controller 201.

At step S511, the counter data is processed. Next, at step S512, the gamma kind is selected. Next, at step S513, the light quantity level is set.

Then, at step S514, when the start switch 8 is pressed, the AIDC processing is performed. Next, at step S515, the density detection level LBA is selected according to the amount of adhered amount measured at step S514, and the grid potential $V_G$, the development bias potential $V_B$ and the gamma correction shift value G are also selected according to the density detection level LBA.

Next, at step S516, the amendment coefficient PG received from the operational panel and the amendment coefficient SG due to the sensor inputs are added to the gamma shift value G to obtain an amendment coefficient HG, and the gamma correction table is amended by adding the amendment coefficient HG to the standard gamma correction table. Further, the development bias potential $V_B$ is amended.

Further, at step S517, the known copy action is carried out by using the selected grid potential $V_G$, the development bias potential $V_B$ and the gamma correction table.

Then, the increment of the photoconductor drum counter is performed at step S518, and the increment of the continuous copy counter is performed at step S519. Further, the sensor inputs are processed at step S520 and the counter data is processed at step S521.

Then, it is decided if the copy action completes or not at step S521. If the copy action is decided to complete, the flow returns to step S502, otherwise the flow returns to step S515.

(1-5) fifth example

In this example, not all, but some gamma correction tables which corresponds to the density detection level determined by the AIDC measurement are provided, and one of the gamma correction tables are selected according to the density detection level and it is amended if necessary.

The same combination of the development vias voltage $V_B$ and the surface potential $V_o$ of Table 1 is used, and the image forming conditions of the standard toner image in the AIDC measurement are changed according to the prediction of the sensitivity characteristic of the photoconductor. Thus, the reliability of the AIDC sensor 210 is improved.

Figure 64:
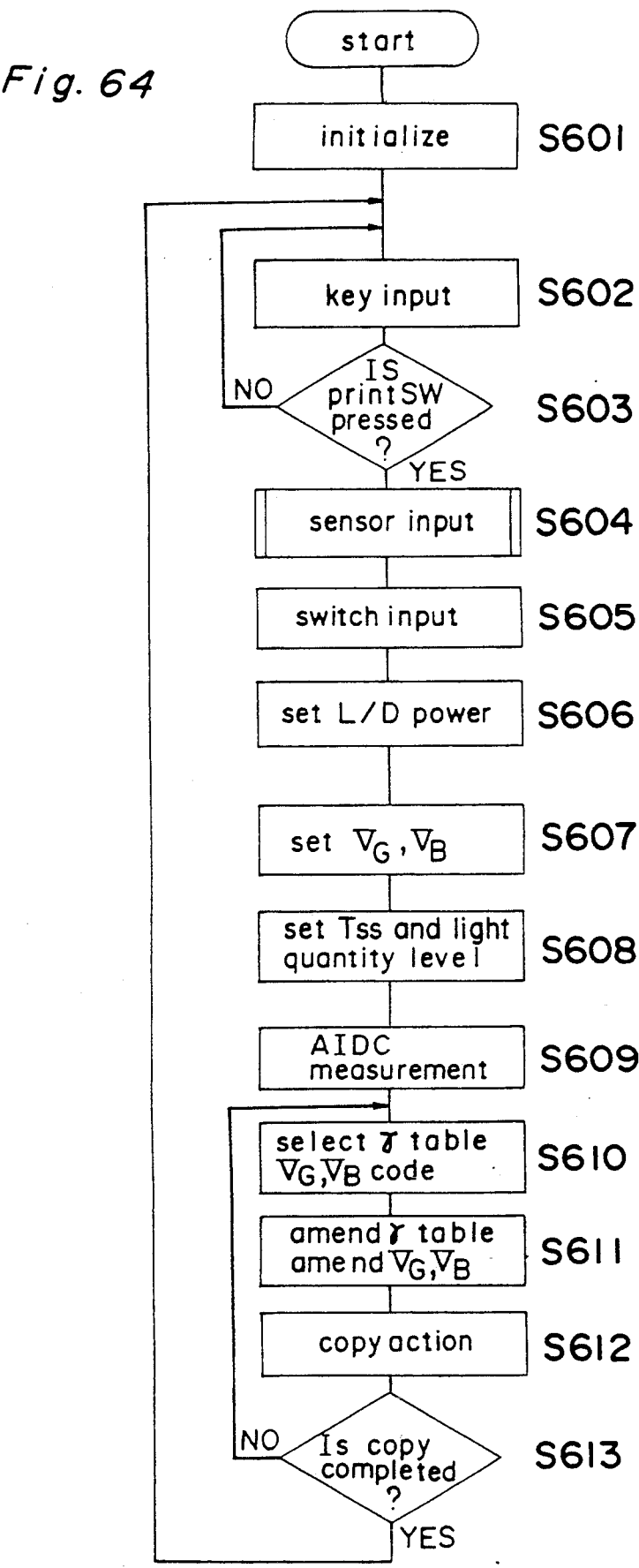
FIG. 64 is a flowchart of the control of digital color copying machine.

FIG. 64 shows a control flow of the printer controller 201.

At step S601, the initialization of the printer controller 201 is performed, and at step S602, the input processing of the operational panel 221 is performed. Next, at step S603, it is decided if the start key 8 in the operational panel 221 is pressed or not. If it is decided that the start key 8 is not pressed (NO at step S603), the flow returns to step S602 again, and waits until the start key 8 is pressed.

Figure 65:
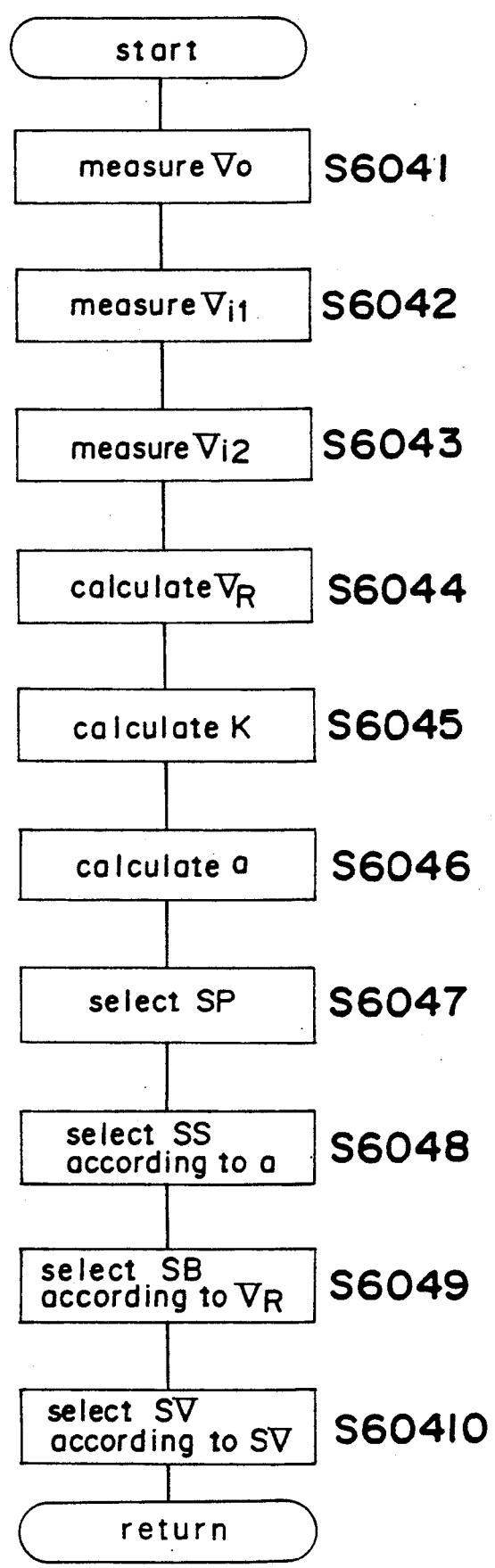
FIG. 65 is a flowchart of the sensor input processing.

If it is decided at step S603 that the start key 8 is pressed, the sensor input processing shown in detail in FIG. 65 is performed at step S604.

FIG. 65 shows the sensor input processing in detail. First, at step S6041, the surface potential $V_o$ is detected under no exposure light quantity. At step S6042, the potential $V_{i1}$ is detected at a small exposure light quantity, while at step S6043, the potential $V_{i2}$ is detected at the maximum light quantity. Then, at step S6044, the residual potential $V_R$ is detected by turning off the charger 43.

At step S6042, the small exposure light quantity is selected to be (32/255) times the maximum light quantity or smaller where the maximum gradation number is 255. In order to measure $V_{i1}$ more correctly, many light quantities are used to get a plurality of data and the multi-dimensional analysis is used. However, the abovementioned simple method provides a sufficient precision.

Next, at step S6045, the sensitivity constant k is obtained by using Eq. 6. Then, at step S6046, the light quantity distribution constant "a" is obtained by using Eq. 6 or 14. Next, at step S6047, the light quantity amendment value SP is selected according to Table 14.

Then, at step S6048, the code SS for selecting the kind of the gamma correction table is determined according to the "a" value obtained above with use of Table. In a simplified method, the amendment data SG1 of the gamma correction table is selected.

Next, at step S6049, the amendment data SB of the development bias potential $V_B$ is selected according to the obtained residual potential $V_R$ with use of a table. Alternately, the amendment data SG2 of the gamma correction table may be used.

Next, at step S60410, the amendment data SV of the grid potential $V_G$ is selected according to the surface potential $V_o$ and the residual potential $V_R$ with use of a table. Alternately, the amendment data SG3 of the gamma correction table may be used. Then, the flow returns to the main flow.

Figure 66:
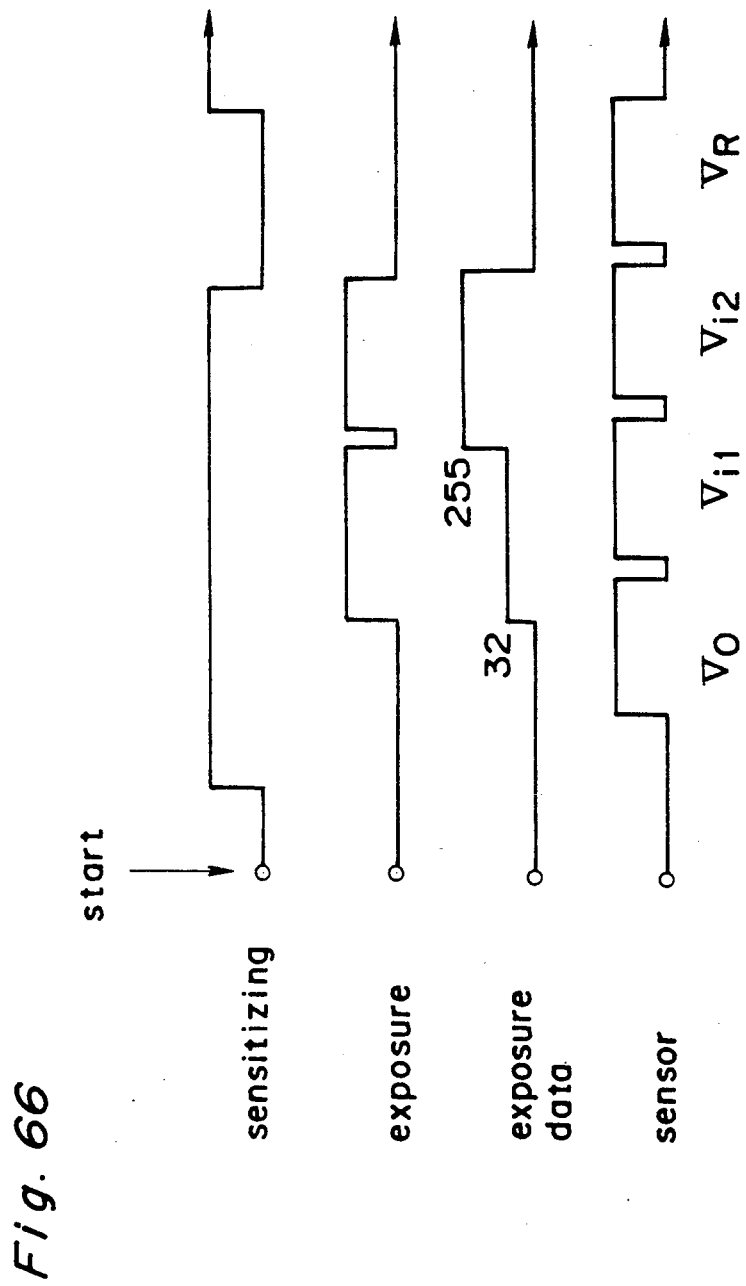
FIG. 66 is a timing sequence chart for measuring the four potentials.

FIG. 66 shows the timing sequence of the potential detection in the steps S6041-6044.

At step S605 in FIG. 64 of the switch input processing, an amendment code in correspondence to the input signal from the DIP switch and the gradation control switch 225 of the operational panel 221 shown in FIG. 7 is stored in the RAM in the printer controller 201.

Next, at step S606, the laser diode power is set according to the SP value determined at step S604 with use of Table 22.

TABLE 22

| K value | SP | LD power (mW) |
|---|---|---|
| 0.30 | 0 | 0.75 |
| 0.34 | 1 | 0.82 |
| 0.38 | 2 | 0.91 |
| 0.41 | 3 | 1.00 |
| 0.45 | 4 | 1.09 |
| 0.49 | 5 | 1.18 |
| 0.52 | 6 | 1.27 |
| 0.56 | 7 | 1.36 |

Next, at step S607, the development bias voltage $V_B$ is changed by SB steps determined at step S604 with use of Table 23, and the grid potential $V_G$ is changed by SV steps determined at step S604 with use of Table 24.

TABLE 23

| $V_R$ value | SB value | $V_B$ |
|---|---|---|
| 20 | −2 | 11 |
| 35 | −1 | 12 |
| 50 | 0 | 13 |
| 65 | +1 | 14 |
| 80 | +2 | 15 |

TABLE 24

| | SV value | | | | |
|---|---|---|---|---|---|
| | $V_o$ | | | | |
| $V_R$ | 590 | 605 | 620 | 635 | 650 |
| 20 | 0 | −1 | −2 | −3 | −4 |
| 35 | +1 | 0 | −1 | −2 | −3 |
| 50 | +2 | +1 | 0 | −1 | −2 |
| 65 | +3 | +2 | +1 | 0 | −1 |
| 80 | +4 | +3 | +2 | +1 | 0 |

Figure 67:
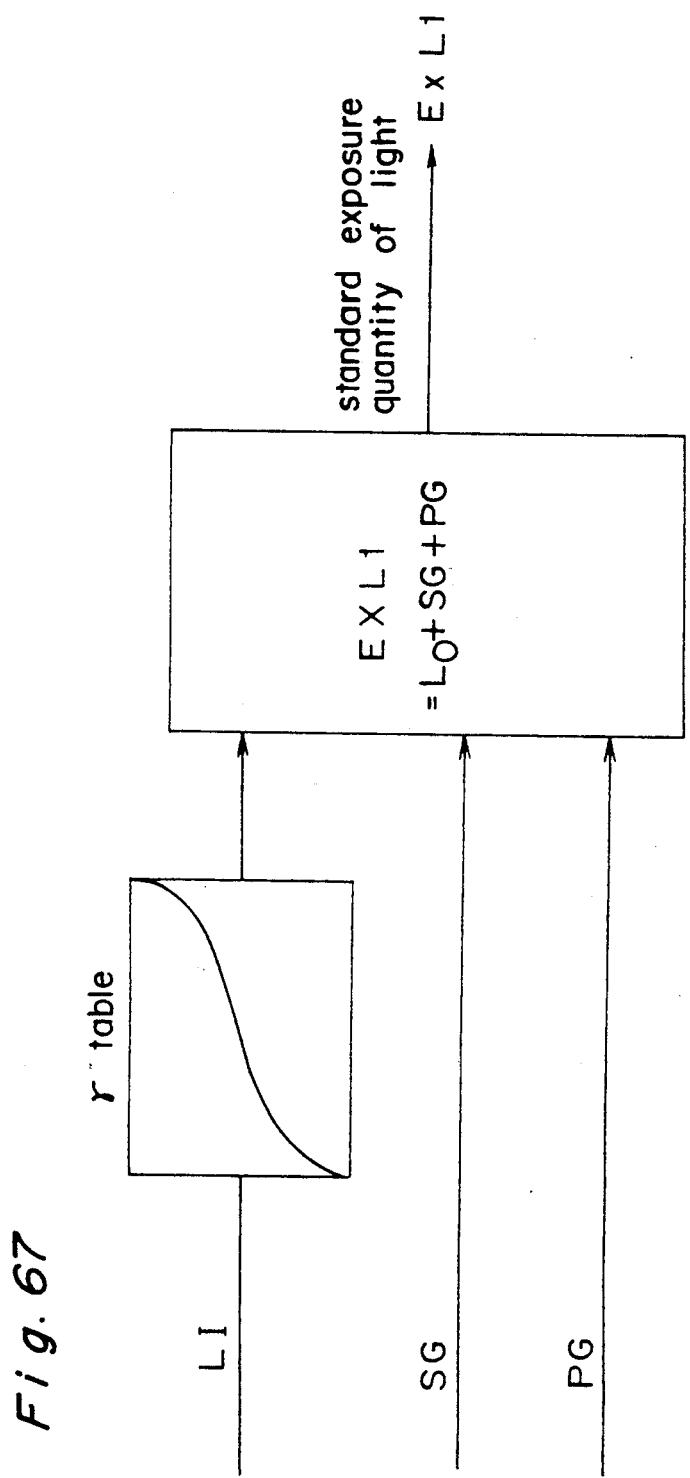
FIG. 67 is a diagram of the amendment of laser power.

Next, at step S608, the gamma correction table Tss selected according to the kind code SS determined at step S604 is read, and the light quantity level LO is set. As shown in FIG. 67, the light quantity is converted at input level LI=140 by using the selected gamma correction table to obtain the light quantity LO. Further, a shift value SGC=SG1+SG2+SG3 is added to SG to get the exposure light quantity light level EXL1.

Then, at step S609, when the start switch 8 is pressed, the AIDC processing is performed. In the AIDC processing, after the grid potential $V_G$ and the development bias potential $V_B$ are set to be prescribed standard values, a toner image of a standard image pattern is formed on the photoconductor drum 41 at the amended light quantity. Then, the amount of adhered toners of the image is measured with the AIDC sensor 211, and it is stored in the RAM in the printer controller 201.

Next, at step S610, the density detection level LBA is selected according to the amount of adhered amount measured at step S608, and the grid potential $V_G$, the development bias potential $V_B$ and the gamma amendment shift value G are also selected according to the density detection level LBA.

Next, at step S611, the amendment code PG received from the operational panel and the amendment coefficient SG due to the sensor inputs are added to the gamma shift value G to obtain an amendment coefficient HG, and the gamma correction table is made by adding the amendment coefficient HG to the gamma correction table selected at step S608.

Further, at step S612, the known copy action is carried out by using the selected grid potential $V_G$, development bias potential $V_B$ and the gamma correction table.

Then, it is decided if the copy action completes or not at step S613. If the copy action is decided to complete, the flow returns to step S602, otherwise the flow returns to step S610.

Figure 68:
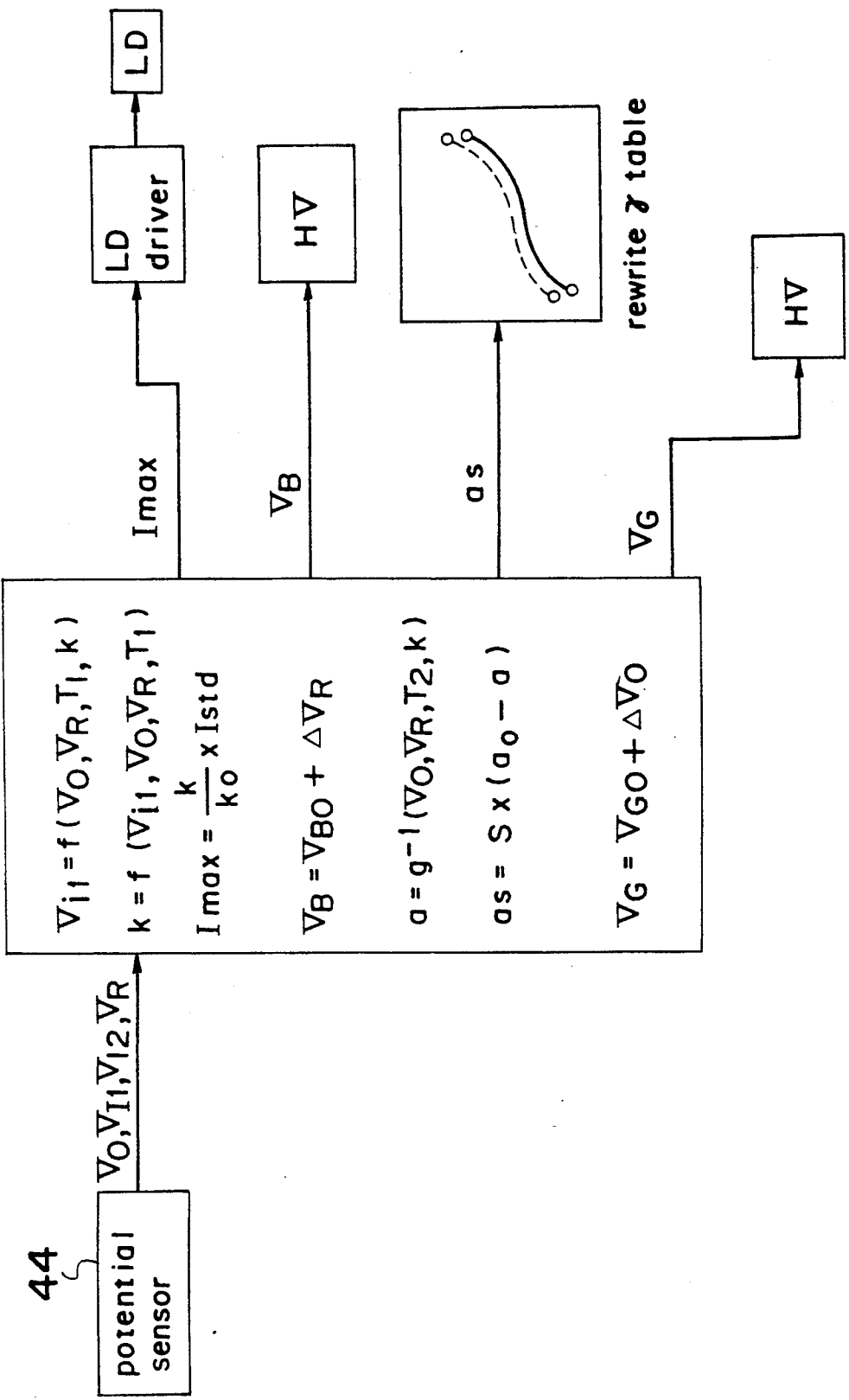
FIG. 68 is a diagram of the amendment of gamma correction table for the changes of the sensitivity characteristics.
Figure 69:
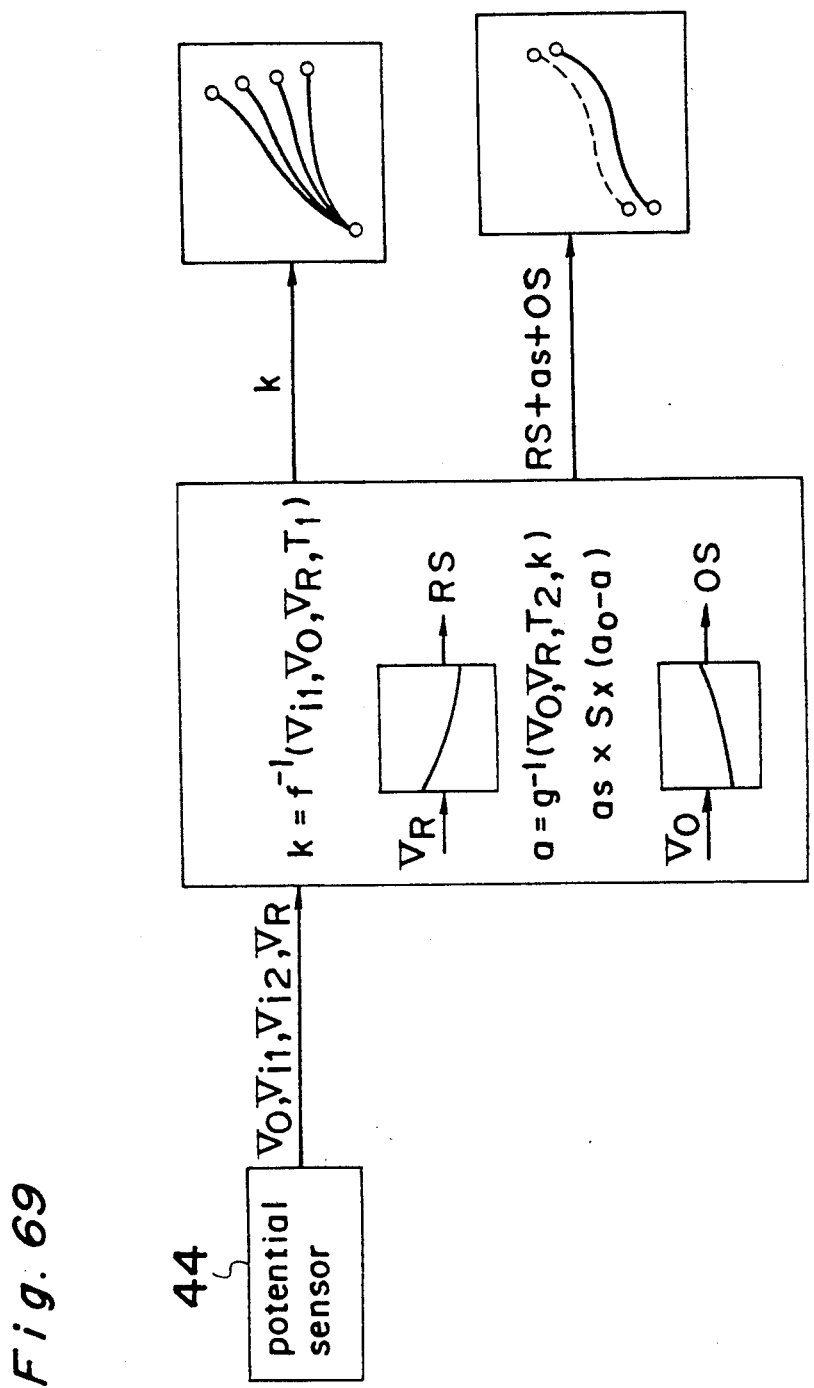
FIG. 69 is a diagram of the amendment of gamma correction table for the changes of the sensitivity characteristics.

FIGS. 68 and 69 show schematically the process of the amendment of the surface potential $V_o$, $V_{i1}$, $V_{i2}$ and the residual potential $V_R$ schematically.

A change of image during continuous copy can be suppressed by detecting the surface potential during the continuous copy.

(1-6) sixth example

This example is different from the above-mentioned Example 5 on preparation of the gamma correction table.

Table 25 shows the same combination of the development vias voltage $V_B$ and the surface potential $V_o$ of Table 1, and the image forming conditions of the standard toner image in the AIDC measurement are changed according to the prediction of the sensitivity characteristic of the photoconductor. Thus, the reliability of the AIDC sensor 210 is improved.

TABLE 25

| density detection level LBA | detected amount of adhered toners [mg/cm$^2$] | development efficiency | $\Delta Vd$ [V] | $V_G$ [V] | $V_o$ [V] | $V_B$ [V] | $V_{fm}$ [V] |
|---|---|---|---|---|---|---|---|
| 0 | 0.625 | 0.00625 | 160 | 500 | 480 | 280 | 120 |
| 1 | 0.510 | 0.00510 | 195 | 540 | 520 | 320 | 125 |
| 2 | 0.455 | 0.00455 | 220 | 570 | 545 | 345 | 125 |
| 3 | 0.410 | 0.00410 | 245 | 600 | 570 | 370 | 125 |
| 4 | 0.385 | 0.00385 | 260 | 630 | 590 | 390 | 130 |
| 5 | 0.345 | 0.00345 | 290 | 660 | 620 | 420 | 130 |
| 6 | 0.310 | 0.00310 | 320 | 700 | 650 | 450 | 130 |
| 7 | 0.280 | 0.00280 | 355 | 740 | 690 | 490 | 135 |
| 8 | 0.260 | 0.00260 | 385 | 780 | 720 | 520 | 135 |
| 9 | 0.240 | 0.00240 | 420 | 830 | 760 | 560 | 140 |

TABLE 25-continued

| density detection level LBA | detected amount of adhered toners [mg/cm²] | development efficiency | ΔVd [V] | $V_G$ [V] | $V_o$ [V] | $V_B$ [V] | $V_{jm}$ [V] |
|---|---|---|---|---|---|---|---|
| 10 | 0.210 | 0.00210 | 480 | 900 | 820 | 620 | 140 |
| 11 | 0.180 | 0.00180 | 560 | 1000 | 910 | 710 | 150 |

Figure 70:
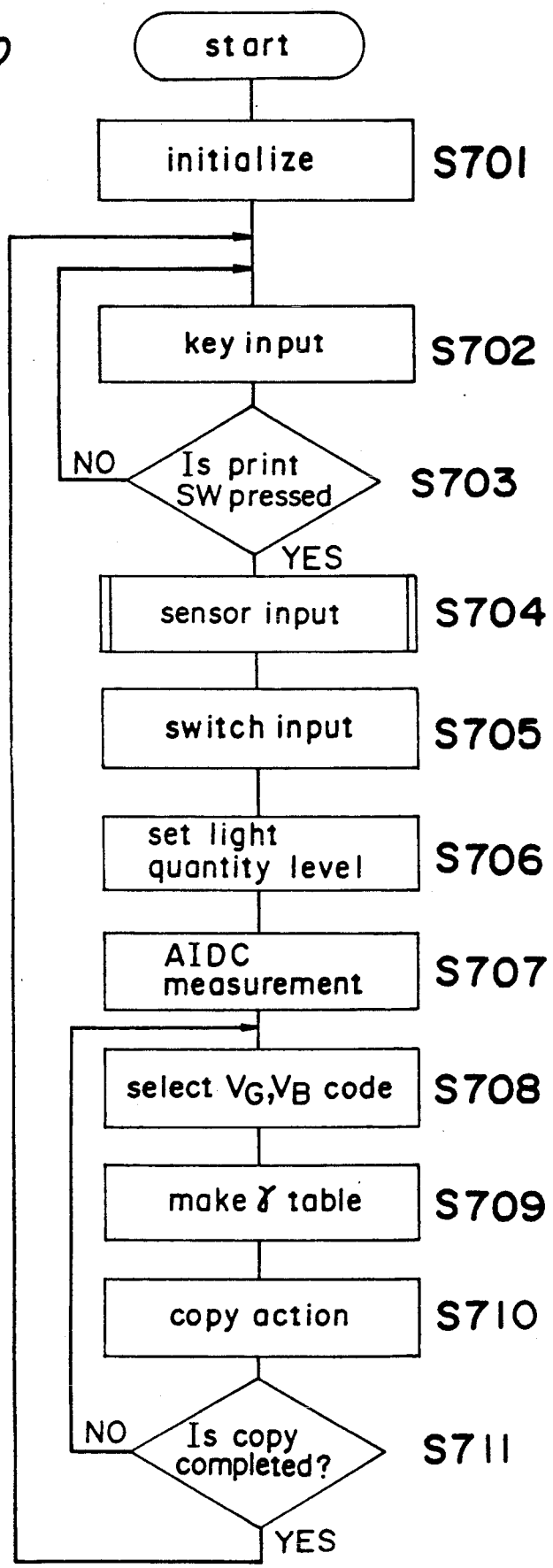
FIG. 70 is a flowchart of the control of digital color copying machine.

FIG. 70 shows a control flow of the printer controller 201.

At step S701, the initialization of the printer controller 201 is performed, and at step S702, the input processing of the operational panel 221 is performed. Next, at step S703, it is decided if the start key 8 in the operational panel 221 is pressed or not. If it is decided that the start key 8 is not pressed (NO at step S703), the flow returns to step S702 again, and waits until the start key 8 is pressed.

If it is decided at step S703 that the start key 8 is pressed, the sensor input processing is performed at step S704. In the sensor input processing, the steps S6041-6046 in FIG. 65 is performed to obtain the surface potential $V_o$, $V_{i1}$, $V_{i2}$, the residual potential $V_R$, the sensitivity constant "k" and the maximum of the light quantity distribution "a".

At step S705 of the switch input processing, a correction code in correspondence to the input signal from the DIP switch and the gradation control switch 6 of the operational panel 221 shown in FIG. 7 is stored in the RAM in the printer controller 201.

Next, at step S706, the laser diode power is set as follows: The effective development potential curve in the standard image-forming conditions ($V_G$, $V_B$) is determined according to Eq. 1 or 9 with use of the surface potential $V_o$, the residual potential $V_R$, the sensitivity constant "k" and the maximum of the light quantity distribution "a". Then, the standard light quantity is determined as the light quantity at the effective potential $\Delta Ve = 100$ V.

Then, at step S707, when the start switch 8 is pressed, the AIDC processing is performed. In the AIDC processing, after the grid potential $V_G$ and the development bias potential $V_B$ are set to be prescribed standard values, a toner image of a standard image pattern is formed on the photoconductor drum 41 at the light quantity determined at step S706. Then, the amount of adhered toners of the image is measured with the AIDC sensor 211, and it is stored in the RAM in the printer controller 201.

Next, at step S708, the density detection level LBA is selected according to the amount of adhered amount measured at step S408, and the grid potential $V_G$ and the development bias potential $V_B$ are also selected according to the density detection level LBA.

Next, at step S709, the gamma correction table is prepared according to the image-forming conditions in the following steps:

(1) One of the gradation reproduction tables S0–S9 stored in the data ROM 203 is selected according to the data PG selected by a user. The tables S0–S9 may be stored only as the input data of ten knick points in the broken line approximation.

(2) A curve of the effective development potential $\Delta Vd$ is obtained at the grid potential $V_G$ and the development bias potential $V_B$ selected at step S708.

(3) The gradation reproduction curve before the amendment is obtained from the effective development potential $\Delta Ve$.

(4) The exposure light quantity needed to realize an image density in correspondence to an input data P from the gradation reproduction table selected at (1) is obtained from the table of the light quantity vs. image density table determined at (3).

Further, at step S710, the known copy action is carried out by using the selected grid potential $V_G$, development bias potential $V_B$ and the gamma correction table.

Then, it is decided if the copy action completes or not at step S711. If the copy action is decided to completes, the flow returns to step S702, otherwise the flow returns to step S708.

A sensor input processing may be inserted further between steps S710 and S711. In this case, the step to determine the maximum $a_m$ may be omitted.

FIGS. 67 and 68 show schematically the process of the amendment of the surface potential $V_o$, $V_{i1}$, $V_{i2}$ and the residual potential $V_R$ schematically.

A change of image during continuous copy can be suppressed by detecting the surface potential during the continuous copy.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. An electrophotographic image forming apparatus, comprising:
   a photoconductor;
   a charger for sensitizing the photoconductor at a desired initial potential;
   an exposure means for exposing the photoconductor having been sensitized at the initial potential to form an electrostatic latent image;
   a developer for developing the electrostatic latent image on the photoconductor to form a toner image;
   a memory means for storing a gradation correction table for modifying image density signals of each pixel of an image according to image density levels;
   an amendment means for correcting the gradation correction table by adding a common amendment amount to the gradation correction table in a prescribed range;
   a correction means for modifying the image density signals according to the gradation correction table which is corrected by said amendment means; and
   an exposure control means for controlling the exposure amount on the photoconductor by the exposure means according to the image density signals modified by the correction means.

2. An electrophotographic image forming apparatus according to claim 1, further comprising:
   a voltage application means for applying a bias voltage to said developer;

a detection means for detecting the state of said photoconductor; and an image density control means for controlling the output voltage of said charger and/or the bias voltage according to the detection result of said detection means;

said amendment means comprising:

a second memory means for storing a plurality of amendment values; and a selection means for selecting an amendment value among the amendment values stored in said second memory means according to the output voltage of said charger and/or the bias voltage; wherein said amendment means adds the amendment value selected by said selection means to the image density data.

3. An electrophotographic image forming apparatus according to claim 2, wherein said detection means detects an image density of a toner image of a test pattern formed on said photoconductor.

4. An electrophotographic image forming apparatus according to claim 2, said charger comprising a discharge electrode for providing charges to said photoconductor and a grid electrode arranged between said discharge electrode and said photoconductor for controlling a charge amount provided to said photoconductor, said image density control means controls a potential of the grid electrode.

5. An electrophotographic image forming apparatus according to claim 1, further comprising a potential detection means for detecting the surface potential of said photoconductor sensitized by said charger, said amendment means comprising a second memory means for storing a plurality of amendment values and a selection means for selecting an amendment value among the amendment values stored in said second memory means according to the detected value of said potential detection means; and amendment means adds the amendment value selected by said selection means to the gradation correction table.

6. An electrophotographic image forming apparatus according to claim 1, further comprising an environment condition detection means for detecting the temperature and/or the humidity around said photoconductor, said amendment means comprising a second memory means for storing a plurality of amendment values and a selection means for selecting an amendment value among the amendment values stored in said second memory means according to the detected value of said environment condition detection means; said amendment means adds the amendment value selected by said selection means to the gradation correction table.

7. An electrophotographic image forming apparatus according to claim 1, further comprising:

a voltage application means for applying a bias voltage to said developer;

an image density detection means for detecting the image density of a toner image formed on said photoconductor;

an image density control means for controlling the output voltage of said charger and/or the bias voltage according to the detection result of said image density detection means; and a potential detection means for detecting the surface potential of said photoconductor sensitized according to said charger;

said amendment means comprising:

a second memory means for storing a plurality of amendment values, a first selection means for selecting a first amendment value among the amendment values stored in said second memory means according to the detection value of said image density detection means; and a second selection means for selecting a second amendment value among the amendment values stored in said second memory means according to the detection value of said potential detection means; wherein said amendment means adds the first amendment value selected by said first selection means and the second amendment value selected by said second selection means to the gradation correction table.

8. An electrophotographic image forming apparatus according to claim 1, further comprising:

a voltage application means for applying a bias voltage to said developer;

an image density detection means for detecting the image density of a toner image formed on said photoconductor;

an image density control means for controlling the output voltage of said charger and/or the bias voltage according to the detection result of said image density detection means; and an environment condition detection means for detecting the temperature and/or the humidity around said photoconductor;

said amendment means comprising:

a second memory means for storing a plurality of amendment values;

a first selection means for selecting a first amendment value among the amendment values stored in said second memory means according to the detection value of said image density detection means; and a second selection means for selecting a second amendment value among the amendment values stored in said second memory means according to the detection value of said second memory means according to the detection value of said environmental condition detection means; wherein said amendment means adds the first amendment value selected by said first selection means and the second amendment value selected by said second selection means to the gradation correction table.

9. An electrophotographic image forming apparatus, comprising:

a photoconductor;

a charger for sensitizing the photoconductor at a desired initial potential;

an exposure means for exposing the photoconductor having been sensitized at the initial potential to form an electrostatic latent image;

a developer for developing the electrostatic latent image on the photoconductor to form a toner image;

a voltage application means for applying a bias voltage to said developer;

a detection means for detecting the state of said photoconductor;

a memory means for storing a plurality of gradation correction tables for correcting image density signals of each pixel of an image according to image density levels;

a charger control means for controlling the output voltage of said charger according to the detection result of said detection means;

a selection means for selecting one of the plurality of gradation correction tables according to the output voltage of said charger controlled by said charger control means;

an amendment means for modifying the gradation correction table selected by said selection means;

a gradation correction means for correcting the image density signals according to the gradation correction table modified by said amendment means; and an exposure control means for controlling exposure amount on the photoconductor by the exposure means in response to the image density signals corrected by said gradation correction means.

10. An electrophotographic image forming apparatus according to claim 9, wherein said amendment means modifies the gradation correction table so that a common value is added to the output value of the gradation correction means according to the image density signals in a prescribed range.

11. An electrophotographic image forming apparatus according to claim 9, wherein said detection means detects image density of a toner image of a test pattern formed on said photoconductor.

12. An electrophotographic image forming apparatus according to claim 9, further comprising a potential detection means for detecting the surface potential of said photoconductor sensitized by said charger, wherein said amendment means modifies the gradation correction means according to the detected value of said potential detection means.

13. An electrophotographic image forming apparatus according to claim 9, further comprising an environment condition detection means for detecting the temperature and/or the humidity around said photoconductor, wherein said amendment means modifies the gradation correction table according to the detection value by said environment condition detection means.

14. An electrophotographic image forming apparatus, comprising:

a photoconductor;

a charger for sensitizing the photoconductor at a desired initial potential;

an exposure means for exposing the photoconductor having been sensitized at the initial potential to form an electrostatic latent image;

a developer for developing the electrostatic latent image on the photoconductor to form a toner image;

a voltage application means for applying a bias voltage to said developer;

a detection means for detecting the state of said photoconductor;

a memory means for storing a plurality of gradation correction tables for correcting image density signals of each pixel of an image according to image density levels;

a bias control means for controlling the bias voltage according to the detection result of said detection means;

a selection means for selecting one of the plurality of gradation correction tables according to the bias voltage of said developer controlled by said bias control means;

a amendment means for correcting the gradation correction table selected by said selection means;

a gradation correction means for correcting the image density signal according to the gradation correction table modified by said amendment means; and an exposure control means for controlling exposure amount on the photoconductor by the exposure means in response to the image density signals modified by said gradation correction means.

15. An electrophotographic image forming apparatus according to claim 14, wherein said amendment means modifies the gradation correction table so that a common value is added to output value of the gradation correction means according to the image density signal in a prescribed range.

16. An electrophotographic image forming apparatus according to claim 14, wherein said detection means detects image density of a toner image of a test pattern formed on said photoconductor.

17. An electrophotographic image forming apparatus according to claim 14, further comprising a potential detection means for detecting the surface potential of said photoconductor sensitized by said charger, wherein said amendment means modifies the gradation correction table according to the detected value of said potential detection means.

18. An electrophotographic image forming apparatus according to claim 14, further comprising an environment condition detection means for detecting the temperature and/or the humidity around said photoconductor, wherein said amendment means modifies the gradation correction table according to the detection value by said environment condition detection means.

19. An electrophotographic image forming apparatus, comprising:

a photoconductor;

a charger for sensitizing the photoconductor at a desired initial potential;

an exposure means for exposing the photoconductor having been sensitized at the initial potential to form an electrostatic latent image;

a developer for developing the electrostatic latent image on the photoconductor to form a toner image;

a voltage application means for applying a bias voltage to said developer;

a memory means for storing a plurality of gradation correction tables for correcting image density signals of each pixel of an image according to image density levels;

a charger control means for controlling the output voltage of said charger;

a selection means for selecting one of the plurality of gradation correction tables stored in said memory means according to the output voltage of said charger controlled by said charger control means, which gradation correction table having a prescribed correspondence with to the output voltage of said charger;

a change means for controlling the selection means to change the correspondence of the gradation correction table with the output voltage of said charger;

a gradation correction means for correcting the image density signal according to the gradation correction table selected by said selection means; and an exposure control means for controlling exposure amount on the photoconductor by the exposure means in response to the image density signal modified by said gradation correction means.

20. An electrophotographic image forming apparatus according to claim 19, further comprising a detection means for detecting the state of said photoconductor, wherein said charger control means controls the output voltage of said charger according to the detection value of said detection means.

21. An electrophotographic image forming apparatus according to claim 20, wherein said detection means detects image density of a toner image of a test pattern formed on said photoconductor.

22. An electrophotographic image forming apparatus according to claim 19, further comprising a potential detection means for detecting the surface potential of said photoconductor sensitized by said charger, wherein said change means shifts the correspondence according to the detected value of said potential detection means.

23. An electrophotographic image forming apparatus according to claim 19, further comprising an environment condition detection means for detecting the temperature and/or the humidity around said photoconductor, wherein said change means shifts the correspondence according to the detection value by said environment condition detection means.

24. An electrophotographic image forming apparatus, comprising:
 a photoconductor;
 a charger for sensitizing the photoconductor at a desired initial potential;
 an exposure means for exposing the photoconductor having been sensitized at the initial potential to form an electrostatic latent image;
 a developer for developing the electrostatic latent image on the photoconductor to form a toner image;
 a voltage application means for applying a bias voltage to said developer;
 a memory means for storing a plurality of gradation correction tables for correcting image density signals of each pixel of an image according to image density levels;
 a bias control means for controlling the bias voltage of said developer;
 a selection means for selecting one of the plurality of gradation correction tables stored in said memory means according to the bias voltage of said developer controlled by said bias control means, which gradation correction table having a prescribed correspondence to the bias voltage of said developer;
 a change means for controlling the selection means to change the correspondence of the gradation correction table with the bias voltage of said developer;
 a gradation correction means for correcting the image density signal according to the gradation correction table selected by said selection means; and
 an exposure control means for controlling exposure amount on the photoconductor by the exposure means in response to the image density signal modified by said gradation correction means.

25. An electrophotographic image forming apparatus according to claim 24, further comprising a detection means for detecting the state of said photoconductor, and a charger control means for controlling the output voltage of said charger according to the detection value of said detection means.

26. An electrophotographic image forming apparatus according to claim 25, wherein said detection means detects image density of a toner image of a test pattern formed on said photoconductor.

27. An electrophotographic image forming apparatus according to claim 24, further comprising a potential detection means for detecting the surface potential of said photoconductor sensitized by said charger, wherein said change means shifts the correspondence according to the detected value of said potential detection means.

28. An electrophotographic image forming apparatus according to claim 24, further comprising an environment condition detection means for detecting the temperature and/or the humidity around said photoconductor, wherein said change means shifts the correspondence according to the detection value by said environment condition detection means.

29. An electrophotographic image forming apparatus, comprising:
 a photoconductor;
 a charger for sensitizing the photoconductor at a desired initial potential;
 an exposure means for exposing the photoconductor having been sensitized at the initial potential to form an electrostatic latent image;
 a developer for developing the electrostatic latent image on the photoconductor to form a toner image;
 a voltage application means for applying a bias voltage to said developer;
 a detection means for detecting the state of said photoconductor;
 a memory means for storing a plurality of gradation correction tables for correcting image density signals of each pixel of an image according to image density levels, wherein said gradation correction tables have a prescribed correspondence to the detection value of said detection means;
 a change means for changing the correspondence of the gradation correction table with the detection value of said detection means;
 a selection means for selecting one of the plurality of gradation correction tables stored in said memory means corresponding to the detection value by said detection means based on said changed correspondence;
 a gradation correction means for correcting the image density signal according to the gradation correction table selected by said selection means; and
 an exposure control means for controlling the exposure amount on the photoconductor by the exposure means in response to the image density signals modified by said gradation correction means.

30. An electrophotographic image forming apparatus according to claim 29, wherein said detection means detects image density of a toner image of a test pattern formed on said photoconductor.

31. An electrophotographic image forming apparatus according to claim 29, further comprising a potential detection means for detecting the surface potential of said photoconductor sensitized by said charger, wherein said change means shifts the correspondence according to the detected value of said potential detection means.

32. An electrophotographic image forming apparatus according to claim 29, further comprising an environment condition detection means for detecting the temperature and/or the humidity around said photoconductor, wherein said change means shifts the correspondence according to the detected value of said environment condition detection means.

33. An electrophotographic image forming apparatus, comprising:
- a photoconductor;
- a charger for sensitizing the photoconductor at a desired initial potential;
- a memory means for storing a gradation correction table for correcting digital image density signals of each pixel of an image according to image density levels;
- a gradation correction means for correcting the digital image density signal according to the gradation correction table;
- a conversion means for converting the digital image density signal received from said gradation correction means to an analog signal;
- an exposure means for amplifying the analog signal at a prescribed amplification factor and for exposing the photoconductor having been sensitized at the initial potential with an exposure light quantity according the amplified analog signal to form an electrostatic latent image;
- a developer for developing the electrostatic latent image on the photoconductor to form a toner image;
- a voltage application means for applying a bias voltage to said developer;
- a temperature detection means for detecting the temperature around said photoconductor;
- a humidity detection means for detecting the humidity around said photoconductor;
- a bias control means for controlling the bias voltage of said developer according to the temperature detected by said temperature detection means;
- an exposure control means for controlling the exposure means by changing the amplification factor according to the temperature detected by said temperature detection means and to the humidity detected by said humidity detection means; and
- an amendment means for correcting the gradation correction table according to the temperature detected by said temperature detection means and to the humidity detected by said humidity detection means.

34. An electrophotographic image forming apparatus, comprising:
- a photoconductor;
- a charger for sensitizing the photoconductor at a desired initial potential;
- a gradation correction means for correcting digital image density signal of each pixel of an image according to a gradation correction table;
- a conversion means for converting the digital image density signal received from said gradation correction means to an analog signal;
- an exposure means for amplifying the analog signal at a prescribed amplification factor and for exposing the photoconductor having been sensitized at the initial potential with an exposure light quantity according the amplified analog signal to form an electrostatic latent image;
- a developer for developing the electrostatic latent image on the photoconductor to form a toner image;
- an eraser means for erasing the charges on the surface of said photoconductor;
- a voltage application means for applying a bias voltage to said developer;
- a first potential detection means for detecting the surface potential of said photoconductor sensitized by said charger;
- a second potential detection means for detecting the surface potential of said photoconductor erased by said eraser means; and
- a gradation control means for controlling the gradation correction means to change the gradation correction table according to the potentials detected by said first and second detection means.

35. An electrophotographic image forming apparatus according to claim 34, further comprising an exposure control means for controlling said exposure means to change the amplification factor according to the potentials detected by said first and second detection means.

36. An electrophotographic image forming apparatus according to claim 35, further comprising a bias control means for controlling said voltage application means to change the bias voltage according to the potential detected by said second detection means.

37. An electrophotographic image forming apparatus, comprising:
- a photoconductor;
- a charger for sensitizing the photoconductor at a desired initial potential;
- a gradation correction means for correcting digital image density signals of each pixel of an image according to a gradation correction table;
- a conversion means for converting the digital image density signal received from said gradation correction means to an analog signal;
- an exposure means for amplifying the analog signal at a prescribed amplification factor and for exposing the photoconductor having been sensitized at the initial potential with an exposure light quantity according the amplified analog signal to form an electrostatic latent image;
- a developer for developing the electrostatic latent image on the photoconductor to form a toner image;
- an eraser means for erasing the charges on the surface of said photoconductor;
- a voltage application means for applying a bias voltage to said developer;
- a first potential detection means for detecting the surface potential of said photoconductor sensitized by said charger;
- a second potential detection means for detecting the surface potential of said photoconductor erased by said eraser means; and
- a gradation control means for controlling the gradation correction means to change the gradation correction table according to the potentials detected by said first and second detection means.

38. An electrophotographic image forming apparatus, comprising:
- a photoconductor;
- a charger for sensitizing the photoconductor at a desired initial potential;
- a gradation correction means for correcting digital image density signals of each pixel of an image according to a gradation correction table;

a conversion means for converting the digital image density signal received from said gradation correction means to an analog signal;

an exposure means for amplifying the analog signal at a prescribed amplification factor and for exposing the photoconductor having been sensitized at the initial potential with an exposure light quantity according the amplified analog signal to form an electrostatic latent image;

a developer for developing the electrostatic latent image on the photoconductor to form a toner image;

an eraser means for erasing the charges on the surface of said photoconductor;

a voltage application means for applying a bias voltage to said developer;

a first exposure control means for forming a standard latent image by letting said exposure means emit at a prescribed standard light quantity;

a first potential detection means for detecting the surface potential of said photoconductor sensitized by said charger;

a second potential detection means for detecting the surface potential of said photoconductor erased by said eraser means;

a third potential detection means for detecting the potential of the standard latent image; and a gradation control means for controlling the gradation correction means to change the gradation correction table according to the potentials detected by said first, second and third detection means.

39. An electrophotographic image forming apparatus according to claim 38, further comprising an exposure control means for controlling said exposure means to change the amplification factor according to the potentials detected by said first, second and third detection means.

40. An electrophotographic image forming apparatus, comprising:

a photoconductor;

a charger for sensitizing the photoconductor at a desired initial potential;

a gradation correction means for correcting digital image density signals of each pixel of an image according to a gradation correction table;

a conversion means for converting the digital image density signal received from said gradation correction means to an analog signal;

an exposure means for amplifying the analog signal at a prescribed amplification factor and for exposing the photoconductor having been sensitized at the initial potential with an exposure light quantity according the amplified analog signal to form an electrostatic latent image;

a developer for developing the electrostatic latent image on the photoconductor to form a toner image;

an eraser means for erasing the charges on the surface of said photoconductor;

a voltage application means for applying a bias voltage to said developer;

a first exposure control means for forming a standard latent image by letting said exposure means emit at a prescribed standard light quantity;

a first potential detection means for detecting the surface potential of said photoconductor sensitized by said charger;

a second potential detection means for detecting the surface potential of said photoconductor erased by said eraser means;

a third potential detection means for detecting the potential of the standard latent image; and a gradation control means for controlling the exposure control means to change the amplification factor according to the potentials detected by said first, second and third detection means.

41. An electrophotographic image forming apparatus, comprising:

a photoconductor;

a charger for sensitizing the photoconductor at a desired initial potential;

a memory means for storing a gradation correction table for correcting image density signals of each pixel of an image according to image density levels;

a gradation correction means for correcting the image density signal according to a gradation correction table;

an exposure means for exposing the photoconductor having been sensitized at the initial potential with an exposure light quantity according the image density signal corrected by said gradation correction means;

a developer for developing the electrostatic latent image on the photoconductor to form a toner image;

a first detection means for detecting the surface state of said photoconductor;

a second detection means for detecting the temperature around said photoconductor;

a third detection means for detecting the humidity around said photoconductor;

a voltage application means for applying a bias voltage to said developer;

a first control means for setting the bias voltage of said developer and the output voltage of said charger and for changing the gradation table; and a second control means for changing the bias voltage of said developer or the output voltage of said charger set by said first control means according to the detection values of said second and third detection means.

42. An electrophotographic image forming apparatus according to claim 41, wherein said first detection means detects image density of a toner image of a test pattern formed on said photoconductor.

43. An electrophotographic image forming apparatus, comprising:

a photoconductor;

a charger for sensitizing the photoconductor at a desired initial potential;

a memory means for storing a gradation correction table for correcting image density signals of each pixel of an image according to image density levels;

a gradation correction means for correcting the image density signal according to a gradation correction table;

an exposure means for exposing the photoconductor having been sensitized at the initial potential with an exposure light quantity according the image density signal corrected by said gradation correction means;

a developer for developing the electrostatic latent image on the photoconductor to form a toner image;

a first detection means for detecting the surface state of said photoconductor;

a second detection means for detecting the temperature around said photoconductor;

a third detection means for detecting the humidity around said photoconductor;

a voltage application means for applying a bias voltage to said developer;

a first control means for changing the gradation correction table according to the detection value of said first detection means; and a second control means for changing the bias voltage of said developer or the output voltage of said charger according to the detection values of said first, second and third detection means.

44. An electrophotographic image forming apparatus according to claim 43, wherein said first detection means detects image density of a toner image of a test pattern formed on said photoconductor.

45. A method for controlling image density in an electrophotographic image forming apparatus, comprising the steps of:

forming a standard toner image on a photoconductor;

measuring image density of the standard toner image;

setting a gradation correction table and bias voltage of a developer according to the measured image density;

detecting the temperature around the photoconductor;

detecting the humidity around the photoconductor;

correcting the bias voltage according to the detected temperature and humidity;

correcting image density signals of each pixel of an image by using the gradation correction table;

exposing the photoconductor having been sensitized at a prescribed initial potential, according to exposure light quantity in correspondence to the corrected image density signal to form an electrostatic latent image on said photoconductor; and developing the electrostatic latent image with the developer with the bias voltage applied.

46. A method for controlling image density in an electrophotographic image forming apparatus, comprising the steps of:

forming a standard toner image on a photoconductor;

measuring image density of the standard toner image;

setting a gradation correction table of a developer and a initial voltage according to the measured image density;

detecting the temperature around the photoconductor;

detecting the humidity around the photoconductor;

correcting the initial voltage according to the detected temperature and humidity;

sensitizing the photoconductor at the corrected initial voltage;

correcting image density signals of each pixel of an image by using the gradation correction table;

exposing the photoconductor having been sensitized at the initial potential, according to exposure light quantity in correspondence to the corrected image density signal; and developing the electrostatic latent image with the developer.

47. A method for controlling image density in an electrophotographic image forming apparatus, comprising the steps of:

forming a standard toner image on a photoconductor;

measuring image density of the standard toner image;

setting a gradation correction table, a bias voltage of a developer and the initial voltage according to the measured image density;

detecting the temperature around the photoconductor;

detecting the humidity around the photoconductor;

correcting the bias voltage and/or the initial voltage according to the detected temperature and humidity without correcting the gradation correction table;

sensitizing the photoconductor at the corrected initial voltage;

correcting the image density signal of the density of each pixel of an image according to the density by using the gradation correction table;

exposing the photoconductor having been sensitized at the corrected initial potential, according to exposure light quantity in correspondence to the corrected image density signal; and developing the electrostatic latent image with the developer.

48. An electrophotographic image forming apparatus, comprising:

a photoconductor;

a charger for sensitizing the photoconductor at a desired initial potential;

a developer for developing an electrostatic latent image on the photoconductor to form a toner image;

a voltage application means for applying a bias voltage to said developer;

a memory means for storing a plurality of gradation correction tables for correcting image density signals of each pixel of an image according to density levels;

a first detection means for detecting the surface state of said photoconductor;

a second detection means for detecting the temperature around said photoconductor;

a third detection means for detecting the humidity around said photoconductor;

a first control means for selecting one of the gradation correction tables stored in said memory means according to the detection value by said first detection means and for setting the bias voltage of said developer and the output voltage of said charger according to the selected gradation correction table;

a second control means for changing the bias voltage of said developer and/or the output voltage of said charge according to the detection values of said second and third detection means;

a gradation correction means for correcting the image density signal according to the selected gradation correction table; and an exposure means for exposing the photoconductor having been sensitized at the initial potential with an exposure light quantity according the image density signal corrected by said gradation correction means.

49. An electrophotographic image forming apparatus according to claim 48, wherein said first detection means detects image density of a toner image of a test pattern formed on said photoconductor.

* * * * *

UNITED STATES PATENT AND TRADEMARK OFFICE
CERTIFICATE OF CORRECTION

PATENT NO. : 5,305,057
DATED : April 19, 1994
INVENTOR(S) : Yoshihiro HATTORI et al It is certified that error appears in the above-indentified patent and that said Letters Patent is hereby corrected as shown below:

Title page, item [30], add

-- July 5, 1991 [JP]    Japan .................... 3-165667
       August 22, 1991 [JP]    Japan .................... 3-210787 --.

Signed and Sealed this

Sixth Day of September, 1994

Attest:

BRUCE LEHMAN

*Attesting Officer*    *Commissioner of Patents and Trademarks*